US011363297B2

(12) United States Patent
Yoshikawa et al.

(10) Patent No.: US 11,363,297 B2
(45) Date of Patent: Jun. 14, 2022

(54) IMAGE CODING METHOD, IMAGE DECODING METHOD, IMAGE CODING APPARATUS, AND IMAGE DECODING APPARATUS

(71) Applicant: Sun Patent Trust, New York, NY (US)

(72) Inventors: Satoshi Yoshikawa, Osaka (JP); Hisao Sasai, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/916,301

(22) Filed: Jun. 30, 2020

(65) Prior Publication Data

US 2020/0336763 A1    Oct. 22, 2020

Related U.S. Application Data

(63) Continuation of application No. 16/164,129, filed on Oct. 18, 2018, now Pat. No. 10,735,768, which is a
(Continued)

(30) Foreign Application Priority Data

Sep. 30, 2013  (JP) ................................. 2013-205619
Jul. 1, 2014    (JP) ................................. 2014-135812

(51) Int. Cl.
*H04N 19/61*    (2014.01)
*H04N 19/127*   (2014.01)
(Continued)

(52) U.S. Cl.
CPC .......... *H04N 19/61* (2014.11); *H04N 19/127* (2014.11); *H04N 19/157* (2014.11); *H04N 19/42* (2014.11);
(Continued)

(58) Field of Classification Search
CPC .... H04N 19/61; H04N 19/547; H04N 19/127; H04N 19/157; H04N 19/44; H04N 19/42; H04N 19/537; H04N 19/557
See application file for complete search history.

(56) References Cited

U.S. PATENT DOCUMENTS 8,731,055 B2    5/2014 Lee
9,560,378 B2 *  1/2017 Yoshikawa ............ H04N 19/61
(Continued)

FOREIGN PATENT DOCUMENTS

JP    08-065680    3/1996
JP    9-224252     8/1997
(Continued)

OTHER PUBLICATIONS

Benjamin Bross et al., "High Efficiency Video Coding (HEVC) text specification draft 10 (for FDIS & Last Call)" Joint Collaborative Team on Video Coding (JCT-VC) of ITU-T SG 16 WP 3 and ISO/IEC JTC 1/SC 29/WG 11 12$^{th}$ Meeting: Geneva, CH, Jan. 14-23, 2013 JCTVC-L1003_v34.
(Continued)

*Primary Examiner* — Tat C Chio
(74) *Attorney, Agent, or Firm* — Wenderoth, Lind & Ponack, L.L.P.

(57) ABSTRACT

An image coding method includes selecting two or more transform components from among a plurality of transform components that include a translation component and non-translation components, the two or more transform components serving as reference information that represents a reference destination of a current block; coding selection information that identifies the two or more transform components that have been selected from among the plurality of transform components; and coding the reference informa-
(Continued)

tion of the current block by using reference information of a coded block different from the current block.

14 Claims, 48 Drawing Sheets

Related U.S. Application Data continuation of application No. 16/103,026, filed on Aug. 14, 2018, now Pat. No. 10,469,875, which is a continuation of application No. 15/661,195, filed on Jul. 27, 2017, now Pat. No. 10,080,039, which is a continuation of application No. 15/379,753, filed on Dec. 15, 2016, now Pat. No. 9,749,658, which is a continuation of application No. 14/497,640, filed on Sep. 26, 2014, now Pat. No. 9,560,378.

(51) Int. Cl.
*H04N 19/157* (2014.01)
*H04N 19/44* (2014.01)
*H04N 19/42* (2014.01)
*H04N 19/537* (2014.01)
*H04N 19/557* (2014.01)
*H04N 19/547* (2014.01)

(52) U.S. Cl.
CPC ........... *H04N 19/44* (2014.11); *H04N 19/537* (2014.11); *H04N 19/547* (2014.11); *H04N 19/557* (2014.11)

(56) References Cited

U.S. PATENT DOCUMENTS

| | | | | |
|---|---|---|---|---|
| 9,749,658 | B2 * | 8/2017 | Yoshikawa | .......... H04N 19/127 |
| 10,080,039 | B2 * | 9/2018 | Yoshikawa | .......... H04N 19/547 |
| 10,469,875 | B2 * | 11/2019 | Yoshikawa | ............ H04N 19/61 |
| 10,582,220 | B2 * | 3/2020 | Yoshikawa | ............ H04N 19/44 |
| 10,735,768 | B2 * | 8/2020 | Yoshikawa | .......... H04N 19/127 |
| 2003/0090593 | A1 | 5/2003 | Xiong | |
| 2007/0081814 | A1 | 4/2007 | Ha | |
| 2008/0159400 | A1 | 7/2008 | Lee et al. | |
| 2010/0104256 | A1 * | 4/2010 | Tsurumi | ............. G06K 9/00308 |
| | | | | 386/241 |
| 2012/0014444 | A1 | 1/2012 | Min et al. | |
| 2013/0003824 | A1 | 1/2013 | Guo | |
| 2013/0034153 | A1 | 2/2013 | Song | |
| 2013/0089249 | A1 * | 4/2013 | Mueller | ............... G06K 9/0014 |
| | | | | 382/128 |
| 2013/0148734 | A1 * | 6/2013 | Nakamura | ........... H04N 19/105 |
| | | | | 375/240.16 |
| 2015/0092851 | A1 | 4/2015 | Yoshikawa | |
| 2019/0052906 | A1 | 2/2019 | Yoshikawa | |

FOREIGN PATENT DOCUMENTS

| | | |
|---|---|---|
| JP | 2004-159132 | 6/2004 |
| JP | 3654664 | 6/2005 |
| JP | 2010-515398 | 5/2010 |
| JP | 2013-534375 | 9/2013 |

OTHER PUBLICATIONS

Arakawa et al., "Speedup of Motion Compensation Estimation Using Affine Transformation" ITE Journal vol. 51, No. 7, pp. 1114-1117 (1997).
Tokumichi Murakami et al., "High Efficiency Video Coding Technology HEVC/H.265", Ohmsha, Ltd., Feb. 25, 2013, pp. 132-136, with English translation.

* cited by examiner

FIG. 17

| CODING LEVEL | TRANSFORM |
|---|---|
| 1 | TRANSLATION |
| 2 | ROTATION, SCALING |
| 3 | SHEARING |

FIG. 39

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUB VIDEO) |
| VIDEO STREAM (PID = 0x1B01 SUB VIDEO) |

FIG. 50

| SUPPORTED STANDARD | DRIVING FREQUENCY |
|---|---|
| MPEG-4 AVC | 500 MHz |
| MPEG-2 | 350 MHz |
| ... | ... |

IMAGE CODING METHOD, IMAGE DECODING METHOD, IMAGE CODING APPARATUS, AND IMAGE DECODING APPARATUS

BACKGROUND OF THE INVENTION

1. Field of the Invention

One or more exemplary embodiments disclosed herein relate to an image coding method and an image decoding method.

2. Description of the Related Art

In order to improve the coding efficiency, various studies have been made regarding the HEVC (High Efficiency Video Coding) standard which is the latest video coding standard (see, for example, Joint Collaborative Team on Video Coding (JCT-VC) of ITU-T SG 16 WP 3 and ISO/IEC JTC 1/SC 29/WG 11 12th Meeting: Geneva, CH, 14-23 Jan. 2013 JCTVC-L1003_v34 Title: High Efficiency Video Coding (HEVC) text specification draft 10 (for FDIS & Last Call) http://phenix.int-evry.fr/jct/doc_end_user/documents/12_Geneva/wg11/JCTVC-L1003-v34.zip). This scheme is one of ITU-T (International Telecommunication Union Telecommunication Standardization Sector) standards called H.26x and one of ISO/IEC (International Organization for Standardization/International Electrotechnical Communication) standards called MPEG-x (Moving Picture Experts Group-x), and has been studied as a successor to the video coding standard called H.264/AVC (Advanced Video Coding) or MPEG-4 AVC.

It is desired that such an image coding method and image decoding method have an improved coding efficiency.

SUMMARY

Accordingly, embodiments of the present disclosure provide an image coding method and an image decoding method capable of improving the coding efficiency.

An image coding method according to one aspect of the present disclosure is an image coding method for coding an image, including selecting two or more transform components from among a plurality of transform components that include a translation component and a plurality of non-translation components, the two or more transform components serving as reference information that represents a reference destination of a current block coding; generating a prediction image by using the reference information; coding the current block by using the prediction image; coding selection information that identifies the two or more transform components that have been selected from among the plurality of transform components; and coding the reference information of the current block by using reference information of a coded block different from the current block.

Also, an image decoding method according to one aspect of the present disclosure is an image decoding method for decoding a bitstream obtained by coding an image, including decoding, from the bitstream, selection information that identifies two or more transform components from among a plurality of transform components that include a translation component and a plurality of non-translation components; selecting the two or more transform components identified by the decoded selection information, the two or more transform components serving as reference information that represents a reference destination of a current block to be decoded; decoding, from the bitstream, the reference information of the current block by using reference information of a decoded block different from the current block; generating a prediction image by using the reference information of the current block; and decoding, from the bitstream, the current block by using the prediction image.

Note that these general or specific aspects may be implemented using a system, a method, an integrated circuit, a computer program, or a computer-readable recording medium such as a CD-ROM (Compact Disc-Read Only Memory), or using any given combination of a system, a method, an integrated circuit, a computer program, and a computer-readable recording medium.

Advantageous Effects

The or more exemplary embodiments of features disclosed herein provide an image coding method and an image decoding method capable of improving the coding efficiency.

BRIEF DESCRIPTION OF THE DRAWINGS

FIG. 17 is a diagram illustrating an example of a coding level in accordance with a second embodiment.

FIG. 39 is a diagram illustrating a structure of multiplexed data.

FIG. 50 is a diagram illustrating an example of a lookup table in which a video data standard and a driving are associated with each other.

DESCRIPTION OF THE PREFERRED EMBODIMENTS

Underlying Knowledge of Present Disclosure

Figure 1:
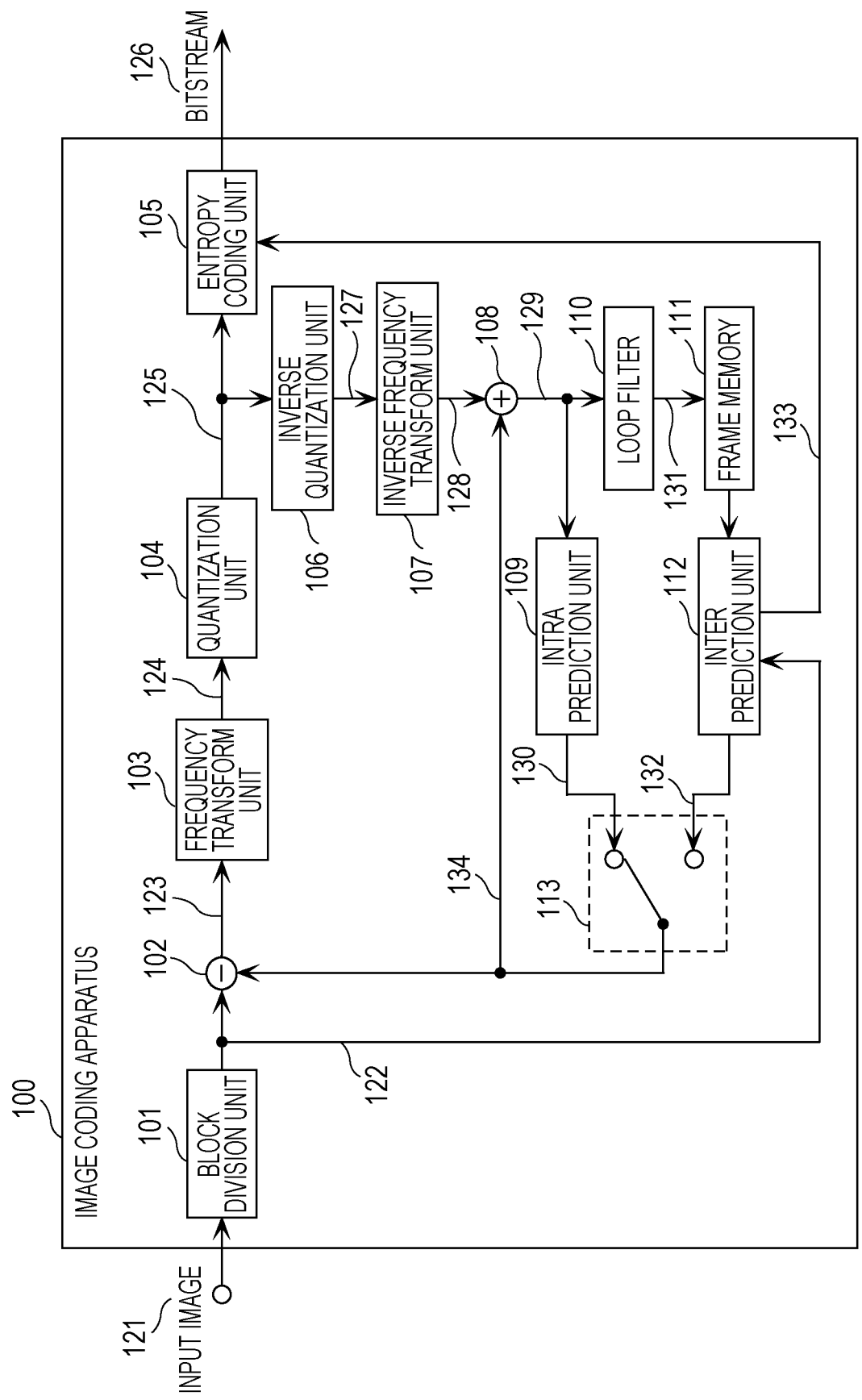
FIG. 1 is a block diagram illustrating a configuration of an image coding apparatus in accordance with a first embodiment.

Conventional image coding schemes use only information regarding translation as motion information.

However, in the case where a captured moving image includes scaling due to a zoom operation on a camera or a rotational motion of a subject, it is difficult to appropriately represent such motions only using components of a translational motion. Accordingly, a method for improving the prediction accuracy by making the size of a prediction block smaller is used in coding.

A method that uses, as motion information, high-order motion information such as information concerning an affine transform is also under study. For example, with an affine transform, three other types of transform (i.e., scaling, rotation, and shearing) in addition to translation can be expressed, and thus transforms such as the aforementioned rotation of a subject can be expressed. The use of an affine transform improves the quality of a generated prediction image, and also improves the coding efficiency because it allows for larger units of prediction.

However, while translation can be expressed using two-dimensional information, an affine transform requires at least six-dimensional information in order to express the three types of transform in addition to translation. Such an increase in the number of dimensions necessary for the motion information undesirably increases an amount of motion information coded and an amount of calculation necessary for a motion information estimation process.

To address such issues, the related art (Japanese Patent No. 3654664) discloses the following technique. During coding, estimation of motion information concerning only translation and estimation of high-order motion information such as information concerning an affine transform are performed for each prediction block. Among these estimation methods, a method that is determined to achieve a higher coding efficiency is selected. A flag indicating whether the motion information is concerning translation or an affine transform and the motion information corresponding to the flag are coded. In this way, an amount of information can be reduced while taking advantage of the use of high-order motion information, and thus the coding efficiency is improved. However, with this technique, an amount of code that represents the high-order motion information is not sufficiently reduced.

To address this issue, an image coding method according to one aspect of the present disclosure is an image coding method for coding an image, including selecting two or more transform components from among a plurality of transform components that include a translation component and a plurality of non-translation components, the two or more transform components serving as reference information that represents a reference destination of a current block coding; generating a prediction image by using the reference information; coding the current block by using the prediction image; coding selection information that identifies the two or more transform components that have been selected from among the plurality of transform components; and coding the reference information of the current block by using reference information of a coded block different from the current block.

With this configuration, the image coding method allows given transform components to be selected from among a plurality of transform components that include a translation component and a plurality of non-translation components. Thus, the image coding method can improve the coding efficiency of a coding scheme that uses high-order motion information.

For example, the plurality of non-translation components may include a rotation component, a scaling component, and a shearing component.

For example, the selection information may include flags each corresponding to one of the plurality of transform components and indicating whether or not the corresponding transform component has been selected.

With this configuration, the image coding method allows an affine matrix to be divided into a plurality of transform components and allows, for each of the plurality of transform components, whether or not to select the transform component to be specified, and thus can reduce an amount of information.

For example, in the selecting, one coding level may be selected from among a plurality of coding levels that represent different combinations each including some or all of the plurality of transform components, and the two or more transform components included in a combination represented by the selected coding level may be selected, and the selection information may represent the selected coding level.

With this configuration, the image coding method can further reduce an amount of information. Also, the image coding method can reduce a processing load for selection.

For example, in the coding of the selection information, one piece of the selection information that is used in common for an image including the current block may be coded.

With this configuration, the image coding method can further reduce an amount of information. Also, the image coding method can reduce a processing load for selection.

For example, in the selecting, the two or more transform components may be selected in accordance with a size of the current block, and the selection information may represent the size of the current block.

With this configuration, the image coding method can further reduce an amount of information.

For example, the plurality of non-translation components may include a rotation component, a scaling component, and a shearing component, and in the selecting, the shearing component may not be selected in a case where the size of the current block is smaller than a threshold.

With this configuration, the image coding method can reduce a processing load by restricting selection of a transform component that is less likely to contribute to an improvement of the prediction accuracy.

For example, in the selecting, the two or more transform components may be selected preferentially in an order of the translation component, the rotation component, the scaling component, and the shearing component.

With this configuration, the image coding method can implement a more efficient process by assigning a higher priority to a transform component that contributes to an improvement of the prediction accuracy.

Also, an image decoding method according to one aspect of the present disclosure is an image decoding method for decoding a bitstream obtained by coding an image, including decoding, from the bitstream, selection information that identifies two or more transform components from among a plurality of transform components that include a translation component and a plurality of non-translation components; selecting the two or more transform components identified by the decoded selection information, the two or more transform components serving as reference information that represents a reference destination of a current block to be decoded; decoding, from the bitstream, the reference information of the current block by using reference information of a decoded block different from the current block; generating a prediction image by using the reference information of the current block; and decoding, from the bitstream, the current block by using the prediction image.

With this configuration, the image decoding method allows a bitstream with an improved coding efficiency to be decoded.

For example, the plurality of non-translation components may include a rotation component, a scaling component, and a shearing component.

For example, the selection information may include flags each corresponding to one of the plurality of transform components and indicating whether or not the corresponding transform component has been selected.

For example, the selection information may represent one coding level among a plurality of coding levels that represent different combinations each including some or all of the plurality of transform components, and in the selecting, the two or more transform components included in a combination represented by the coding level represented by the selection information may be selected.

For example, in the decoding of the selection information, one piece of the selection information that is used in common for an image including the current block may be decoded.

For example, the selection information may represent a size of the current block, and in the selecting, the two or more transform components may be selected in accordance with the size of the current block.

For example, the plurality of non-translation components may include a rotation component, a scaling component, and a shearing component, and in the selecting, the shearing component may not be selected in a case where the size of the current block is smaller than or equal to a threshold.

For example, the plurality of non-translation components may include a rotation component, a scaling component, and a shearing component, and in the selecting, the two or more transform components may be selected preferentially in an order of the translation component, the rotation component, the scaling component, and the shearing component.

In addition, an image coding apparatus according to one aspect of the present disclosure is an image coding apparatus configured to code an image, including processing circuitry, and storage accessible from the processing circuitry, the processing circuitry being configured to execute the image coding method by using the storage.

With this configuration, the image coding apparatus can select given transform components from among a plurality of transform components that include a translation component and a plurality of non-translation components. Thus, the image coding apparatus can improve the coding efficiency of a coding scheme that uses high-order motion information.

In addition, an image decoding apparatus according to one aspect of the present disclosure is an image decoding apparatus configured to decode a bitstream obtained by coding an image, including processing circuitry, and storage accessible from the processing circuitry, the processing circuitry being configured to execute the image decoding method by using the storage.

With this configuration, the image decoding apparatus can decode a bitstream with an improved coding efficiency.

Note that these general or specific aspects may be implemented using a system, a method, an integrated circuit, a computer program, or a computer-readable recording medium such as a CD-ROM, or using any given combination of a system, a method, an integrated circuit, a computer program, and a computer-readable recording medium.

Embodiments will be described in detail below with reference to the drawings as needed. Note that a detailed description of already well-known items and a repeated description regarding substantially identical components may be omitted in order to avoid making the following description unnecessarily redundant and in order to make it easier for a person skilled in the art to understand the embodiments.

Note that each of embodiments below describes a specific example of the present disclosure. Numerical values, shapes, materials, elements, arranged positions and connection forms of the elements, steps, the order of the steps, and the like described in the following embodiments are merely examples, and do not limit the present disclosure. Also, among elements described in the following embodiments, elements that are not included in an independent claim which represents the highest concept are described as optional elements.

First Embodiment

One embodiment of an image coding apparatus that employs an image coding method according to a first embodiment will be described. The image coding apparatus according to the first embodiment selects given transform components from among a plurality of transform components expressed as an affine transform, and generates a prediction image using motion information including the selected transform components. The image coding apparatus also generates a bitstream which includes information indicating the selected transform components. With this configuration, the image coding apparatus can improve the coding efficiency.

FIG. 1 is a block diagram of an image coding apparatus 100 according to the first embodiment. The image coding apparatus 100 includes a block division unit 101, a subtraction unit 102, a transform unit 103, a quantization unit 104, an entropy coding unit 105, an inverse quantization unit 106, an inverse transform unit 107, an addition unit 108, an intra prediction unit 109, a loop filter 110, a frame memory 111, an inter prediction unit 112, and a switching unit 113.

The image coding apparatus 100 codes an input image 121 to generate a bitstream 126.

Figure 2:
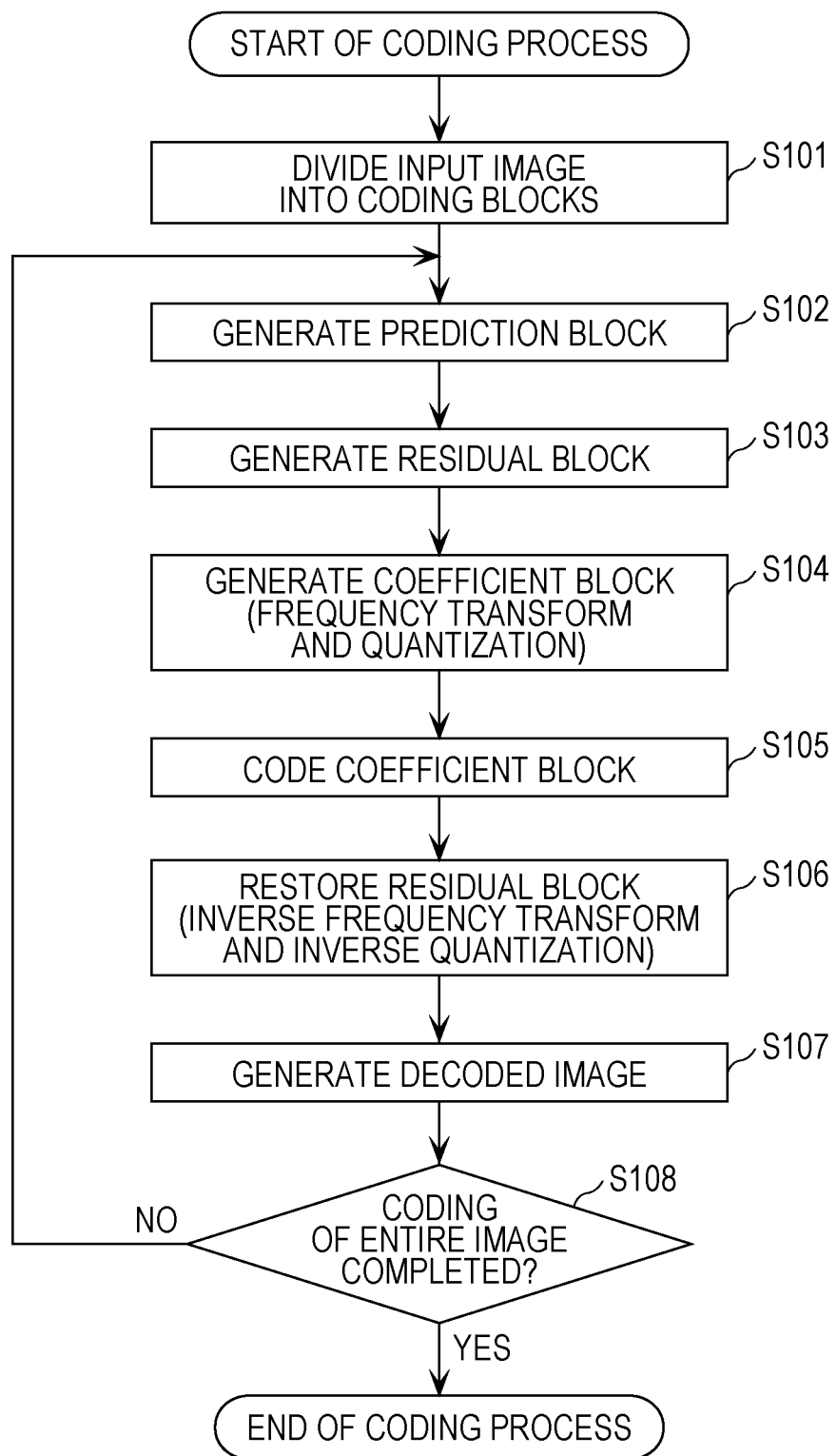
FIG. 2 is a flowchart illustrating an operation process performed by the image coding apparatus in accordance with the first embodiment.

FIG. 2 is a flowchart of a coding process performed by the image coding apparatus 100 in accordance with the first embodiment.

First, the block division unit 101 divides the input image 121 into coding blocks 122 which serve as units of the coding process (S101). The input image 121 may be a still image or moving image that includes one or more pictures.

Then, for each of the coding blocks 122, the intra prediction unit 109 generates a prediction block 134 by using a decoded block 129 or the inter prediction unit 112 generates the prediction block 134 by using a decoded image 131 (S102). Details about this process will be described later.

Then, the subtraction unit 102 generates a residual block 123 which represents a difference between the coding block 122 and the prediction block 134 (S103). The transform unit 103 performs transform on the residual block 123 to generate a coefficient block 124. One exemplary transform is time-frequency transform such as FFT. The quantization unit 104 quantizes the coefficient block 124 to generate a quantized coefficient block 125 (S104).

Then, the entropy coding unit 105 performs entropy coding on the quantized coefficient block 125 to generate the bitstream 126 (S105).

In order to generate the decoded block 129 and the decoded image 131 to be used in generation of the prediction block 134 of a subsequent block or picture, the inverse quantization unit 106 performs inverse quantization on the quantized coefficient block 125 to reconstruct a coefficient block 127. The inverse transform unit 107 performs inverse transform on the coefficient block 127 to reconstruct a residual block 128 (S106).

Then, the addition unit 108 adds the prediction block 134 used in step S102 and the residual block 128 together to generate the decoded block 129 (reconstructed image) (S107). This decoded block 129 is used in an intra prediction process performed by the intra prediction unit 109. Also, the loop filter 110 performs a loop filter process on the decoded block 129 to generate the decoded image 131. The frame memory 111 stores the decoded image 131 therein. This decoded image 131 is used in an inter prediction process performed by the inter prediction unit 112.

Such a series of processing steps is repeatedly performed until the coding process on the entire input image 121 completes (S108).

Note that transform and quantization of step S104 and inverse quantization and inverse transform of step S106 may be performed one by one as separate processes, or may be performed collectively. Also, quantization refers to a process in which values sampled at predetermined intervals are digitized by being associated with respective predetermined levels. Inverse quantization refers to a process in which each value obtained through quantization is returned to a value in the original intervals. In the data compression field, quantization refers to a process in which values are classified into coarser intervals than the original ones, whereas inverse quantization refers to a process in which values in coarser intervals are re-classified into the original finer intervals. In the codec technology field, quantization and inverse quantization are sometimes called rounding or scaling.

Figure 3:
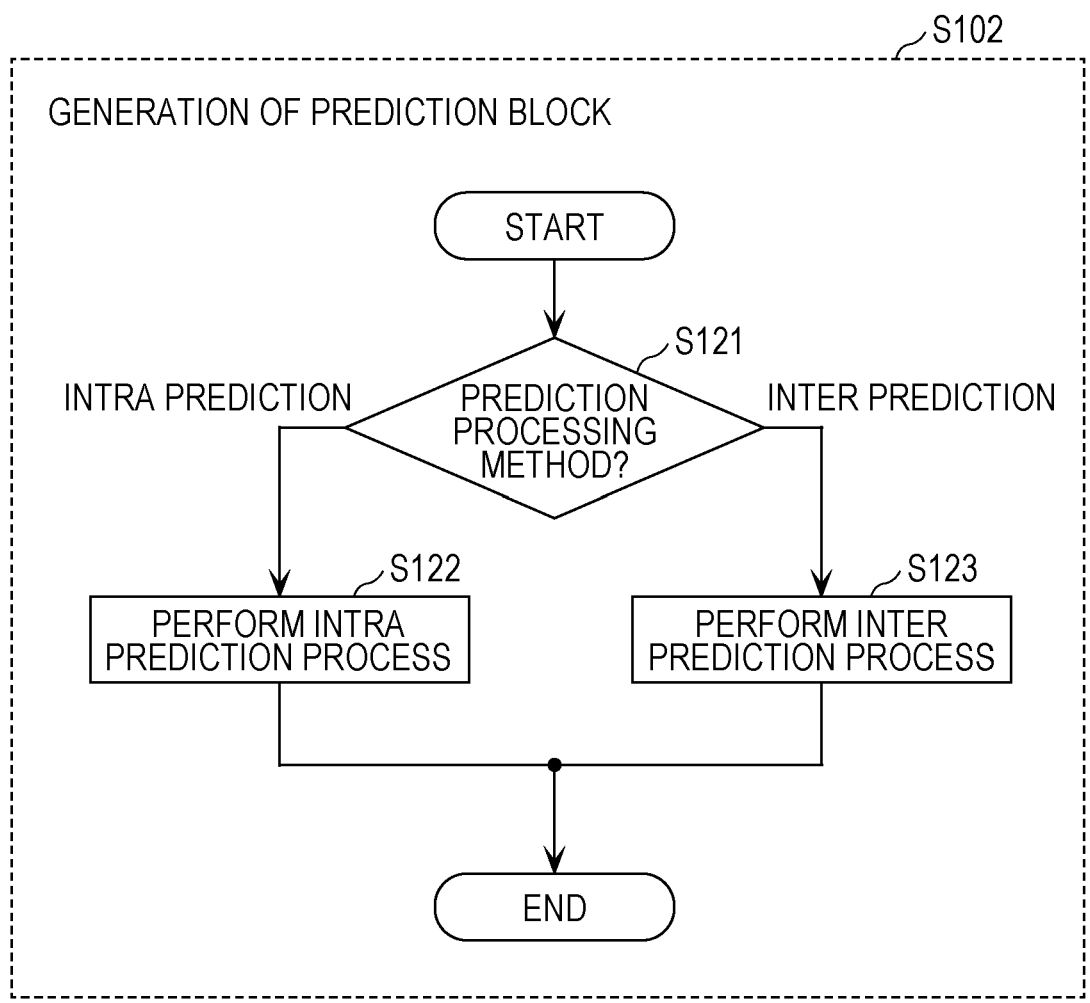
FIG. 3 is a flowchart illustrating an example of a prediction block generation process in accordance with the first embodiment.

Next, the prediction block generation process of step S102 will be described with reference to FIG. 3. FIG. 3 is a flowchart of the prediction block generation process (S102) in accordance with the first embodiment.

First, the image coding apparatus 100 determines whether a prediction processing method applied to the processing-target prediction block is intra prediction or inter prediction (S121).

If the prediction processing method is intra prediction ("INTRA PREDICTION" in S121), the intra prediction unit 109 generates a prediction block 130 through an intra prediction process (S122). Also, the switching unit 113 outputs the generated prediction block 130 as the prediction block 134.

On the other hand, if the prediction processing method is inter prediction ("INTER PREDICTION" in S121), the inter prediction unit 112 generates a prediction block 132 through an inter prediction process (S123). Also, the switching unit 113 outputs the generated prediction block 132 as the prediction block 134.

Note that the image coding apparatus 100 may perform both the processing of step S122 and the processing of step S123 without performing step S121, perform cost calculation for the resulting prediction blocks 130 and 132 using the R-D (rate-distortion) optimization model ((Eq. 1) below) or the like, and select a prediction mode that results less costly, that is, the selected prediction mode giving a higher coding efficiency.

$$\text{Cost} = D + \lambda \times R \quad \text{(Eq. 1)}$$

In (Eq. 1), D denotes coding distortion and is, for example, a sum of absolute values of differences between an original pixel value of a pixel in a coding-target block and a value of a corresponding pixel in the generated prediction image. Also, R denotes an amount of code produced and is, for example, an amount of code necessary for coding motion information or the like that is used to generate a prediction block. Also, $\lambda$ denotes the Lagrange multiplier. With this configuration, an appropriate prediction mode can be selected from among intra prediction and inter prediction, and the coding efficiency can be improved.

Subsequently, the inter prediction process of step S123 will be described with reference to FIGS. 4 and 5.

Figure 4:
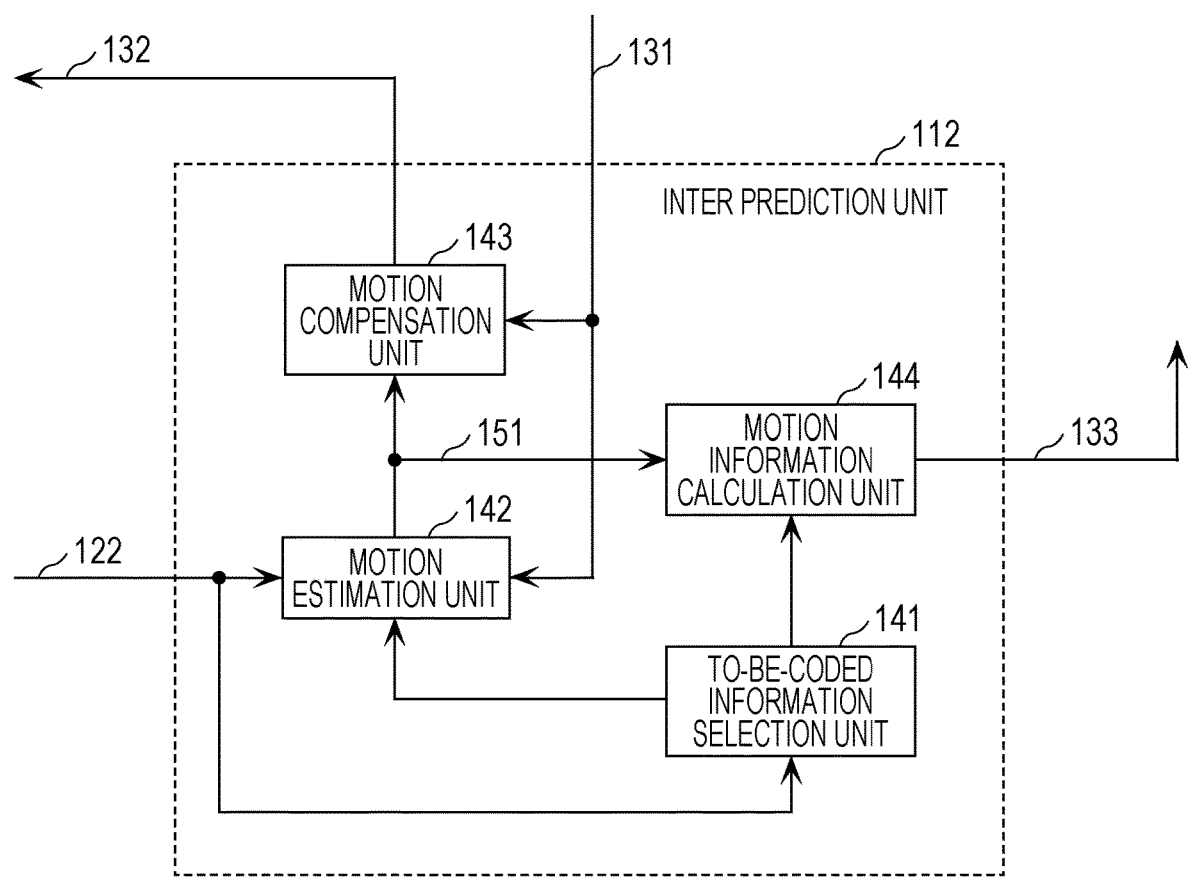
FIG. 4 is a block diagram illustrating an example of a configuration of an inter prediction unit in accordance with the first embodiment.

FIG. 4 is a block diagram illustrating an example of a configuration of the inter prediction unit 112. The inter prediction unit 112 includes a coding information selection unit 141, a motion estimation unit 142, a motion compensation unit 143, and a motion information calculation unit 144.

Figure 5:
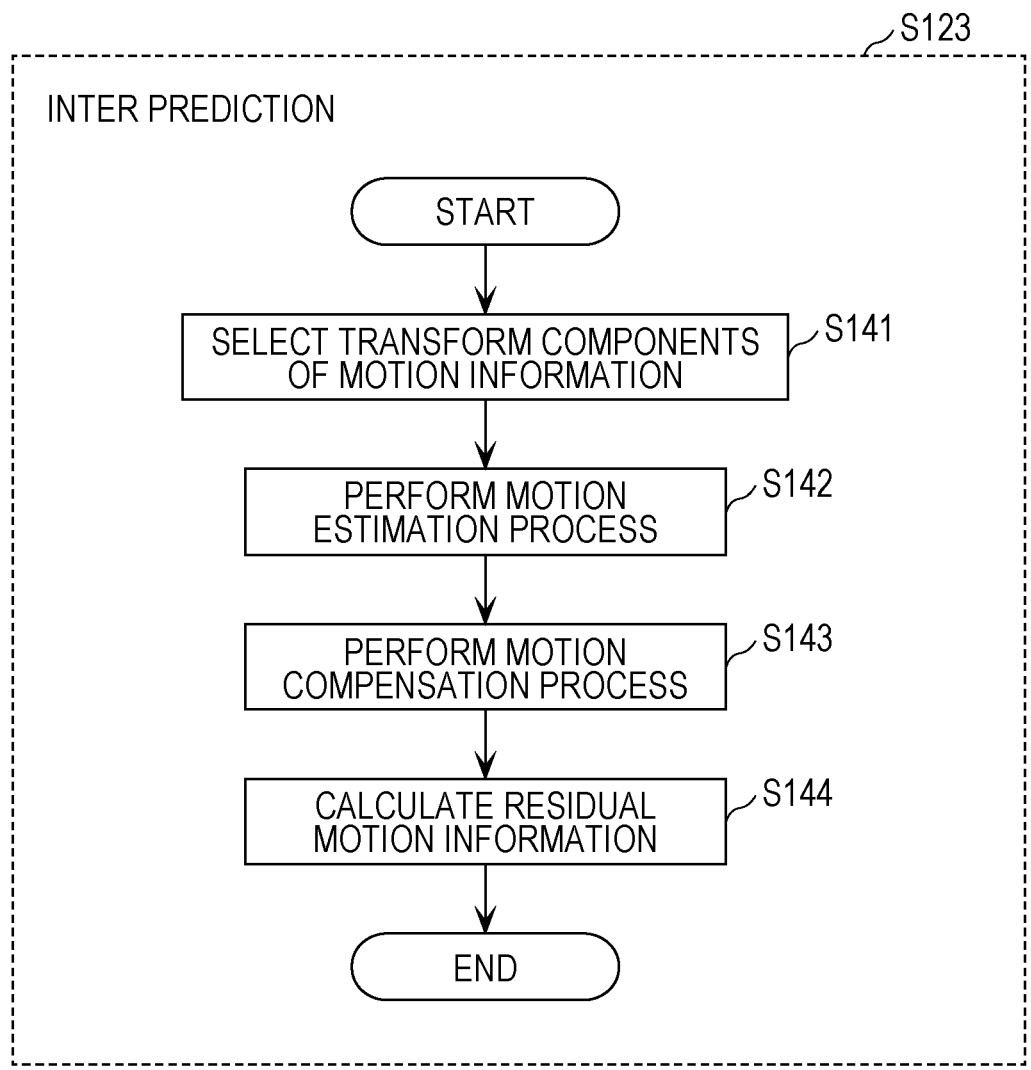
FIG. 5 is a flowchart illustrating an example of an inter prediction process in accordance with the first embodiment.

FIG. 5 is a flowchart of the inter prediction process (S123) in accordance with the first embodiment.

Figure 6:
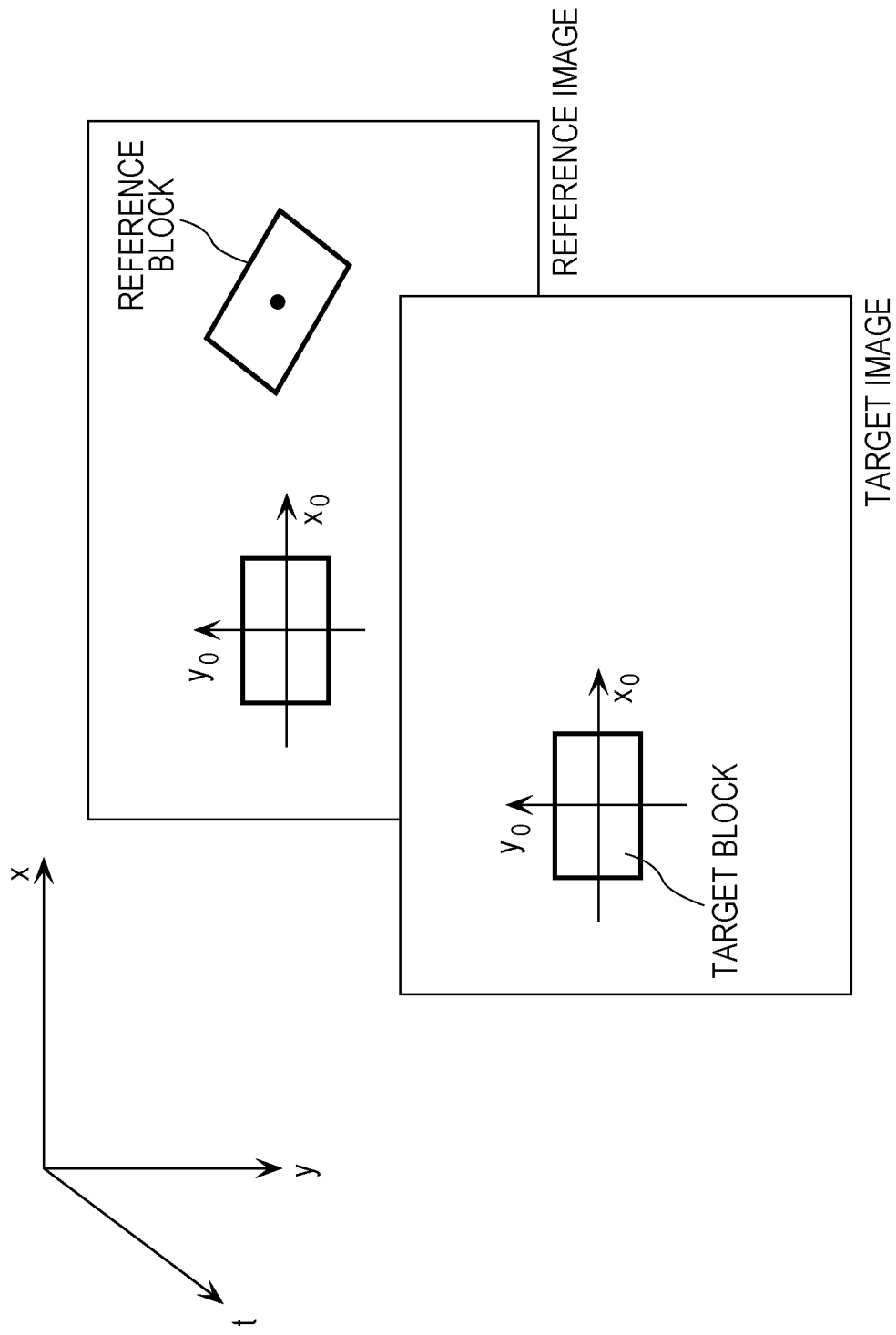
FIG. 6 is a diagram for describing motion information using a non-translation model in accordance with the first embodiment.

First, the coding information selection unit 141 selects transform components to be used in motion information, by using the input image (coding block 122) or the like (S141). Here, transform components are information that represents various transforms (e.g., translation, rotation, scaling, and shearing) and may be coefficients representing various transforms. As illustrated in FIG. 6, in the first embodiment, a plurality of non-translation transforms, such as rotation, scaling, and shearing, are used in addition to translation, as motion information.

Then, the motion estimation unit 142 performs a motion estimation process by using the input image (coding block 122) and the decoded image 131 on the motion information transform components selected in step S141 to generate motion information 151 (S142).

Then, the motion compensation unit 143 performs a motion compensation process using the motion information 151 obtained in step S142 and the decoded image 131 to generate the prediction block 132 (S143).

Then, the motion information calculation unit 144 calculates residual motion information which represents a difference between the motion information 151 obtained in step S142 and motion information of neighboring coded blocks adjacent in space or time to the current block to be coded (S144).

Then, the inter prediction process ends. Note that the residual motion information calculated in step S144 is output to the entropy coding unit 105 as motion information 133. The entropy coding unit 105 codes the motion information 133, and outputs the bitstream 126 including the coded motion information.

Figure 7:
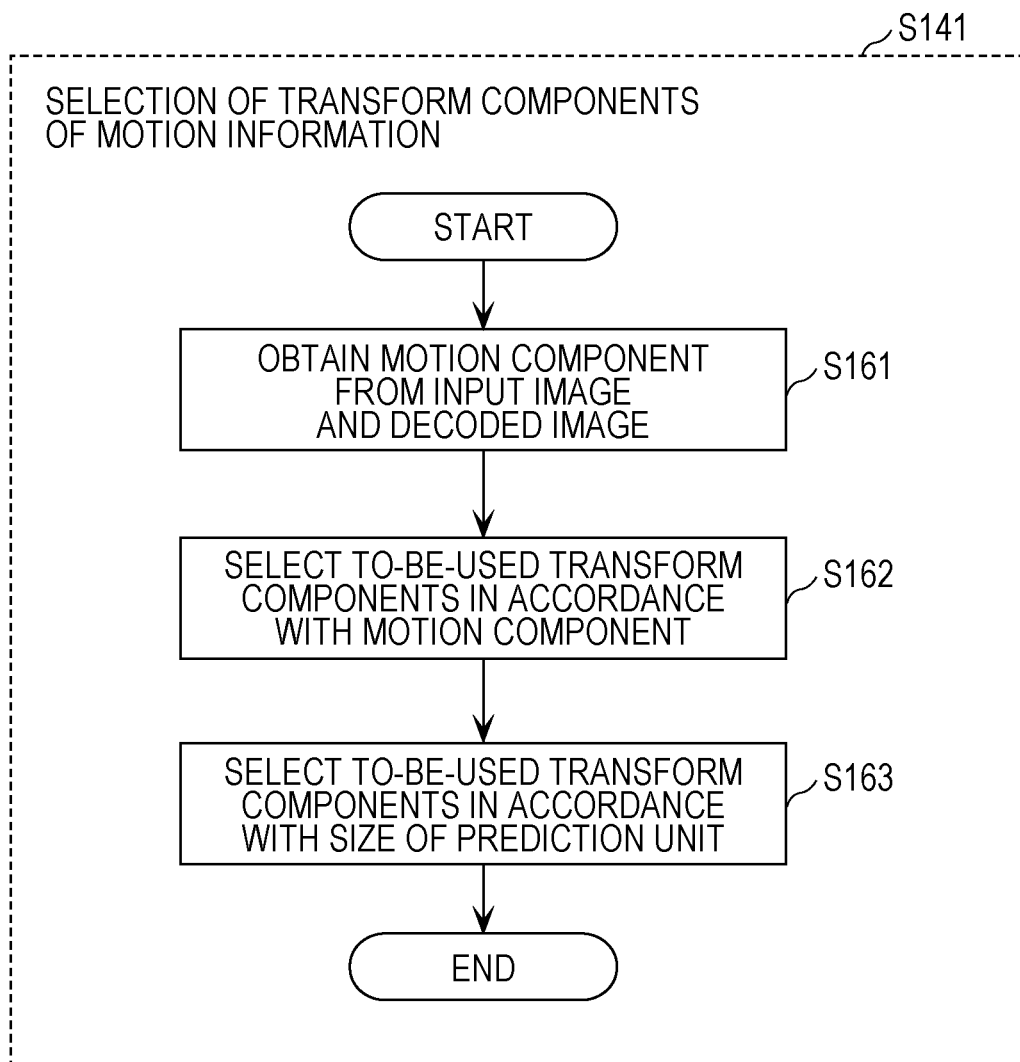
FIG. 7 is a flowchart illustrating an example of a transform component selection process for selecting transform components of motion information in accordance with the first embodiment.

Next, how transform components of the motion information are selected (S141) will be described in detail with reference to FIG. 7. FIG. 7 is a flowchart illustrating how transform components of the motion information are selected (S141) in accordance with the first embodiment.

First, the coding information selection unit 141 obtains an inter-image motion component between the input image (coding block 122) and the decoded image 131 (S161). For example, the coding information selection unit 141 extracts SIFT (Scale-Invariant Feature Transform) features from both the input image and the decoded image 131. The coding information selection unit 141 estimates a homography matrix that represents various transforms from the features of the input image and the features of the decoded image 131, and sets the homography matrix as the inter-image motion component. Note that although the example in which SIFT features are used as features set as the motion component has been described here, the features are not limited to this example.

Then, in accordance with the motion component obtained in step S161, the coding information selection unit 141 selects transform components of the motion information used in coding (S162). The coding information selection unit 141 also selects transform components of the motion information used in coding, in accordance with the size of the prediction block (S163). After a series of processing steps above, the process of step S141 ends.

Note that both steps S162 and S163 may be performed in this order or in the opposite order, or in parallel with each other, or only one of them may be performed.

Note that, in the first embodiment, the description is given on the assumption that the "motion component" represents features (inter-image motion) obtained by analyzing images using a certain analysis method and the "motion information" represents a matrix or vector that is determined on the basis of the motion component and is to be used in coding, or coefficients of the matrix or vector, or the like.

The following describes selection of transform components by using the motion component (step S162) and selection of transform components by using the size of the prediction block (step S163) in detail.

Figure 8:
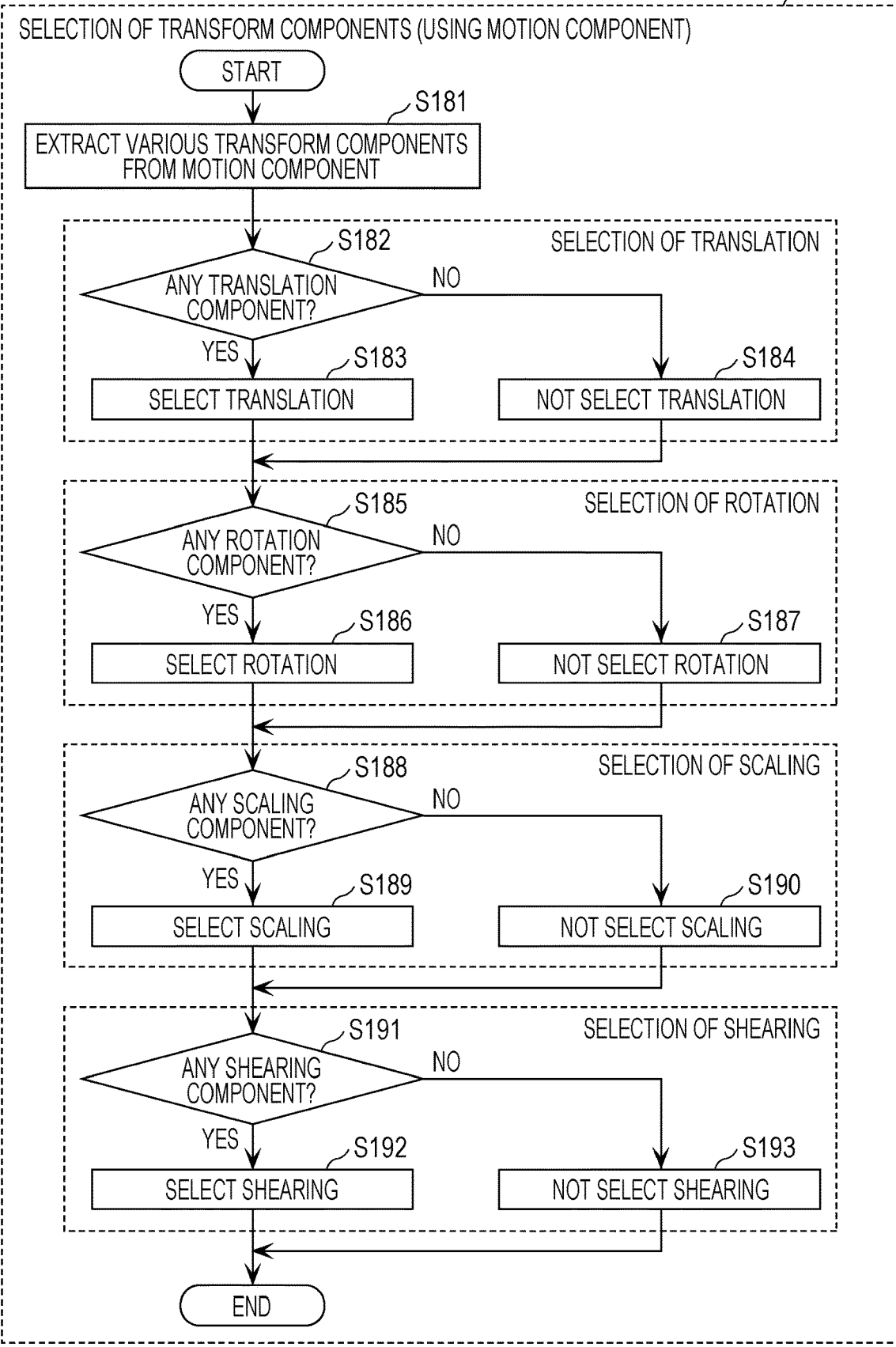
FIG. 8 is a flowchart illustrating an example of a transform component selection process based on a motion component in accordance with the first embodiment.

FIG. 8 is a flowchart illustrating how transform components are selected using the motion component (step S162) in accordance with the first embodiment.

First, the coding information selection unit 141 extracts transform components of translation, rotation, scaling, and shearing from the motion component (S181).

Here, an affine matrix a can be expressed by (Eq. 2) below. As expressed by (Eq. 2) below, the affine matrix a can be expressed as a sum of a matrix representing translation by c in the x direction and f in the y direction and a product of a matrix representing scaling at a scaling factor k ($k_x$ in the x direction, $k_y$ in the y direction), a matrix representing rotation at a rotation angle θ, and a matrix representing shearing at a shearing angle φ.

$$a = \begin{pmatrix} a & b & c \\ d & e & f \\ 0 & 0 & 1 \end{pmatrix} = \begin{pmatrix} \cos\theta & -\sin\theta & 0 \\ \sin\theta & \cos\theta & 0 \\ 0 & 0 & 0 \end{pmatrix} \begin{pmatrix} 1 & \tan\phi & 0 \\ 0 & 1 & 0 \\ 0 & 0 & 0 \end{pmatrix} \begin{pmatrix} k_x & 0 & 0 \\ 0 & k_y & 0 \\ 0 & 0 & 0 \end{pmatrix} + \begin{pmatrix} 0 & 0 & c \\ 0 & 0 & f \\ 0 & 0 & 1 \end{pmatrix} \quad \text{(Eq. 2)}$$

From the affine matrix a expressed as (Eq. 2), the scaling factor k, the rotation angle θ, the shearing angle φ, and the translation component can be extracted. The motion information is described as information having the four transform components, and is expressed as (c, f, θ, $k_x$, $k_y$, φ), for example.

In the case where both c and f, which together serve as the translation component, are equal to 0, the motion information does not include a translation component; otherwise, the motion information includes a translation component. In the case where the scaling factor k is equal to 1, the motion information does not include a scaling component; otherwise, the motion information includes a scaling component. In the case where the rotation angle θ is equal to 0, the motion information does not include a rotation component; otherwise, the motion information includes a rotation component. In the case where the shearing angle φ is equal to 0, the motion information does not include a shearing component; otherwise, the motion information includes a shearing component.

Note that although an example in which thresholds for transform components of translation, rotation, scaling, and shearing are (0,0), 0, (1,1), 0, respectively, has been described here, the thresholds are not limited to these ones. The threshold may be values determined taking features of images, precision of an image capturing apparatus, or the like into consideration. Also, the same scaling factor may be used for the x direction and the y direction instead of decomposing the scaling in the x direction and the y direction. With this configuration, an amount of code and an amount of processing can be reduced.

In this way, the coding information selection unit 141 extracts various transform components from the motion information in step S181. Note that although the case where the motion information is represented using an affine matrix has been described, usable motion information is not limited to this type. Hereinafter, it is assumed that, among the various transform components, the rotation angle represents a rotation component, the scaling factor represents a scaling component, the shearing angle represents a shearing component, and a translation vector represents a translation component.

Then, the coding information selection unit 141 performs a selection process to determine whether or not translation is used. First, the coding information selection unit 141 determines whether or not the translation component, which is represented by a motion vector or the like, has been extracted from the motion component in step S181 (S182).

If the motion component includes the translation component (YES in S182), the coding information selection unit 141 selects translation (S183). On the other hand, if the motion component does not include the translation component (NO in S182), the coding information selection unit 141 does not select translation (S184).

Then, the coding information selection unit 141 determines whether or not rotation is used. The coding information selection unit 141 determines whether or not the rotation component, which is represented by the rotation angle θ or the like, has been extracted from the motion component in step S181 (S185).

If the motion component includes the rotation component (YES in S185), the coding information selection unit 141 selects rotation (S186). If the motion component does not include the rotation component (NO in S185), the coding information selection unit 141 does not select rotation (S187).

Then, the coding information selection unit 141 determines whether or not scaling is used. The coding information selection unit 141 determines whether or not a scaling component, which is represented by the scaling factor k or the like, has been extracted from the motion component in step S181 (S188). If the motion component includes the scaling component (YES in S188), the coding information selection unit 141 selects scaling (S189). If the motion component does not include the scaling component (NO in S188), the coding information selection unit 141 does not select scaling (S190).

Lastly, the coding information selection unit 141 determines whether or not shearing is used. The coding information selection unit 141 determines whether or not a shearing component, which is represented by the shearing angle (I) or the like, has been extracted from the motion component in step S181 (S191).

If the motion component includes the shearing component (YES in S191), the coding information selection unit 141 selects shearing (S192). If the motion component does not include the shearing component (NO in S191), the coding information selection unit 141 does not select shearing (S193). After a series of processing steps above, the process of step S162 ends.

Figure 9:
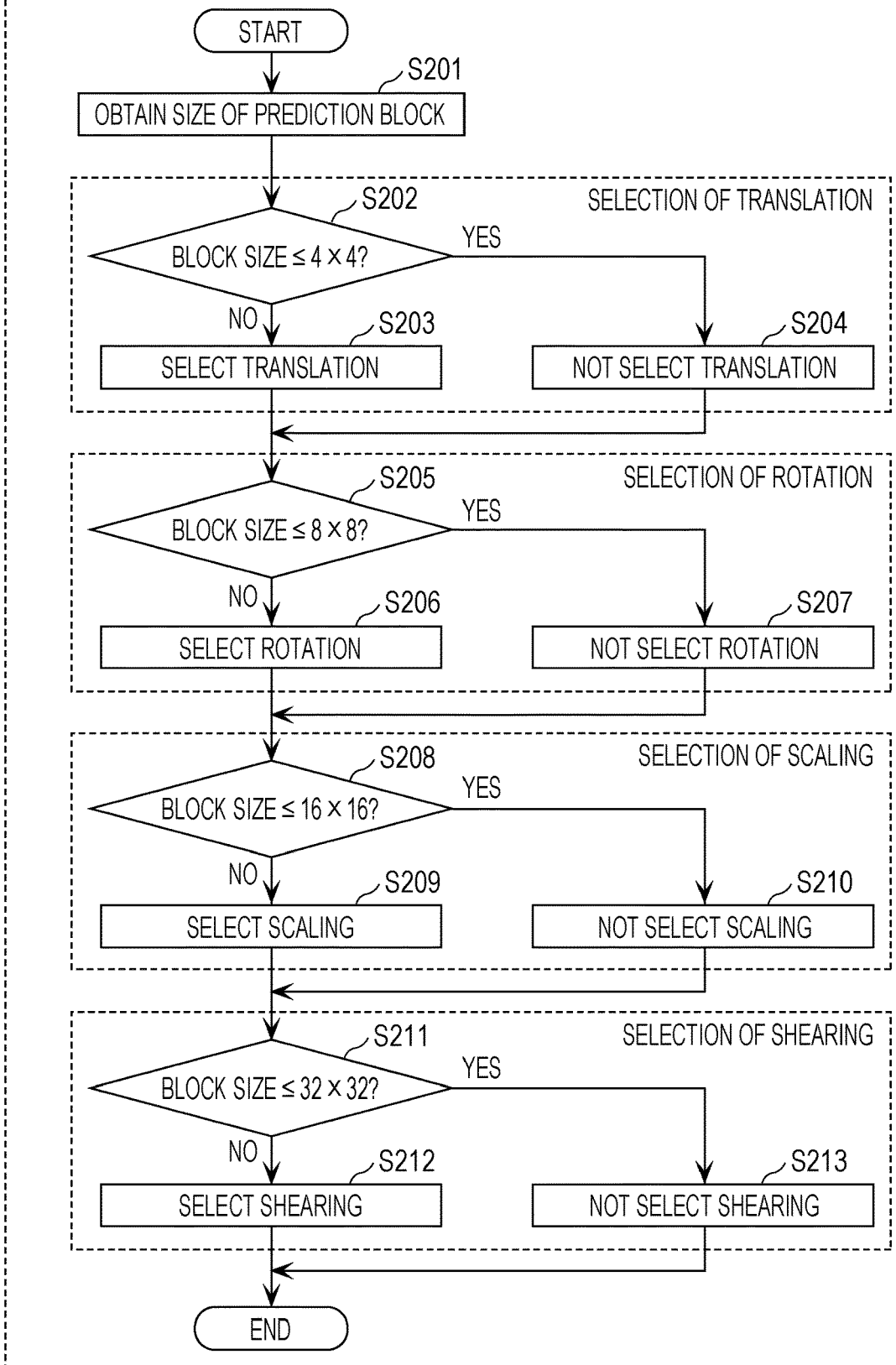
FIG. 9 is a flowchart illustrating an example of a transform component selection process based on a prediction block size in accordance with the first embodiment.

Next, step S163 illustrated in FIG. 7 will be described with reference to FIG. 9. FIG. 9 is a flowchart illustrating how transform components are selected by using the block size (step S163) in accordance with the first embodiment.

First, the coding information selection unit 141 obtains the block size of the prediction block (S201).

Then, the coding information selection unit 141 determines whether or not translation is used. The coding information selection unit 141 determines whether or not the block size obtained in step S201 is smaller than or equal to 4×4 (S202).

If the block size is larger than 4×4 (NO in S202), the coding information selection unit 141 selects translation (S203). On the other hand, the block size is smaller than or equal to 4×4 (YES in S202), the coding information selection unit 141 does not select translation (S204).

Then, the coding information selection unit 141 determines whether or not rotation is used. The coding information selection unit 141 determines whether or not the block size obtained in step S201 is smaller than or equal to 8×8 (S205).

If the block size is larger than 8×8 (NO in S205), the coding information selection unit 141 selects rotation (S206). On the other hand, if the block size is smaller than or equal to 8×8 (YES in S205), the coding information selection unit 141 does not select rotation (S207).

Then, the coding information selection unit 141 determines whether or not scaling is used. The coding information selection unit 141 determines whether or not the block size obtained in step S201 is smaller than or equal to 16×16 (S208). If the block size is larger than 16×16 (NO in S208), the coding information selection unit 141 selects scaling (S209). On the other hand, if the block size is smaller than or equal to 16×16 (YES in S208), the coding information selection unit 141 does not select scaling (S210).

Lastly, the coding information selection unit 141 determines whether or not shearing is used. The coding information selection unit 141 determines whether or not the block size obtained in step S201 is smaller than or equal to 32×32 (S211).

If the block size is larger than 32×32 (NO in step S211), the coding information selection unit 141 selects shearing (S212). On the other hand, if the block size is smaller than or equal to 32×32 (YES in S211), the coding information selection unit 141 does not select shearing (S213). After a series of processing steps above, the process of step S163 ends.

Although the case of using 4×4, 8×8, 16×16, and 32×32 in steps S202, S205, S208, and S211, respectively, by way of example of the thresholds of the block size has been described here, the thresholds of the block size are not limited to these ones, and may be any given sizes. Alternatively, the coding information selection unit 141 may switch between thresholds in accordance with features of images. With this configuration, the coding efficiency can be improved.

Also, although the example in which steps S162 and S163 are performed one by one in this order has been described here, the order may be opposite, or part or entirety of these processes may be performed at the same time. Alternatively, only one of steps S162 and S163 may be performed.

In the case where both steps S162 and S163 are performed, for example, if there is a transform component and the block size is larger than the corresponding threshold, the coding information selection unit 141 selects the transform; otherwise, the coding information selection unit 141 does not select the transform. In other words, the coding information selection unit 141 selects a transform that has been determined to be selected both in steps S162 and S163, and does not select a transform that has been determined not to be selected in at least one of steps S162 and S163.

Alternatively, the coding information selection unit 141 may perform the size comparison of step S163 first, and then determine whether or not there is a transform component (S162) only for transforms determined to be selected. Alternatively, the coding information selection unit 141 may determine whether or not there is a transform component in step S162 first, and then perform the block size comparison (S163) only on transforms for which it is determined there are transform components.

Further, the order of sets of steps S182 to S184, S185 to S187, S188 to S190, and S191 to S193 illustrated in FIG. 8 may be changed to a given order, and some or all of the sets may be performed in parallel. Similarly, the order of sets of steps S202 to S204, S205 to S207, S208 to S210, and S211 to S213 illustrated in FIG. 9 may be changed to a given order, and some or all of the sets may be performed in parallel.

Note that an examination made by the inventors indicates that the shearing component is less likely to contribute to an improvement of the prediction accuracy than the other transform components because effective images are less. Accordingly, the priority of the shearing component may be set lower than those of the other transform components. For example, the determination process may be performed on the shearing component after the determination process is performed on the other transform components, or the threshold of the block size for the shearing component may be made larger than those of the other transform components. In this way, a lower priority can be set.

In step S142 that follows step S141 in FIG. 5, the motion estimation unit 142 performs motion estimation on the transform components selected in step S141. For example, the motion estimation unit 142 calculates residual signals (residual blocks) by changing the magnitude of translation and the plurality of transform components such as the scaling factor by a certain value. Then, the motion estimation unit 142 determines, as the motion information 151, a combination of the transform components that corresponds to the smallest residual signal among a plurality of obtained residual signals.

Then, in step S143, the motion compensation unit 143 generates the prediction image (prediction block 132) from the decoded image 131 using the motion information 151 obtained in step S142.

The last step, that is, step S144, will be described in detail with reference to FIGS. 10 to 14.

Figure 10:
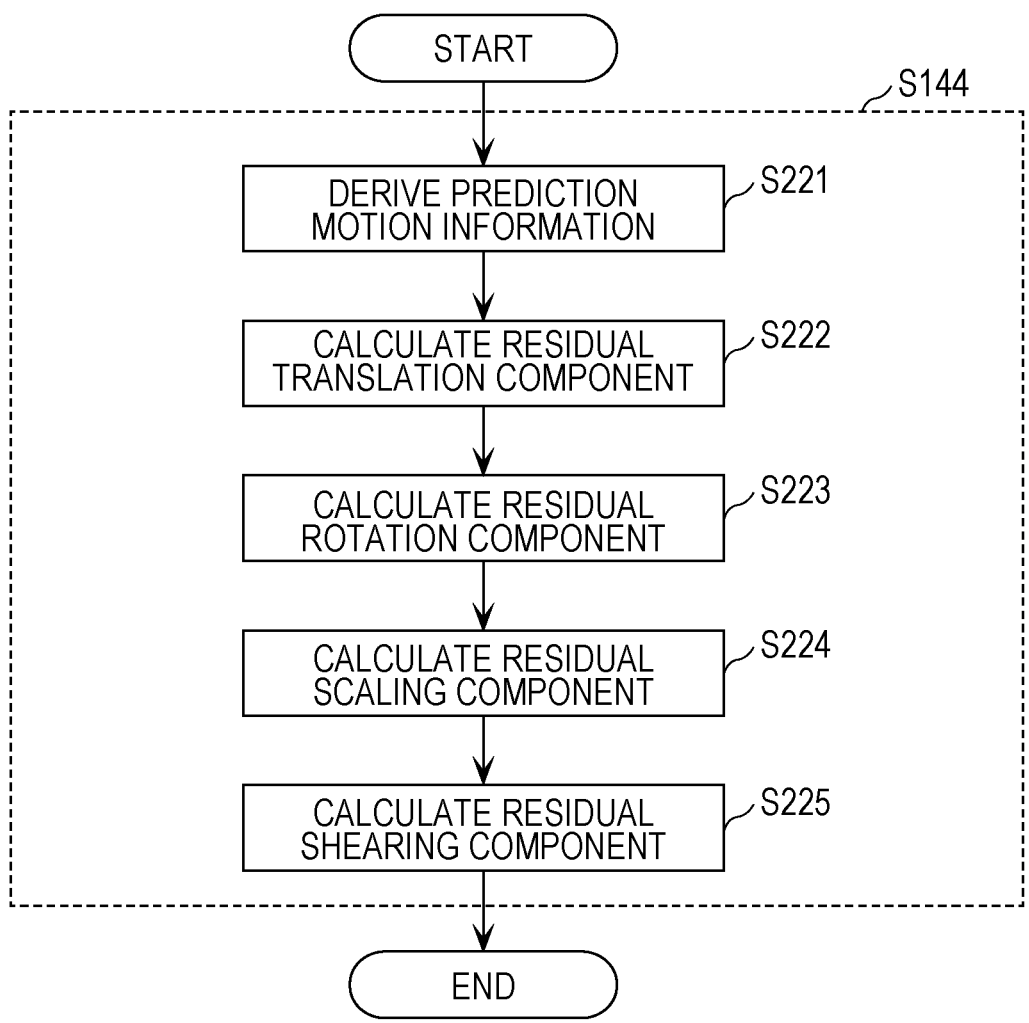
FIG. 10 is a flowchart illustrating an example of a residual motion information calculation process in accordance with the first embodiment.

FIG. 10 is a flowchart of the residual motion information calculation process (S144) in accordance with the first embodiment.

First, the motion information calculation unit 144 derives prediction motion information from pieces of motion information that are used for one or more coded blocks adjacent in space or time to the current block to be coded (S221). Like the motion information, the prediction motion information can include a translation component, a rotation component, a scaling component, and a shearing component. Hereinafter, various transform components included in the prediction motion information are also referred to as prediction transform components. Also, a translation component, a rotation component, a scaling component, and a shearing component included in the prediction motion information are also referred to as a prediction translation component, a prediction rotation component, a prediction scaling component, and a prediction shearing component, respectively.

For example, for each type of the prediction transform component, the motion information calculation unit 144 obtains a plurality of transform components of the type included in the plurality of pieces of motion information for the plurality of coded blocks, and derives a prediction transform component of the type from the plurality of obtained transform components. For example, the motion information calculation unit 144 derives, as the prediction transform component, an average of the transform components of the plurality of coded blocks that refer to the same reference picture. Note that as the method for deriving the prediction transform component, every calculation method used in HEVC or the like can be used.

First, the motion information calculation unit 144 calculates a residual translation component which is residual motion information of the translation component (S222).

Figure 11:
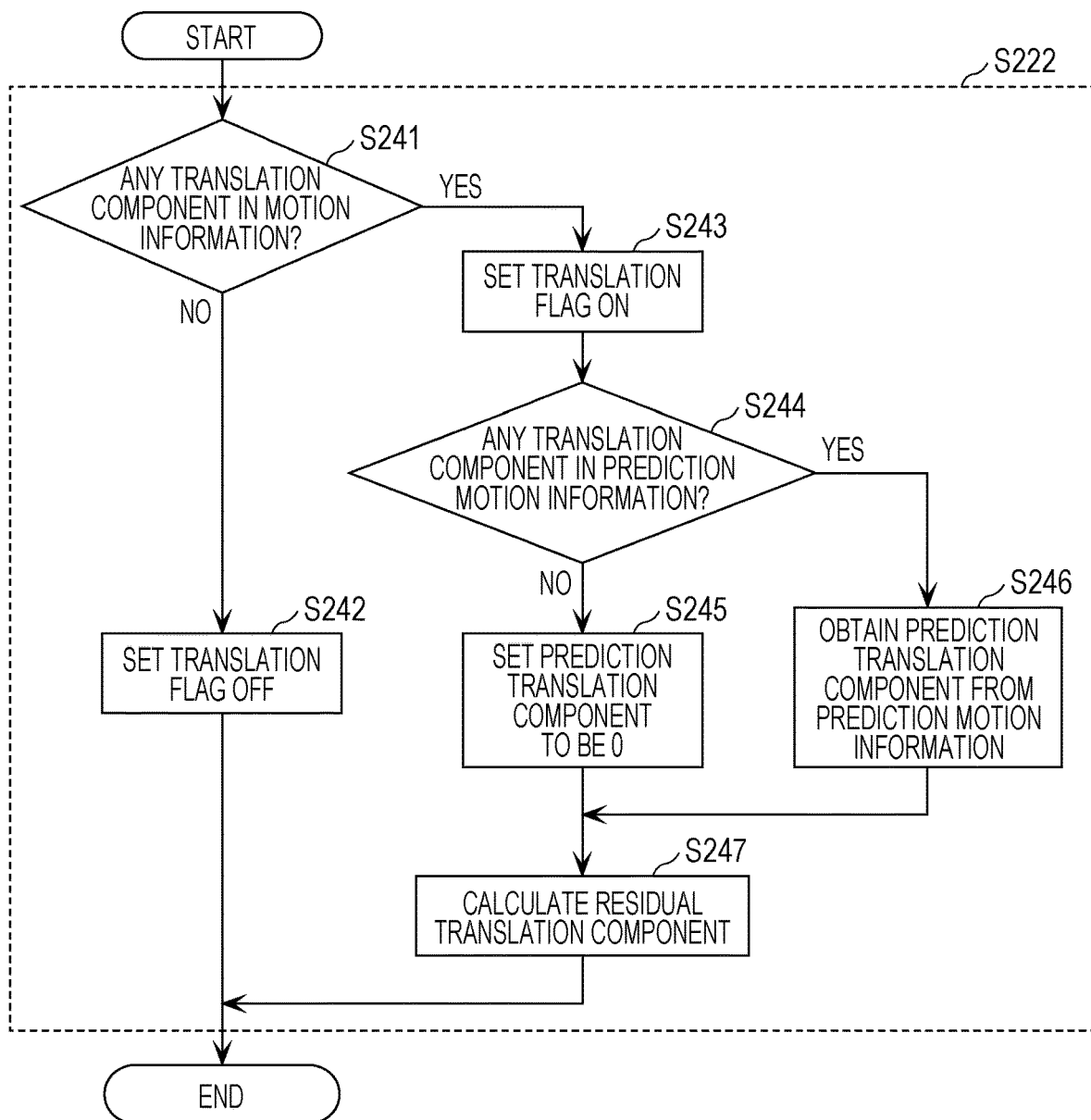
FIG. 11 is a flowchart illustrating an example of a residual translation component calculation process in accordance with the first embodiment.

FIG. 11 is a flowchart of this residual translation component calculation process (S222).

First, the motion information calculation unit 144 determines whether or not the motion information 151 estimated in step S142 includes a translation component (S241). For example, the motion information calculation unit 144 determines that the motion information 151 does not include a translation component if both an x-direction component and a y-direction component included in the translation component are equal to 0, and determines that the motion information 151 includes a translation component if at least one of the x-direction component and the y-direction component is not equal to 0. Alternatively, the motion information calculation unit 144 may determine that the motion information 151 does not include a translation component if the magnitude of the translation component is smaller than a certain value. Also, the motion information calculation unit 144 may switch the certain value in accordance with features of the image. Alternatively, the motion information calculation unit 144 may always determine that the motion information 151 includes a translation component (or no translation component) if features of the image satisfy a certain condition.

Alternatively, the motion information calculation unit 144 may determine that the motion information 151 does not include a translation component in the case where it has been determined in step S184 of FIG. 8 or step S204 of FIG. 9 that translation is not selected.

If the motion information 151 does not include a translation component (NO in S241), the motion information calculation unit 144 sets a translation flag, which indicates that "translation is present", OFF, and attaches the translation flag to the motion information 133 to be coded (S242).

If the motion information 151 includes a translation component (YES in S241), the motion information calculation unit 144 sets the translation flag ON, and attaches the translation flag to the motion information 133 (S243).

Then, the motion information calculation unit 144 determines whether or not the prediction motion information derived in step S221 includes a translation component (S244). If the prediction motion information does not include a translation component (NO in S244), the motion information calculation unit 144 sets the prediction translation component to be equal to 0 (S245).

On the other hand, if the prediction motion information includes a translation component (YES in S244), the motion information calculation unit 144 sets the prediction translation component to be equal to the translation component included in the prediction motion information (S246).

Then, the motion information calculation unit 144 subtracts the prediction translation component obtained in step S245 or S246 from the translation component of the motion information 151 obtained in step S142 to calculate a residual translation component, and attaches the calculated residual translation component to the motion information 133 (S247).

Then, the motion information calculation unit 144 calculates a residual rotation component which is residual motion information of the rotation component (S223).

Figure 12:
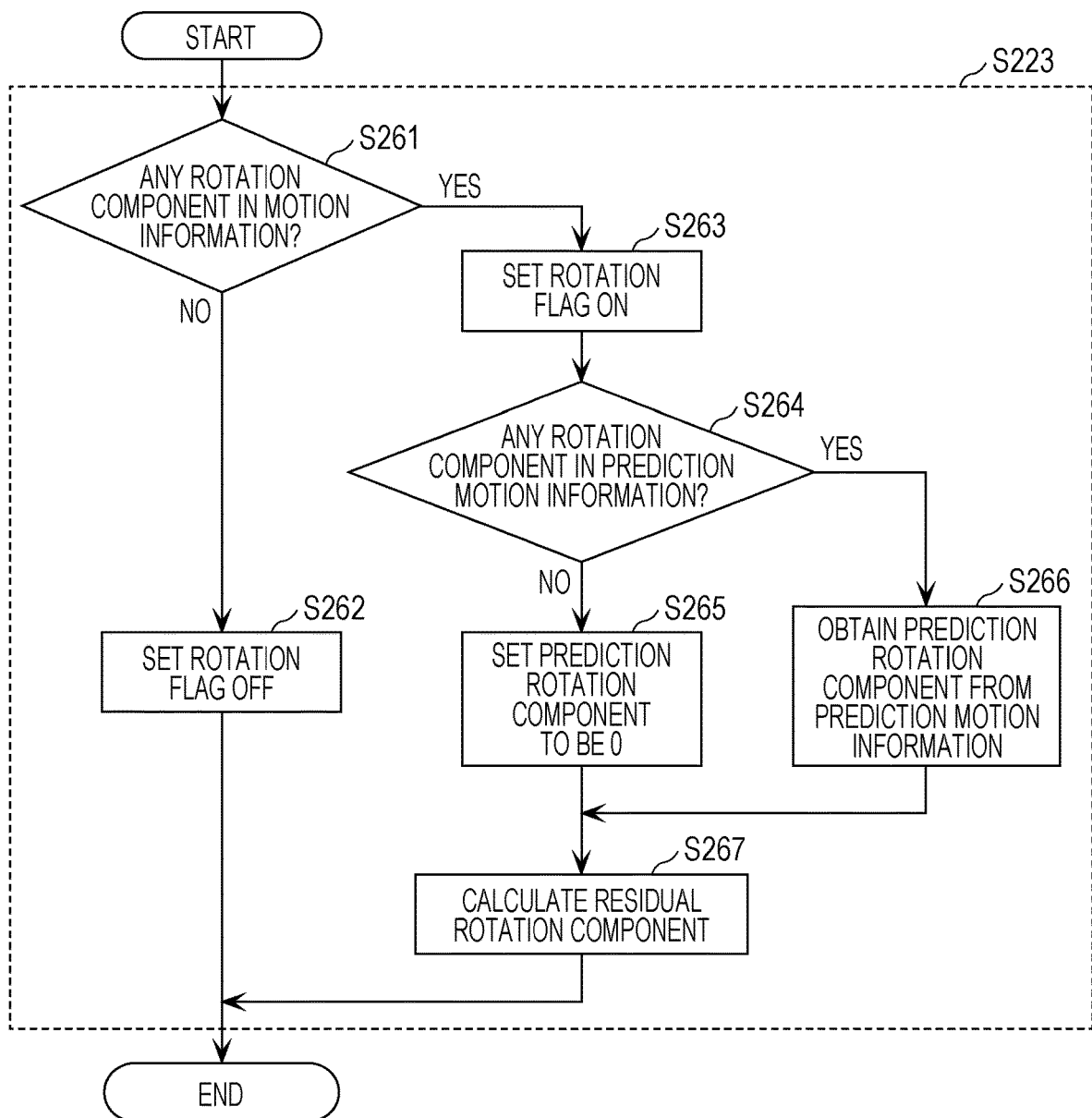
FIG. 12 is a flowchart illustrating an example of a residual rotation component calculation process in accordance with the first embodiment.

FIG. 12 is a flowchart of this residual rotation component calculation process (S223).

First, the motion information calculation unit 144 determines whether or not the motion information 151 estimated in step S142 includes a rotation component (S261). For example, as in the determination regarding translation (S241), the motion information calculation unit 144 may determine whether or not the rotation component is equal to 0 or may compare the rotation angle with a certain value. Also, the motion information calculation unit 144 may switch the certain value in accordance with features of images. For example, the motion information calculation unit 144 may always determine that the motion information 151 includes a rotation component if the image has features for which rotation is likely to contribute to an improvement of the prediction accuracy; otherwise, the motion information calculation unit 144 may always determine that the motion information 151 does not include a rotation component. In the case where it is determined that the motion information 151 always includes a rotation component, for example, the rotation angle θ is determined in advance on the basis of a temporal change in an angle with respect to the rotation center, and the motion information calculation unit 144 may always use that value.

Alternatively, the motion information calculation unit 144 may determine that the motion information 151 does not include a rotation component in the case where it has been determined in step S187 of FIG. 8 or step S207 of FIG. 9 that rotation is not selected.

If the motion information 151 does not include a rotation component (NO in S261), the motion information calculation unit 144 sets a rotation flag, which indicates that "rotation is present", OFF, and attaches the rotation flag to the motion information 133 to be coded (S262).

If the motion information 151 includes a rotation component (YES in S261), the motion information calculation unit 144 sets the rotation flag ON, and attaches the rotation flag to the motion information 133 (S263).

Then, the motion information calculation unit 144 determines whether or not the prediction motion information derived in step S221 includes a rotation component (S264).

If the prediction motion information does not include a rotation component (NO in S264), the motion information calculation unit 144 sets the prediction rotation component to be equal to 0 (S265). If the prediction motion information includes a rotation component (YES in S264), the motion information calculation unit 144 sets the prediction rotation component to be equal to the rotation component included in the prediction motion information (S266).

The motion information calculation unit 144 subtracts the prediction rotation component obtained in step S265 or S266 from the rotation component of the motion information 151 obtained in step S142 to calculate a residual rotation component, and attaches the calculated residual rotation component to the motion information 133 (S267).

Then, the motion information calculation unit 144 calculates a residual scaling component which is residual motion information of the scaling component (S224).

Figure 13:
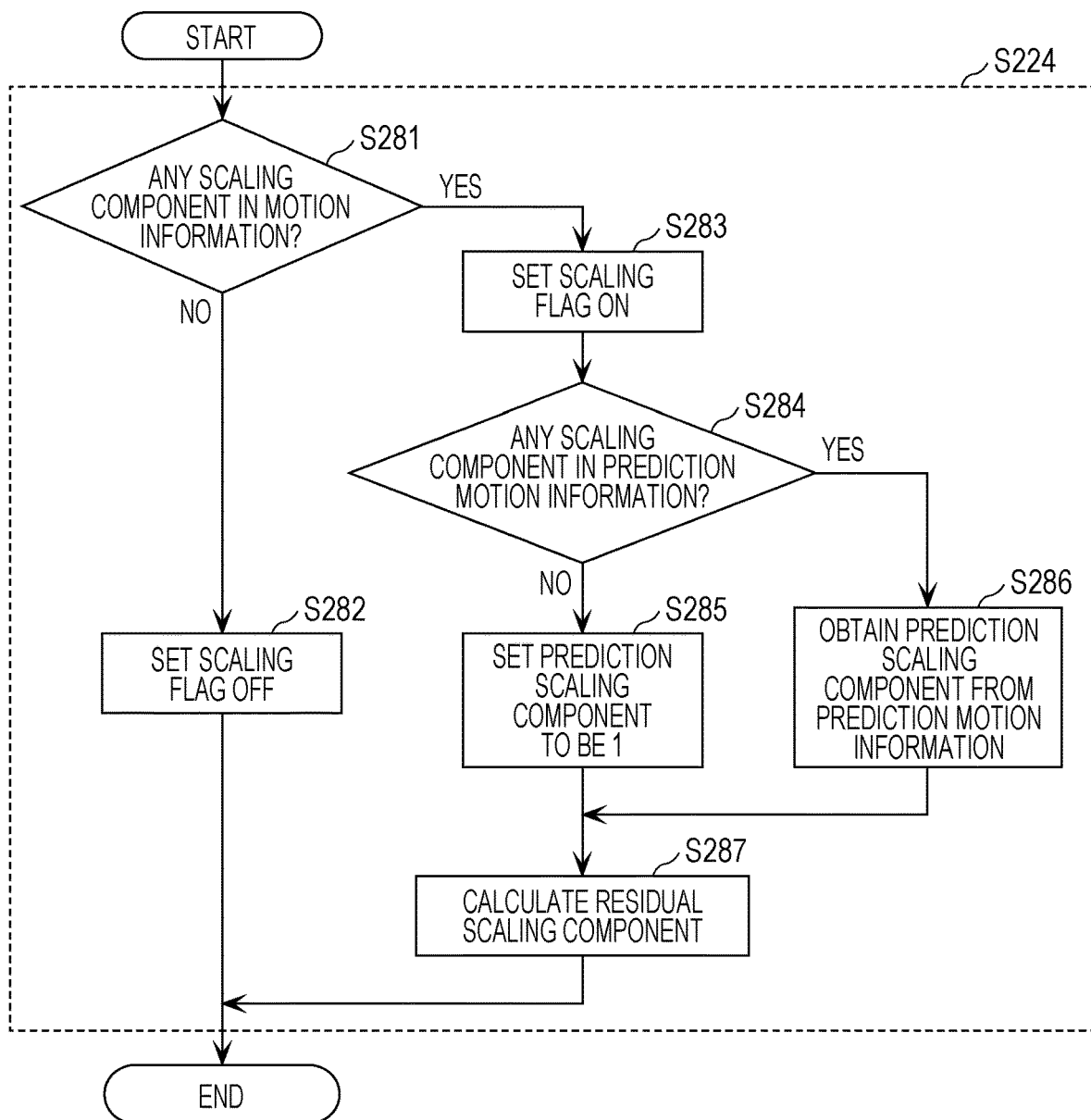
FIG. 13 is a flowchart illustrating an example of a residual scaling component calculation process in accordance with the first embodiment.

FIG. 13 is a flowchart of this scaling component calculation process (S224).

First, the motion information calculation unit 144 determines whether or not the motion information 151 estimated in step S142 includes a scaling component (S281). For example, as in step S241 or S261, the motion information calculation unit 144 may determine whether or not the scaling component is equal to 0 (the value thereof is equal to 1) or may compare the magnitude of the scaling component with a certain value. Also, the motion information calculation unit 144 may switch the certain value in accordance with features of images. For example, in the case of a video obtained by performing zoom-in or zoom-out, the motion information calculation unit 144 may set a certain value on the basis of a temporal change in the angle of view.

Alternatively, the motion information calculation unit 144 may always determine that the motion information 151 includes a scaling component if the image has features for which the scaling component is likely to greatly contribute to an improvement of the prediction accuracy; otherwise, the motion information calculation unit 144 may always determine that the motion information 151 does not include a scaling component. For example, in the case where the input image 121 is a video obtained by performing zoom-in or zoom-out, the motion information calculation unit 144 may always determine that the motion information 151 includes a scaling component. In the case where it is determined that the motion information 151 always includes a scaling component, for example, the value of the scaling component is determined in advance on the basis of a temporal change in the angle of view, and the motion information calculation unit 144 may always use that value.

Alternatively, the motion information calculation unit 144 may determine that the motion information 151 does not include a scaling component in the case where it has been determined in step S190 of FIG. 8 or step S210 of FIG. 9 that scaling is not selected.

If the motion information 151 does not include a scaling component (NO in S281), the motion information calculation unit 144 sets a scaling flag, which indicates that "scaling is present", OFF, and attaches the scaling flag to the motion information 133 to be coded (S282).

If the motion information 151 includes a scaling component (YES in S281), the motion information calculation unit 144 sets the scaling flag ON, and attaches the scaling flag to the motion information 133 (S283).

Then, the motion information calculation unit 144 determines whether or not the prediction motion information derived in step S221 includes a scaling component (S284).

If the prediction motion information does not include a scaling component (NO in S284), the motion information calculation unit 144 sets the prediction scaling component to be equal to 1 (S285). If the prediction motion information includes a scaling component (YES in S284), the motion information calculation unit 144 sets the prediction scaling component to be equal to the scaling component included in the prediction motion information (S286).

The motion information calculation unit 144 subtracts the prediction scaling component obtained in step S285 or S286 from the scaling component of the motion information 151 obtained in step S142 to calculate a residual scaling component, and attaches the calculated residual scaling component to the motion information 133 (S287).

Lastly, the motion information calculation unit 144 calculates a residual shearing component which is residual motion information of the shearing component (S225).

Figure 14:
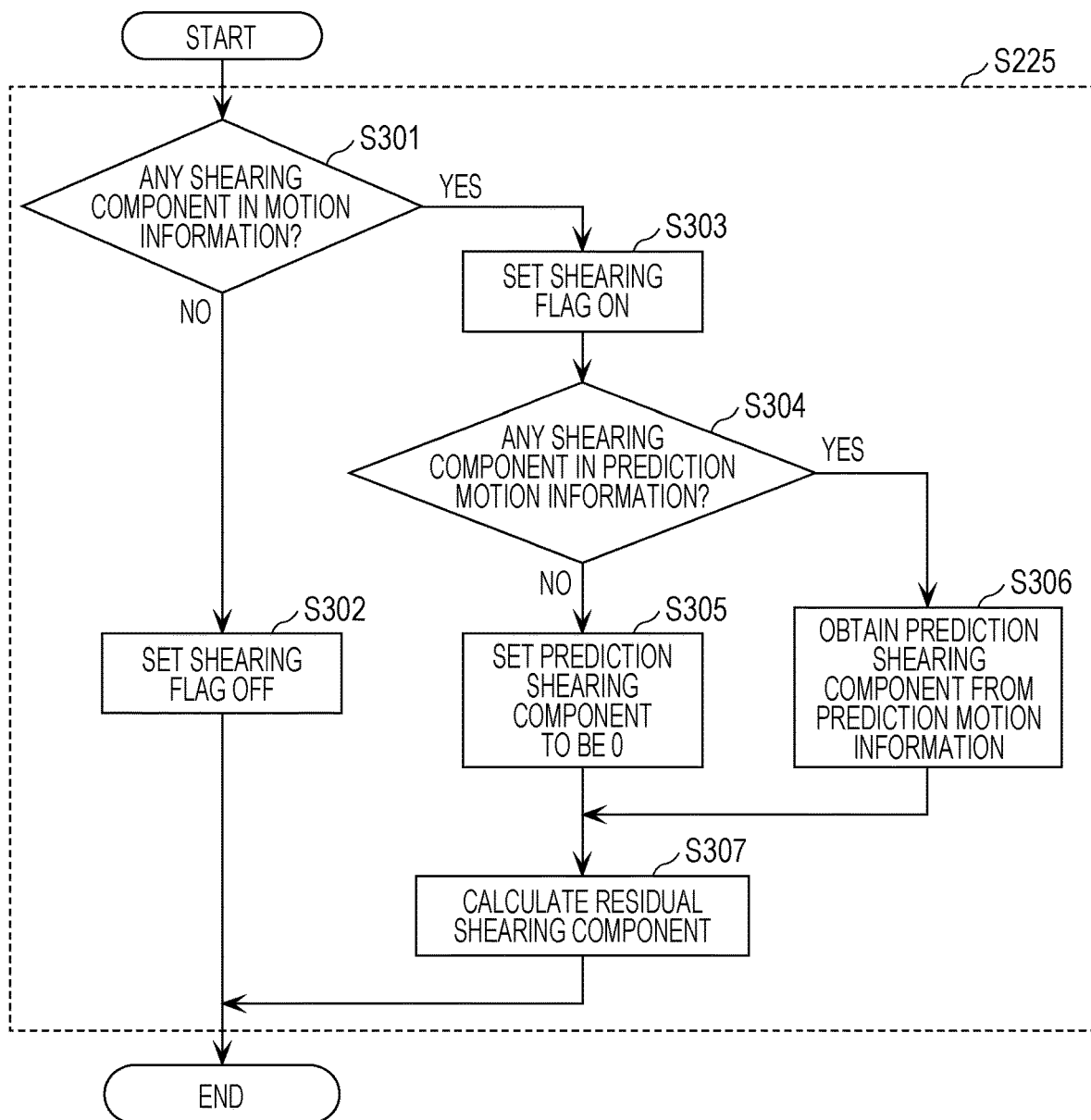
FIG. 14 is a flowchart illustrating an example of a residual shearing component calculation process in accordance with the first embodiment.

FIG. 14 is a flowchart of this residual shearing component calculation process (S225).

First, the motion information calculation unit 144 determines whether or not the motion information 151 estimated in step S142 includes a shearing component (S301). For example, as in step S241, S261, or S281, the motion information calculation unit 144 may determine whether or not the shearing component is equal to 0 or may compare the magnitude of the shearing component with a certain value. Also, the motion information calculation unit 144 may switch the certain value in accordance with features of images. Alternatively, in the case where features of the image satisfy a certain condition, the motion information calculation unit 144 may always determine that the motion information 151 includes a shearing component (no shearing component).

Alternatively, the motion information calculation unit 144 may determine that the motion information 151 does not include a shearing component in the case where it has been determined in step S193 of FIG. 8 or step S213 of FIG. 9 that shearing is not selected.

If the motion information 151 does not include a shearing component (NO in S301), the motion information calculation unit 144 sets a shearing flag, which indicates that "shearing is present", OFF, and attaches the shearing flag to the motion information 133 to be coded (S302).

If the motion information 151 includes a shearing component (YES in S301), the motion information calculation unit 144 sets the shearing flag ON, and attaches the shearing flag to the motion information 133 (S303).

Then, the motion information calculation unit 144 determines whether or not the prediction motion information derived in step S221 includes a shearing component (S304).

If the prediction motion information does not include a shearing component (NO in S304), the motion information calculation unit 144 sets the prediction shearing component to be equal to 0 (S305). If the prediction motion information includes a shearing component (YES in S304), the motion information calculation unit 144 sets the prediction shearing component to be equal to the shearing component included in the prediction motion information (S306).

The motion information calculation unit 144 subtracts the prediction shearing component obtained in step S305 or S306 from the shearing component of the motion information 151 obtained in step S142 to calculate a residual shearing component, and attaches the calculated residual shearing component to the motion information 133 (S307).

After the above processing, the process of step S144 ends.

Note that the processing order of steps S222 to S225 is not limited to this particular order, and may be any given order. Alternatively, some or all of these processing steps may be performed in parallel. In addition, as described before, in the case where transform components usable for coding are restricted based on the size of the current block or the like, the motion information calculation unit 144 may perform these processes only on the permitted transform components.

Figure 15:
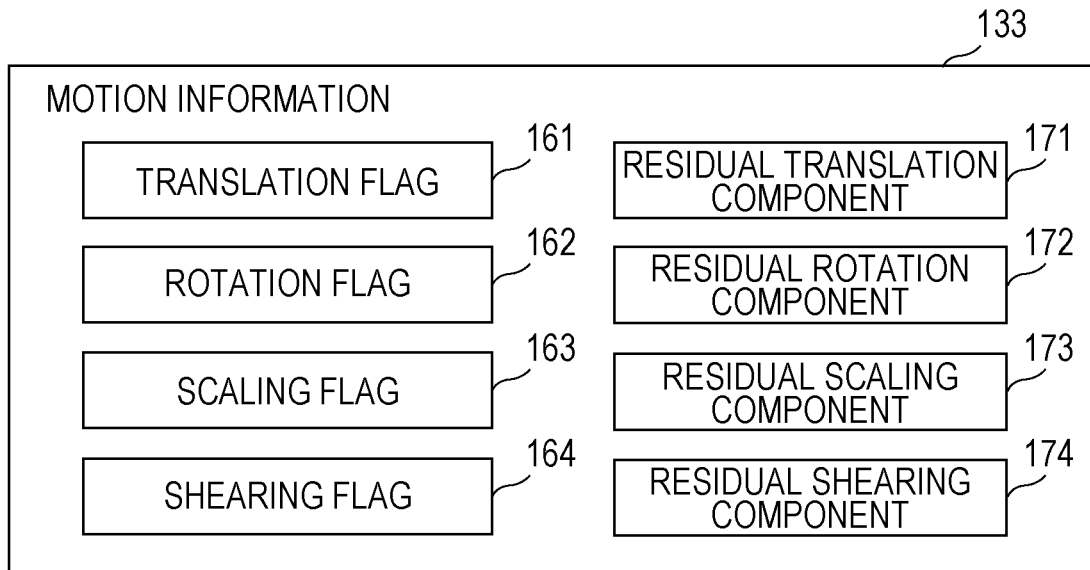
FIG. 15 is a diagram illustrating an example of the motion information in accordance with the first embodiment.
Figure 16:
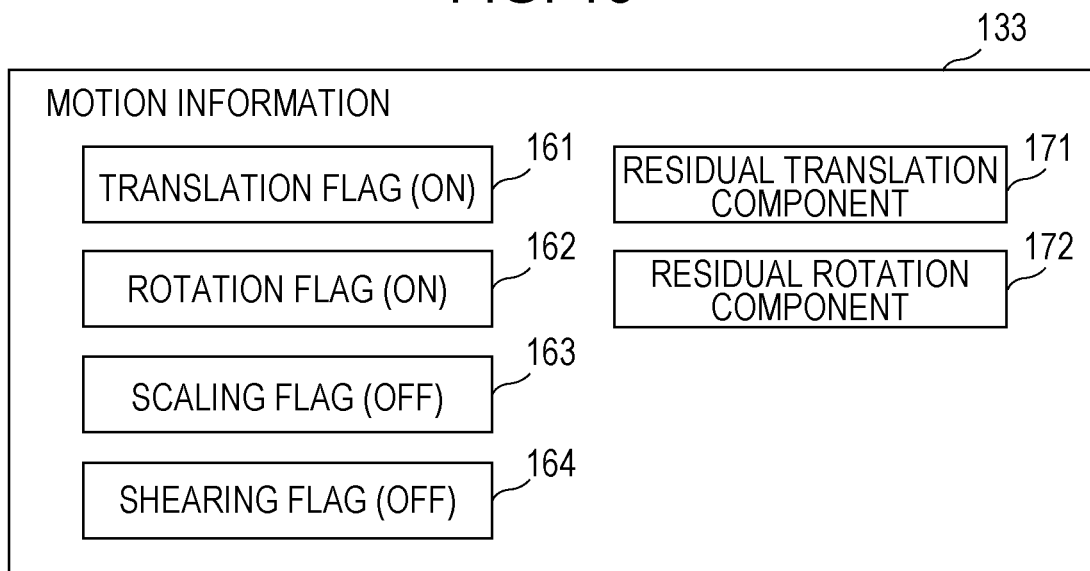
FIG. 16 is a diagram illustrating an example of the motion information in accordance with the first embodiment.

FIGS. 15 and 16 are diagrams each illustrating an example of the motion information 133 to be coded. As illustrated in FIG. 15, the motion information 133 includes a translation flag 161, a rotation flag 162, a scaling flag 163, a shearing flag 164, a residual translation component 171, a residual rotation component 172, a residual scaling component 173, and a residual shearing component 174. Meanings of these pieces of information are as described above.

Also, when the flag is ON, the motion information 133 includes a residual motion component corresponding to the flag. For example, as illustrated in FIG. 16, when the translation flag 161 and the rotation flag 162 are ON and the scaling flag 163 and the shearing flag 164 are OFF, the motion information 133 includes the residual translation component 171 and the residual rotation component 172 and does not include the residual scaling component 173 and the residual shearing component 174.

With the above configuration, the image coding apparatus 100 according to the first embodiment selects only necessary transform components by using features of images or the like, and codes information representing the selected transform components (for example, the translation flag, the rotation flag, the scaling flag, and the shearing flag) and the selected transform components. In this way, the image coding apparatus 100 can selectively use only effective transform components, and thus can improve the coding efficiency. As described above, the image coding apparatus 100 is capable of flexibly selecting various transforms and reducing the amount of motion information necessary for generating a prediction image, and thus can improve the coding efficiency.

Also, the image coding apparatus 100 selects transform components by using an estimation result of a type of transform that is present in an image to be coded, the size of the prediction block, or the like. With this configuration, the image coding apparatus 100 can limit kinds of motion information to be searched for during a prediction process, and thus can achieve a higher processing speed.

In the first embodiment, an affine matrix is used as the motion information, the affine matrix including components of translation, rotation, scaling, and shearing; however, types of transform components included in the affine matrix are not limited to these particular types.

For example, a perspective transform matrix capable of representing a perspective transform may be used in place of an affine matrix. The perspective transform matrix may express trapezoidal change. With this configuration, the quality of the prediction block can be further improved, and an improvement of the coding efficiency can be expected.

Accordingly, it is sufficient that the image coding apparatus 100 according to the first embodiment can divide a motion component into a plurality of transform components, and determine, for each transform component, whether or not the transform component is used. That is, the image coding apparatus 100 may use any matrix or transform other than the aforementioned ones or may divide the motion information into any transform components different from the aforementioned ones.

Also, the foregoing description has used an example in which the flags are provided for the respective transform components on a block-by-block basis in steps S242, S243, S262, S263, S282, S283, S302, and S303 during inter prediction; however, the flags may be specified on an image-by-image basis, a sequence-by-sequence basis, or an image-subarea-by-image-subarea basis. For example, this subarea is an area obtained by dividing an image in four. With this configuration, all blocks included in an image or sequence specified prior to inter prediction are coded using a transform component of the same type. As a result, the determination process that is performed on a block-by-block basis can be omitted, and thus the coding efficiency can be further improved. Also, the number of flags included in the bitstream can be reduced, and thus the coding efficiency can be further improved.

Also, in the case where respective transform components are not included in the prediction motion information, 0, 0, 1, and 0 are substituted into the corresponding prediction transform components in steps S245, S265, S285, and S305, respectively; however, the values that are substituted are not limited to these particular ones. For example, in the case where the entire image is rotated, an angle determined in accordance with features of the image may be substituted into the prediction rotation component. Further, a process for substituting a certain angle value, such as 0, into the prediction transform component and a process for substituting an angle value determined in accordance with features of the image or the like into the prediction transform component may be switched between in accordance with a certain condition. In the case where the motion information includes a transform component but the prediction motion information does not include the transform component, a value of the residual motion information can be made smaller by performing prediction while switching between values to be substituted. With this configuration, the coding efficiency can be further improved.

Second Embodiment

In the first embodiment, the example has been described in which flags each corresponding to one of a plurality of transforms are used as information that represents whether or not the transform is used. In a second embodiment, a rank (coding level) is associated with a combination of various transform components, and information that specifies this coding level is used as the information.

In the second embodiment, for example, processes described below are performed in place of the above-described processes of step S162 and S163.

FIG. 17 is a diagram illustrating an example of a relationship between the coding level and the transform components. As illustrated in FIG. 17, for example, a coding level 1 encompasses translation, a coding level 2 encompasses rotation and scaling, and a coding level 3 encompasses shearing.

The coding information selection unit 141 selects the coding level in accordance with a condition, such as features of the image or a permitted bandwidth.

Then, the coding information selection unit 141 selects transform components encompassed by the coding levels that are equal to or lower than the selected coding level. For example, in the case of the coding level 2, three transform components encompassed by the coding levels 2 and 1, that is, translation, rotation, and scaling, are selected.

Also, coding level information 181 which represents the selected coding level is attached to the motion information 133 to be coded.

Figure 18:
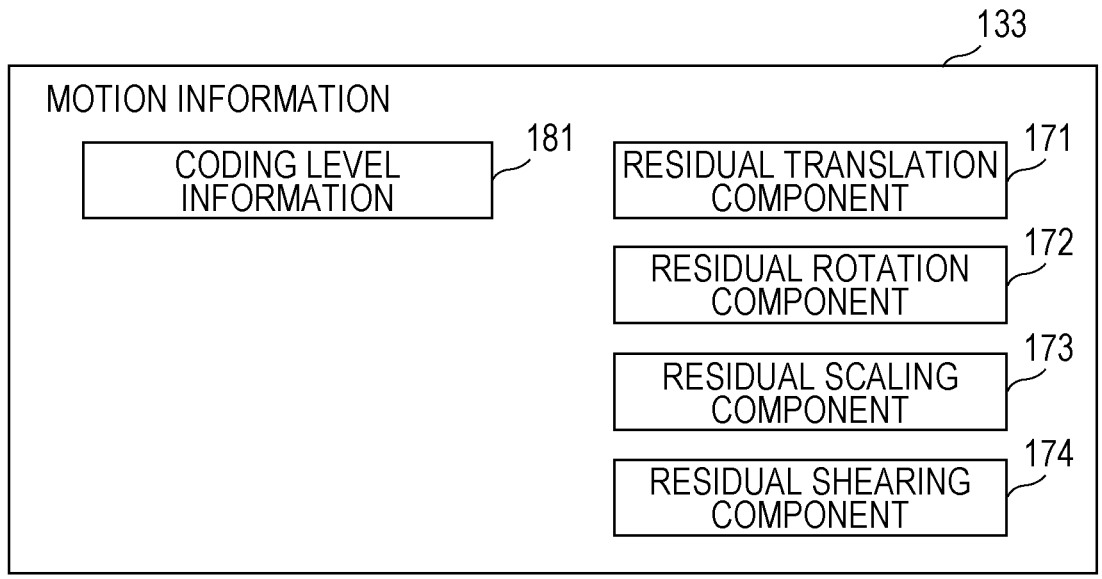
FIG. 18 is a diagram illustrating an example of motion information in accordance with the second embodiment.
Figure 19:
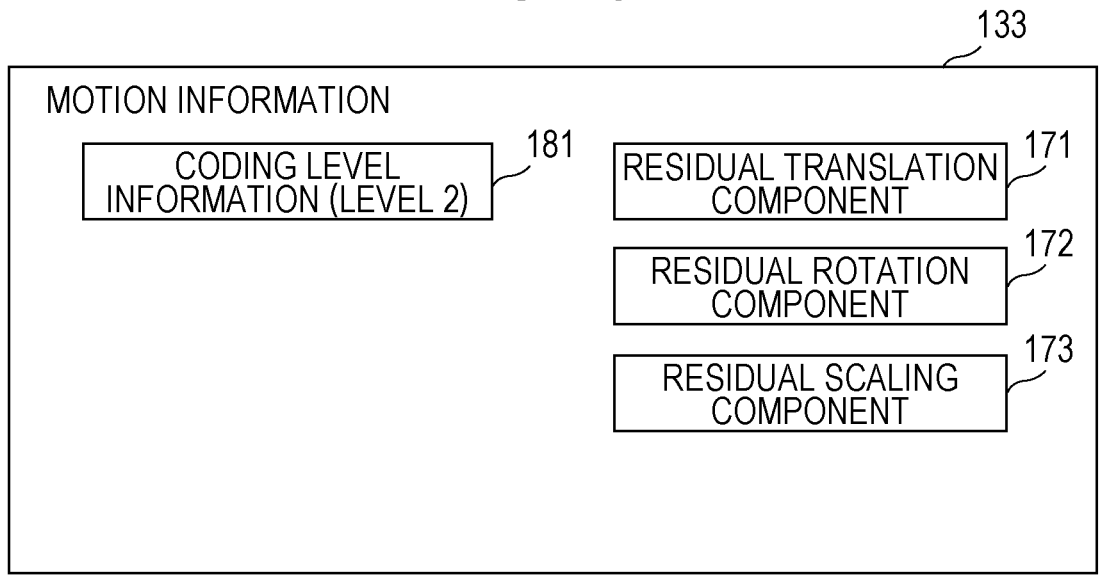
FIG. 19 is a diagram illustrating an example of the motion information in accordance with the second embodiment.

FIGS. 18 and 19 are diagrams each illustrating an example of the motion information 133 to be coded. As illustrated in FIG. 18, the motion information 133 includes the coding level information 181, the residual translation component 171, the residual rotation component 172, the residual scaling component 173, and the residual shearing component 174.

The motion information 133 includes residual motion components corresponding to transform components encompassed by coding levels that are equal to or lower than the coding level represented by the coding level information 181. For example, as illustrated in FIG. 19, in the case where the coding level information 181 represents the coding level 2, the motion information 133 includes the residual translation component 171, the residual rotation component 172, and the residual scaling component 173 corresponding to the coding levels 1 and 2 but does not include the residual shearing component 174 corresponding to the coding level 3.

With the above configuration, in the second embodiment, an amount of information necessary for coding can be further reduced, and thus the coding efficiency can be improved. Although the example of using the levels regarding various transforms has been described here, the configuration is not limited to this one, and information that represents a combination of transform components can be used. For example, although the example in which all transform components encompassed by levels that are equal to or lower than the selected level are specified has been described above, the following information may be used. For example, the configuration may be made as follows: none of the transform components are used if the selected level is level 0; only translation is used if the selected level is level 1; translation and rotation are used if the selected level is level 2; translation and scaling are used if the selected level is level 3; rotation and scaling are used if the selected level is level 4; translation, rotation, and scaling are used if the selected level is level 5; translation and shearing are used if the selected level is level 6; and translation, rotation, scaling, and shearing are used if the selected level is level 7. A combination of transform components may be specified for each level in this way, and transform components associated with the level may be selected.

Third Embodiment

An examination made by the inventors indicates that, among translation, rotation, scaling, and shearing, shearing is less likely to contribute to an improvement of the prediction accuracy than the other transforms. Accordingly, in a third embodiment, an example will be described in which priorities are assigned to a plurality of translation components.

According to a first method for assigning priorities to a plurality of transform components, the block size threshold is changed as in the process of step S163 illustrated in FIG. 9 described above. Specifically, the threshold for shearing is set to be larger than those of the other transforms, such as rotation, which can improve the prediction accuracy by a large amount. With this configuration, the use of a transform component that is less likely to improve the prediction accuracy can be restricted in the case of a small block size, and thus a decrease in the coding efficiency can be suppressed. Similarly, the scaling is also less likely to contribute to an improvement of the prediction accuracy in the case of a small block size, and thus a larger threshold is set for scaling than those for translation and rotation.

An examination made by the inventors using a general moving image indicates that the prediction accuracy is more likely to be improved in the order of translation, rotation, scaling, and shearing although the order varies depending on features of the image. Accordingly, priorities are set in this order. With this configuration, selection of a transform component assigned a low priority can be restricted in accordance with a state, such as features, size, or band of the image.

A second method for assigning priorities to a plurality of transform components will be described below. Here, an example of a method for restricting shearing will be described.

First, how to set coefficients of an affine transform will be briefly described. As described in Taku Arakawa et al., "A Fast Estimation on Motion Compensation using an Affine Transform (Afin Henkan wo Mochiita Ugoki Hosho Yosoku no Kousokuka)", The Journal of The Institute of Image Information and Television Engineers Vol. 51 No. 7, Jul. 20, 1997, pp. 1114-1117, coefficients of an affine matrix are set by setting an evaluation function E(a) which is expressed by (Eq. 3) below and has the affine matrix a as its variable and by solving the minimization problem. That is, coefficients (motion information) that minimize the evaluation function E(a) are derived.

$$E(a) = \sum_x \sum_y (I(x, y) - \hat{I}(x, y, a))^2 \qquad \text{(Eq. 3)}$$

In the case where shearing is restricted, orthogonality between the x-direction axis and the y-direction axis is preserved before and after an affine transform. That is, the coefficients of the affine transform represented by (Eq. 2) above need to satisfy a constraint of (Eq. 4) below.

$$ab+de=0 \qquad \text{(Eq. 4)}$$

Accordingly, the constraint is added to the evaluation function represented by (Eq. 3) above as represented by (Eq. 5) below. This constraint makes the value of the evaluation function E(a) increase as the value of the shearing component increases, and thus coefficients including the shearing component are less likely to be selected. This method is called a penalty method. Also, the influence of the constraint becomes larger as a positive constant μ increases. By determining coefficients of the affine matrix that minimize the evaluation function E(a) represented by (Eq. 5) below in this way, coefficients in which the shearing component is restricted can be calculated.

$$E(a) = \sum_x \sum_y (I(x, y) - \hat{I}(x, y, a))^2 + \mu(ab + de) \qquad \text{(Eq. 5)}$$

The inventors calculated the coefficients by setting the constant μ small and solving the minimization problem, and then by repeatedly performing, until the constant μ reaches a predetermined value, a process in which the optimum solution of a result obtained by performing a search a predetermined number of times is set as a new initial value and the minimization problem is solved with the value of the constant μ made larger. Note that the method for determining the coefficients is not limited to this method.

Although the method for restricting (assigning a low priority to) shearing has been described here, a similar method is applicable to other transforms.

Other Modifications

Although the method for coding residual motion information which represents a difference between the motion information and the prediction motion information has been described in the first to third embodiments above, the method used is not limited to this one.

For example, HEVC has a motion prediction method called a merge mode. In this merge mode, residual information is not coded. Instead, a prediction motion vector selected from among a plurality of prediction motion vector candidates is used as a motion vector of the current block. Then, selection information that represents the selected prediction motion vector candidate is coded. Also in such a case, the image coding apparatus may select one or more transform components from among a plurality of transform components and generate a prediction image using the selected transform components as in the first to third embodiments. Also, the image coding apparatus may code information that represents selected (to-be-used) transform components (the flags or the coding level information).

For example, the image coding apparatus codes the selected transform components on the basis of whether or not prediction information obtained from prediction based on pieces of motion information for neighboring blocks adjacent to the current block in space or time includes the individual transform components. In this case, if all pieces of motion information for the plurality of neighboring blocks include rotation components, the image coding apparatus may use an average of these rotation components as the rotation component of the current block. Also, if only one of pieces of motion information for a plurality of neighboring blocks includes the rotation component and the rotation component is smaller than a certain value, the image coding apparatus may decide not to use the rotation component for the current block. Alternatively, the image coding apparatus may calculate an average of the plurality of rotation components by setting the rotation components of the rest of the plurality of neighboring blocks to be equal to 0, and use the calculated average as the rotation component of the current block.

Methods such as the method using an average described above and a method using a time-based scaling process are known, and such modifications may be applied to the first to third embodiments.

Fourth Embodiment

In a fourth embodiment, one embodiment of an image decoding apparatus that decodes a bitstream generated by the image coding apparatus according to the first embodiment will be described.

Figure 20:
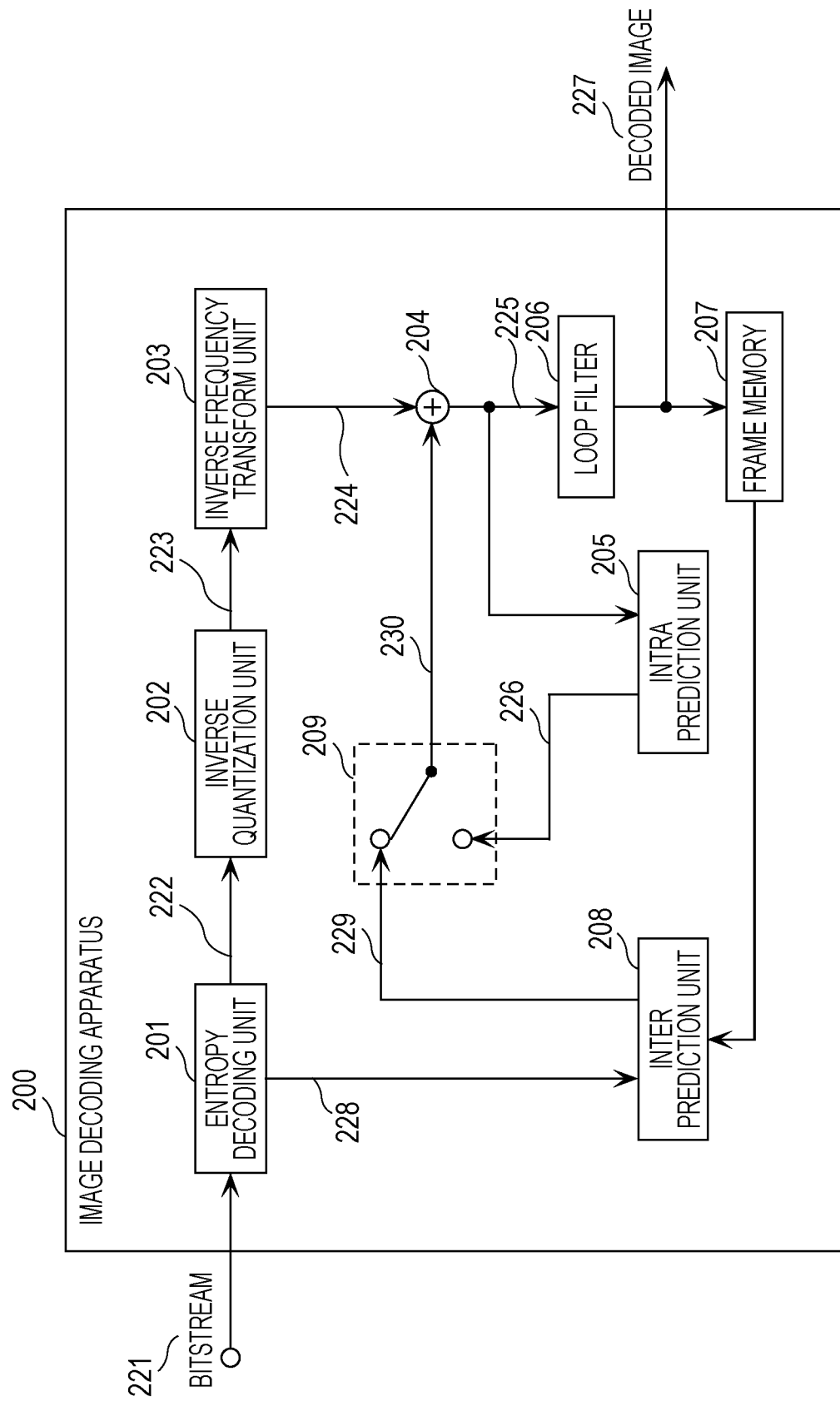
FIG. 20 is a block diagram illustrating a configuration of an image decoding apparatus in accordance with a fourth embodiment.

FIG. 20 is a block diagram of an image decoding apparatus 200 according to the fourth embodiment. The image decoding apparatus 200 includes an entropy decoding unit 201, a inverse quantization unit 202, an inverse transform unit 203, an addition unit 204, an intra prediction unit 205, a loop filter 206, a frame memory 207, an inter prediction unit 208, and a switching unit 209.

The image decoding apparatus 200 decodes a bitstream 221 to generate a decoded image 227. For example, the bitstream 221 is generated by the image coding apparatus 100.

Figure 21:
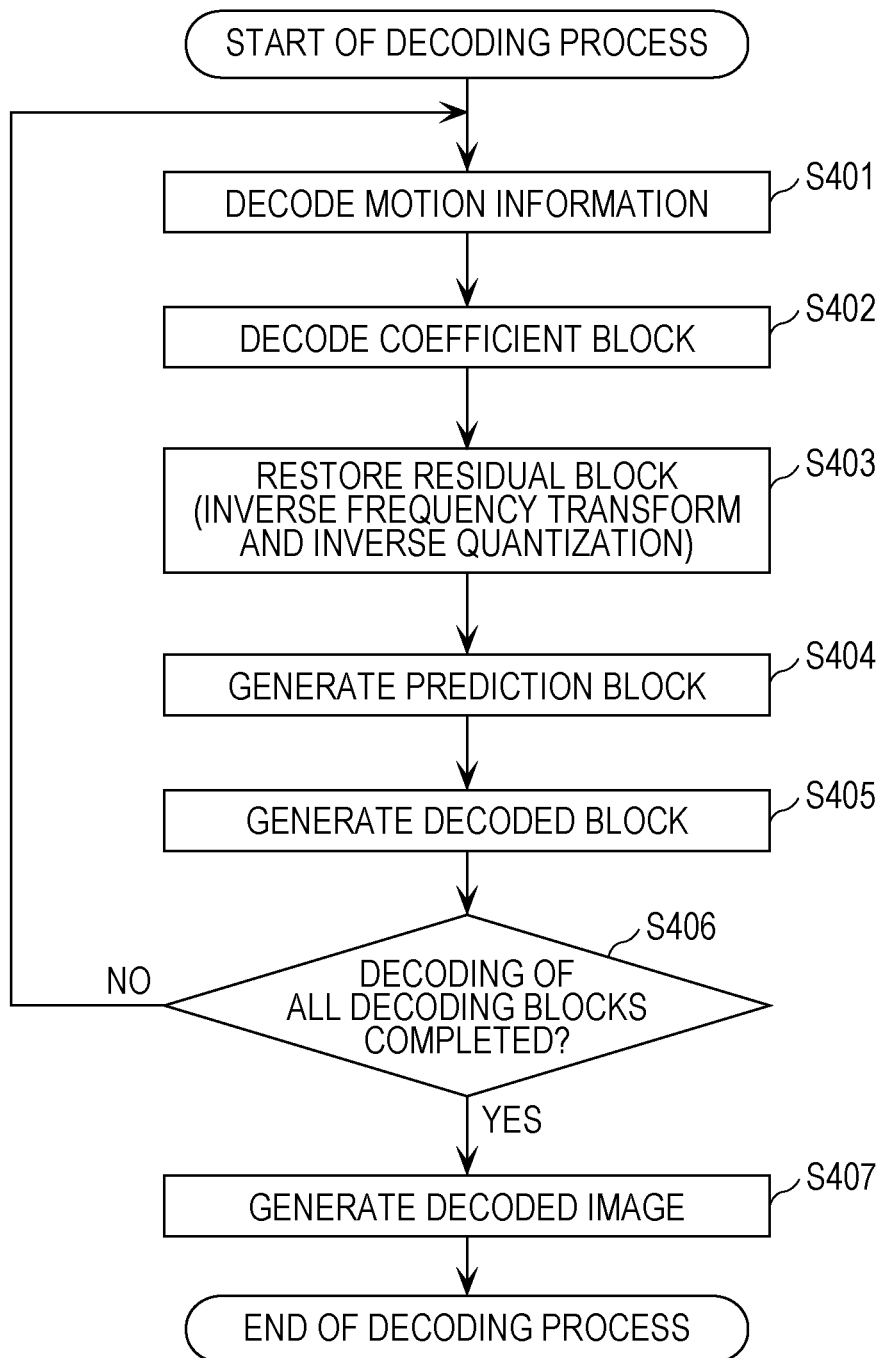
FIG. 21 is a flowchart illustrating an operation process performed by the image decoding apparatus in accordance with the fourth embodiment.

FIG. 21 is a flowchart of an image decoding process according to the fourth embodiment.

First, the entropy decoding unit 201 decodes motion information 228 from the bitstream 221, which has been obtained by coding a still image or moving image including one or more pictures (S401). The entropy decoding unit 201 also decodes a coefficient block 222 from the bitstream 221 (S402).

The inverse quantization unit 202 performs inverse quantization on the coefficient block 222 to generate a coefficient block 223. The inverse transform unit 203 performs inverse transform on the coefficient block 223 to obtain a residual block 224 (S403).

Then, the intra prediction unit 205 or the inter prediction unit 208 generates a prediction block 230 by using the motion information 228 decoded in step S401 and a decoded block (S404). Specifically, the intra prediction unit 205 generates a prediction block 226 through an intra prediction process. The inter prediction unit 208 generates a prediction block 229 through an inter prediction process. The switching unit 209 outputs one of the prediction blocks 226 and 229 as the prediction block 230.

Then, the addition unit 204 adds the residual block 224 and the prediction block 230 together to generate a decoded block 225 (S405). This decoded block 225 is used in an intra prediction process performed by the intra prediction unit 205.

Then, the image decoding apparatus 200 determines whether or not all blocks included in the bitstream 221 have been decoded (S406). For example, the image decoding apparatus 200 makes this determination in accordance with whether or not the input bitstream 221 has ended. If decoding of all blocks has not been completed (NO in S406), processing starting from step S401 is performed on the next block. If decoding of all blocks included in the bitstream 221 has ended (YES in S406), the loop filter 206 combines all the decoded blocks together and performs a loop filter process to generate the decoded image 227 (reconstructed image) (S407). The frame memory 207 stores the decoded image 227 therein. This decoded image 227 is used in an inter prediction process performed by the inter prediction unit 208.

Note that inverse quantization and inverse transform of step S403 may be performed one by one as separate processes or may be performed collectively. According to currently dominant coding standards such as HEVC, inverse quantization and inverse transform are performed collectively. Also, like at the coding side (the first embodiment), expressions such as scaling may be used at the decoding side.

Figure 22:
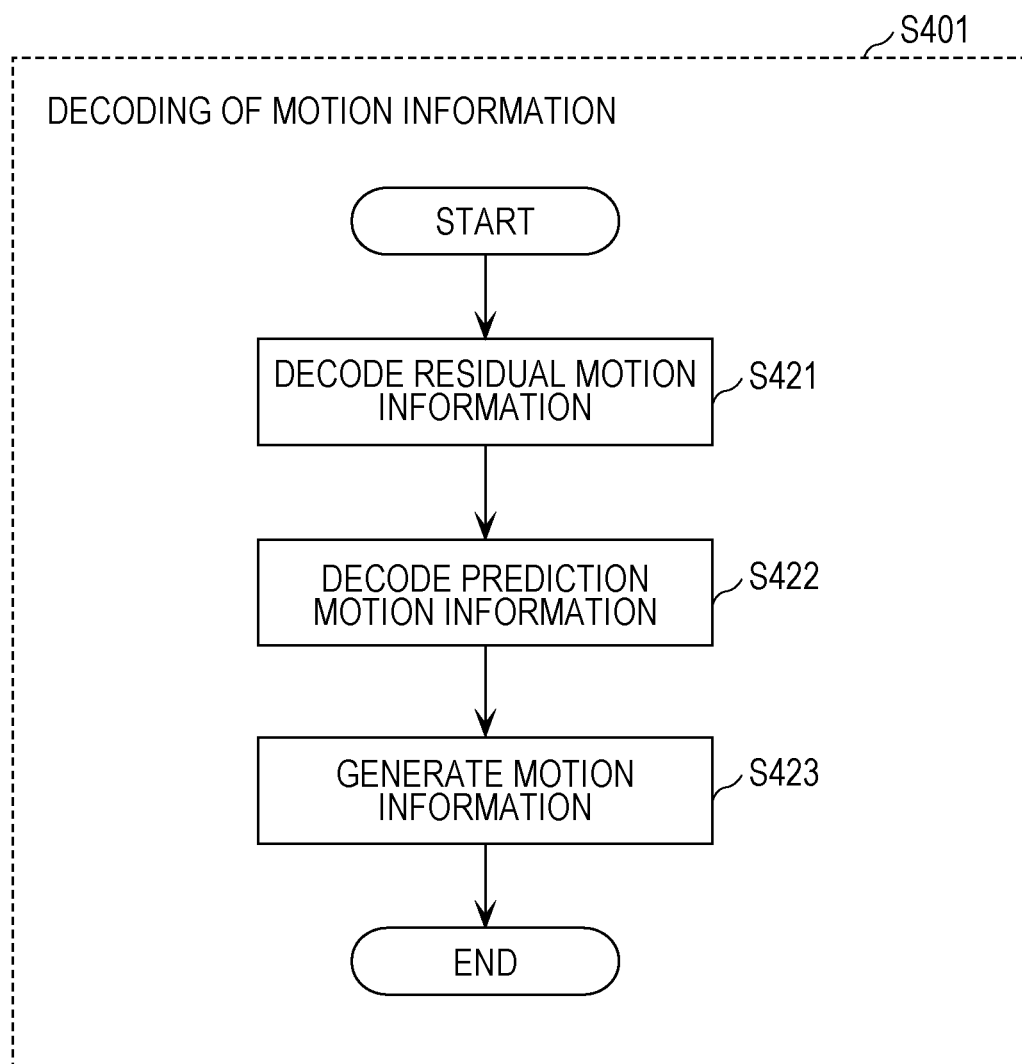
FIG. 22 is a flowchart illustrating an example of a motion information decoding process in accordance with the fourth embodiment.

Next, the motion information decoding process (S401) will be described with reference to FIG. 22. FIG. 22 is a flowchart of the motion information decoding process (S401) in accordance with the fourth embodiment.

First, the entropy decoding unit 201 decodes residual motion information from the bitstream 221 (S421). The entropy decoding unit 201 also decodes information used for deriving prediction motion information (S422). Note that the information used for deriving prediction motion information and the residual motion information are included in the motion information 228. Then, the inter prediction unit 208 derives the prediction motion information from the information obtained in step S422, and generates the motion information from the derived prediction motion information and the residual motion information obtained in step S421 (S423).

Decoding of the residual motion information (S421) and generation of the motion information (S423) will be described in detail below.

Figure 23:
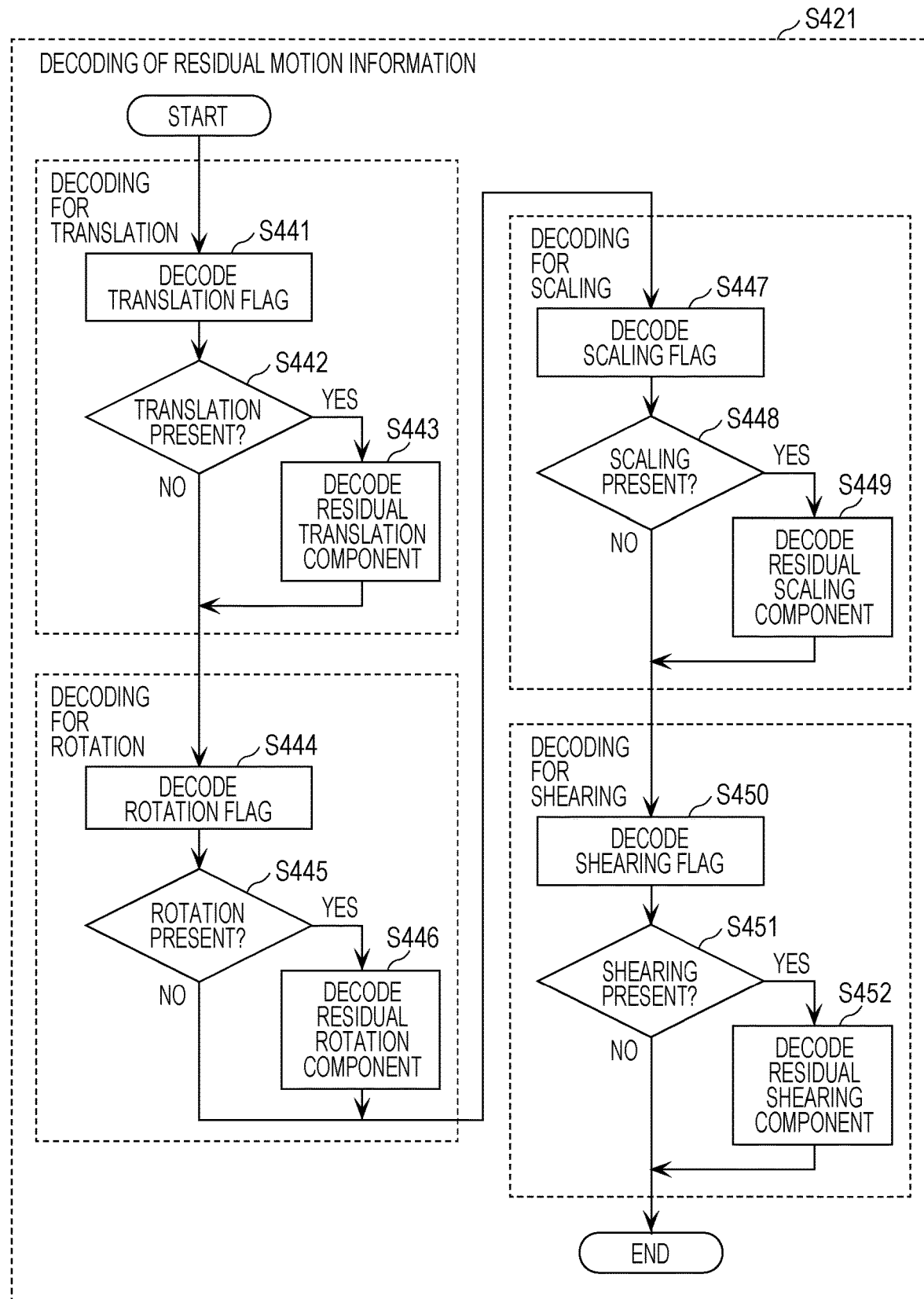
FIG. 23 is a flowchart illustrating an example of a residual motion information decoding process in accordance with the fourth embodiment.

The residual motion information decoding process (S421) will be described with reference to FIG. 23. FIG. 23 is a flowchart of the residual motion information decoding process (S421) in accordance with the fourth embodiment.

First, the entropy decoding unit 201 performs a decoding process on a residual translation component (S441 to S443). First, the entropy decoding unit 201 decodes, from the bitstream 221, a translation flag which indicates whether or not translation is present (indicates whether or not the motion information 228 includes the residual translation component) (S441). Note that the structure of the motion information 228 and meanings of various pieces of information included in the motion information 228 are the same as the structure of the motion information 133 and meanings of various pieces of information included in the motion information 133 in accordance with the first embodiment. Then, the entropy decoding unit 201 determines whether or not translation is present by using the translation flag (S442).

If the translation flag indicates that translation is present (YES in S442), the entropy decoding unit 201 decodes the residual translation component from the bitstream 221 (S443). If the translation flag indicates that translation is absent (NO in S442), the entropy decoding unit 201 performs the next processing step (S444) without decoding the residual translation component.

Then, the entropy decoding unit 201 performs a decoding process on a residual rotation component (S444 to S446). The entropy decoding unit 201 decodes, from the bitstream 221, a rotation flag which indicates whether or not rotation is present (indicates whether or not the motion information 228 includes the residual rotation component) (S444). The entropy decoding unit 201 determines whether or not rotation is present by using the rotation flag (S445).

If the rotation flag indicates that rotation is present (YES in S445), the entropy decoding unit 201 decodes the residual rotation component from the bitstream 221 (S446). If the rotation flag indicates that rotation is absent (NO in S445), the entropy decoding unit 201 performs the next processing step (S447).

Then, the entropy decoding unit 201 performs a decoding process on a residual scaling component (S447 to S449). The entropy decoding unit 201 decodes, from the bitstream 221, a scaling flag which indicates whether or not scaling is present (indicates whether or not the motion information 228 includes the residual scaling component) (S447). The entropy decoding unit 201 determines whether or not scaling is present by using the scaling flag (S448).

If the scaling flag indicates that scaling is present (YES in S448), the entropy decoding unit 201 decodes the residual scaling component from the bitstream 221 (S449). If the scaling flag indicates that scaling is absent (NO in S448), the entropy decoding unit 201 performs the next processing step (S450).

Lastly, the entropy decoding unit 201 performs a decoding process on a residual shearing component (S450 to S452). The entropy decoding unit 201 decodes, from the bitstream 221, a shearing flag which represents whether or not a shearing component is present (represents whether or not the motion information 228 includes the residual shearing component) (S450). The entropy decoding unit 201 determines whether or not the shearing component is present by using the shearing flag (S451).

If the shearing flag indicates that shearing is present (YES in S451), the entropy decoding unit 201 decodes the residual shearing component from the bitstream 221 (S452). Then, the entropy decoding unit 201 ends the residual motion information decoding process (S421). If the shearing flag indicates that shearing is absent (NO in S451), the entropy decoding unit 201 ends the residual motion information decoding process (S421).

Next, the motion information generation process (S423) will be described with reference to FIGS. 24 to 28.

Figure 24:
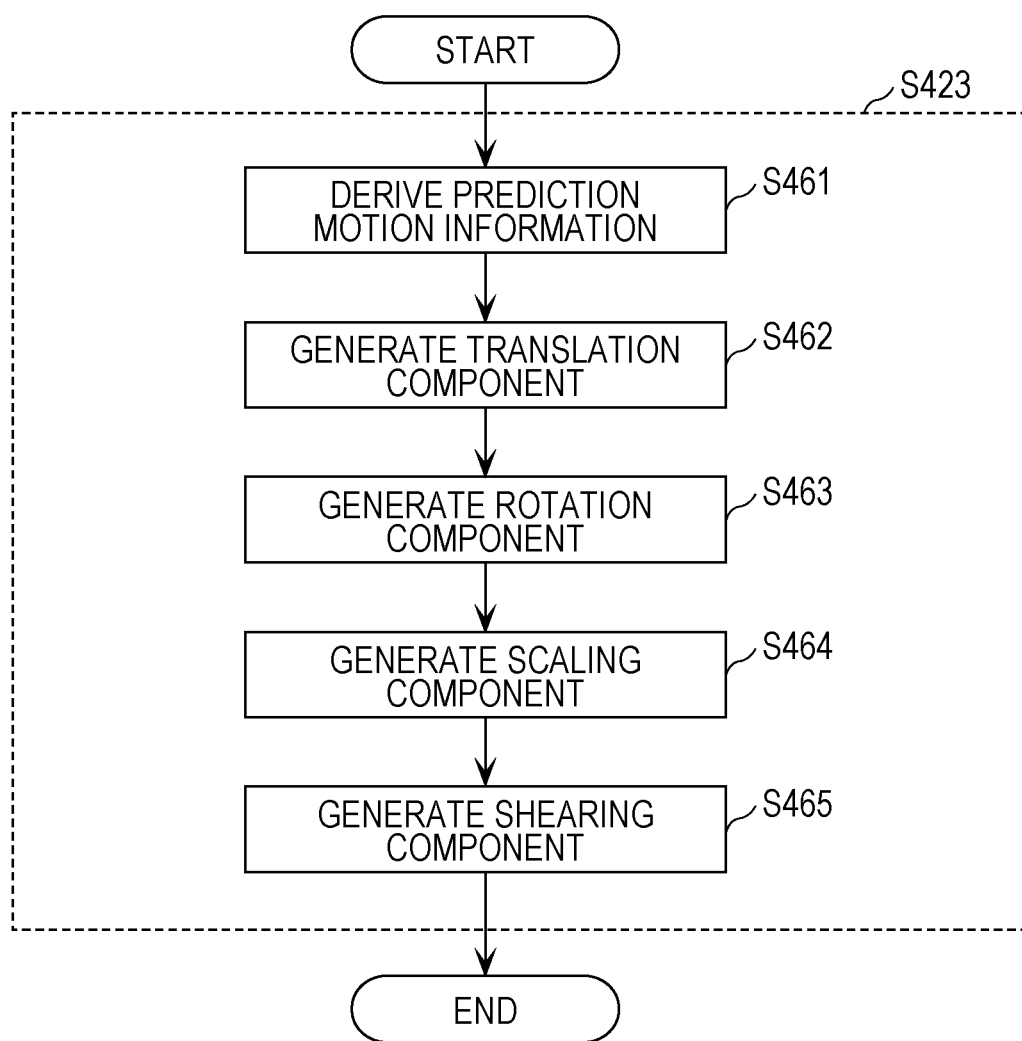
FIG. 24 is a flowchart illustrating an example of a motion information generation process in accordance with the fourth embodiment.

FIG. 24 is a flowchart of the motion information generation process (S423) in accordance with the fourth embodiment.

First, the inter prediction unit 208 derives the prediction motion information using the information obtained in step S422. Specifically, the inter prediction unit 208 obtains pieces of motion information of neighboring decoded blocks adjacent in space or time to the current block to be decoded, and derives the prediction motion information using the obtained pieces of motion information (S461).

Figure 25:
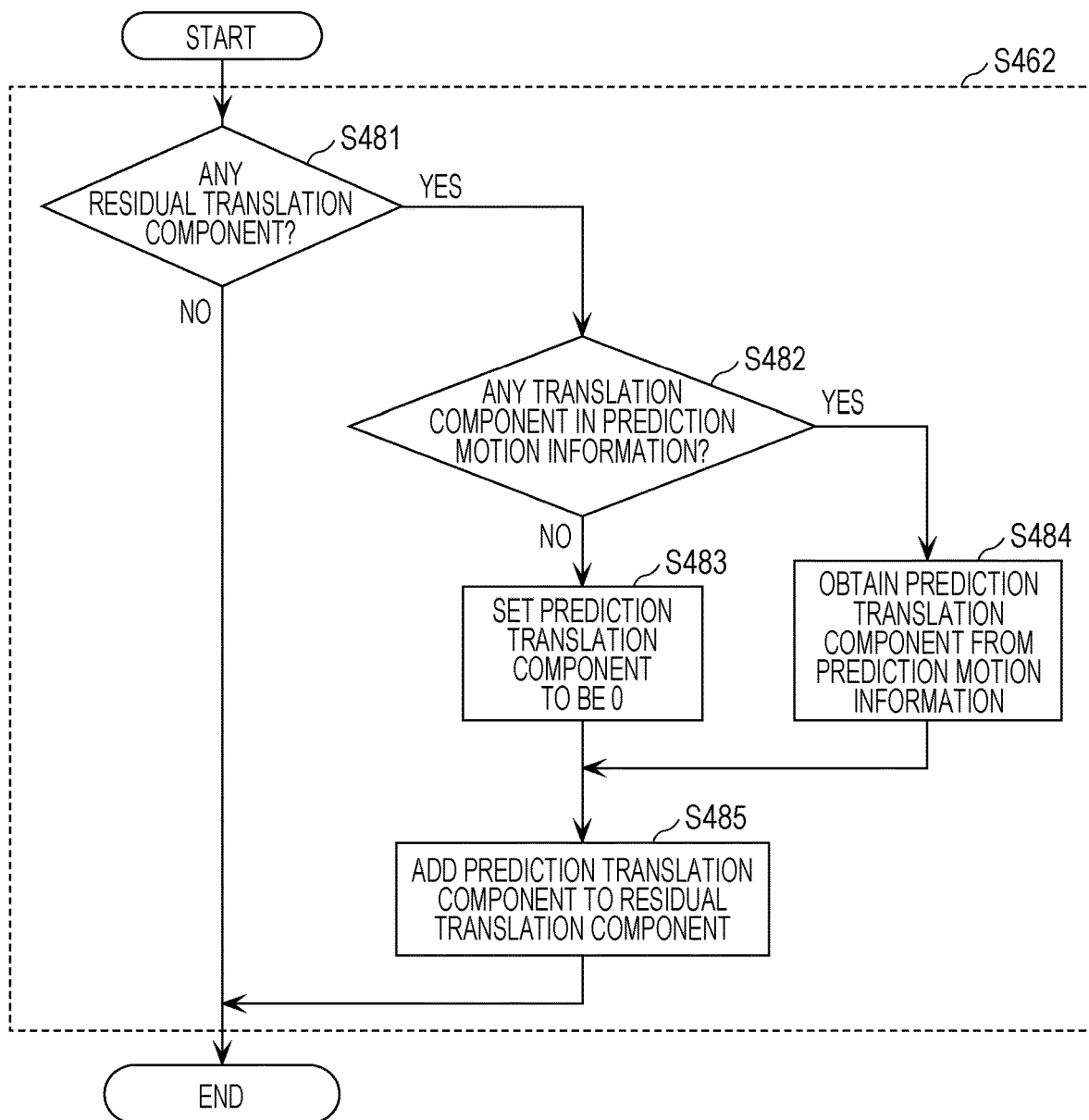
FIG. 25 is a flowchart illustrating an example of a translation component generation process in accordance with the fourth embodiment.

Then, the inter prediction unit 208 generates a translation component from the residual motion information and the prediction motion information (S462). FIG. 25 is a flowchart of this translation component generation process (S462).

First, the inter prediction unit 208 determines whether or not the residual translation component has been obtained in step S421 (S481).

If the residual translation component has been obtained (YES in S481), the inter prediction unit 208 determines whether or not the prediction motion information obtained in step S461 includes a translation component (S482).

If the prediction motion information does not include a translation component (NO in S482), the inter prediction unit 208 sets the prediction translation component to be equal to 0 (S483). If the prediction motion information includes a translation component (YES in S482), the inter prediction unit 208 sets the prediction translation component to be equal to the translation component of the prediction motion information (S484).

The inter prediction unit 208 adds the prediction translation component obtained in step S483 or S484 to the residual translation component to generate the translation component (S485).

If no residual translation component has been obtained (NO in S481), the inter prediction unit 208 ends the process regarding the translation component (S462).

Figure 26:
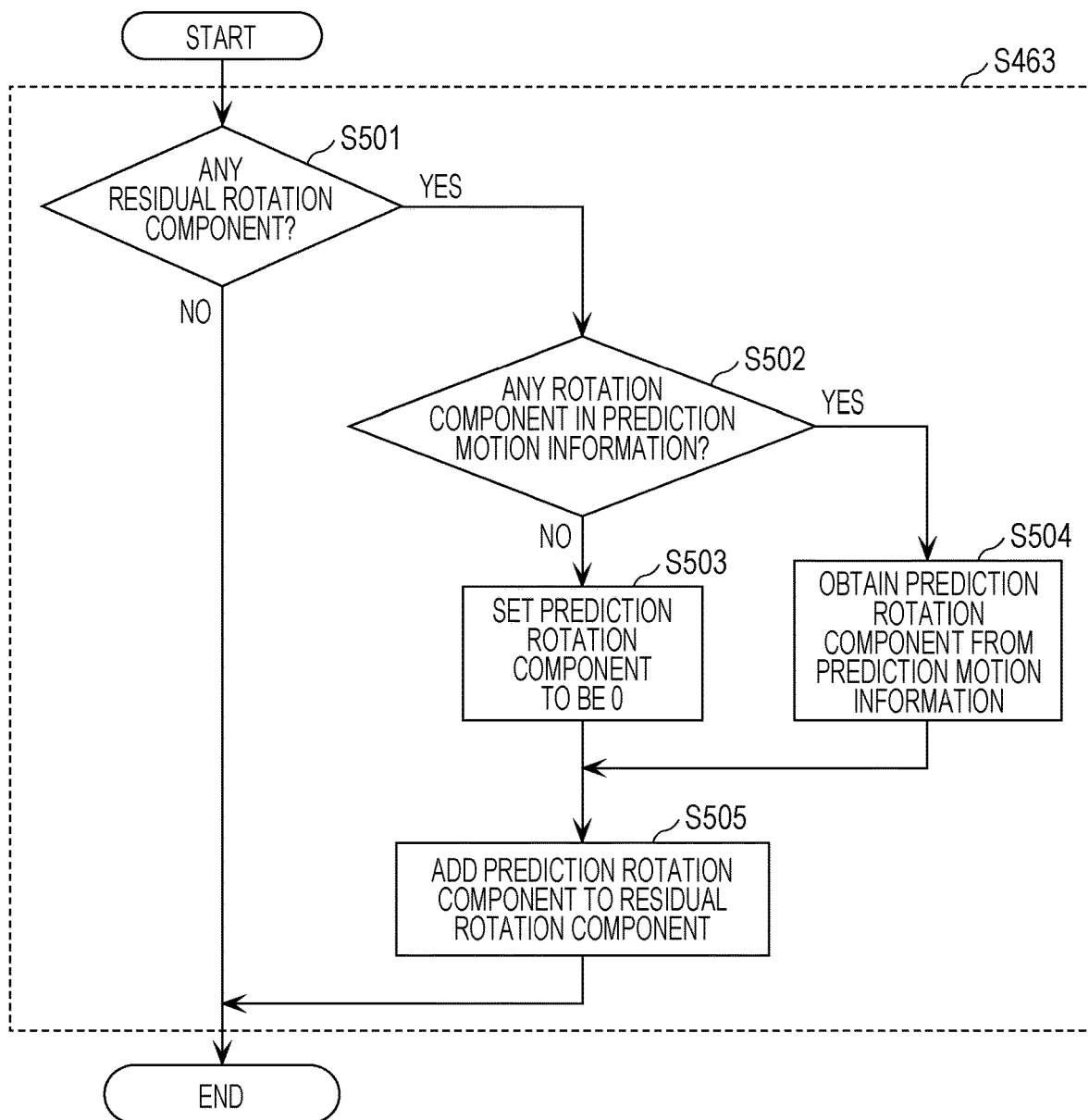
FIG. 26 is a flowchart illustrating an example of a rotation component generation process in accordance with the fourth embodiment.

Then, the inter prediction unit 208 generates a rotation component from the residual motion information and the prediction motion information (S463). FIG. 26 is a flowchart of this rotation component generation process (S463).

First, the inter prediction unit 208 determines whether or not the residual rotation component has been obtained in step S421 (S501).

If the residual rotation component has been obtained (YES in S501), the inter prediction unit 208 determines whether or not the prediction motion information obtained in step S461 includes a rotation component (S502).

If the prediction motion information does not include a rotation component (NO in S502), the inter prediction unit 208 sets the prediction rotation component to be equal to 0 (S503). If the prediction motion information includes a rotation component (YES in S502), the inter prediction unit 208 sets the prediction rotation component to be equal to the rotation component of the prediction motion information (S504).

The inter prediction unit 208 adds the prediction rotation component obtained in step S503 or S504 to the residual rotation component to generate the rotation component (S505).

If no residual rotation component has been obtained (NO in S501), the inter prediction unit 208 ends the process regarding the rotation component (S463).

Figure 27:
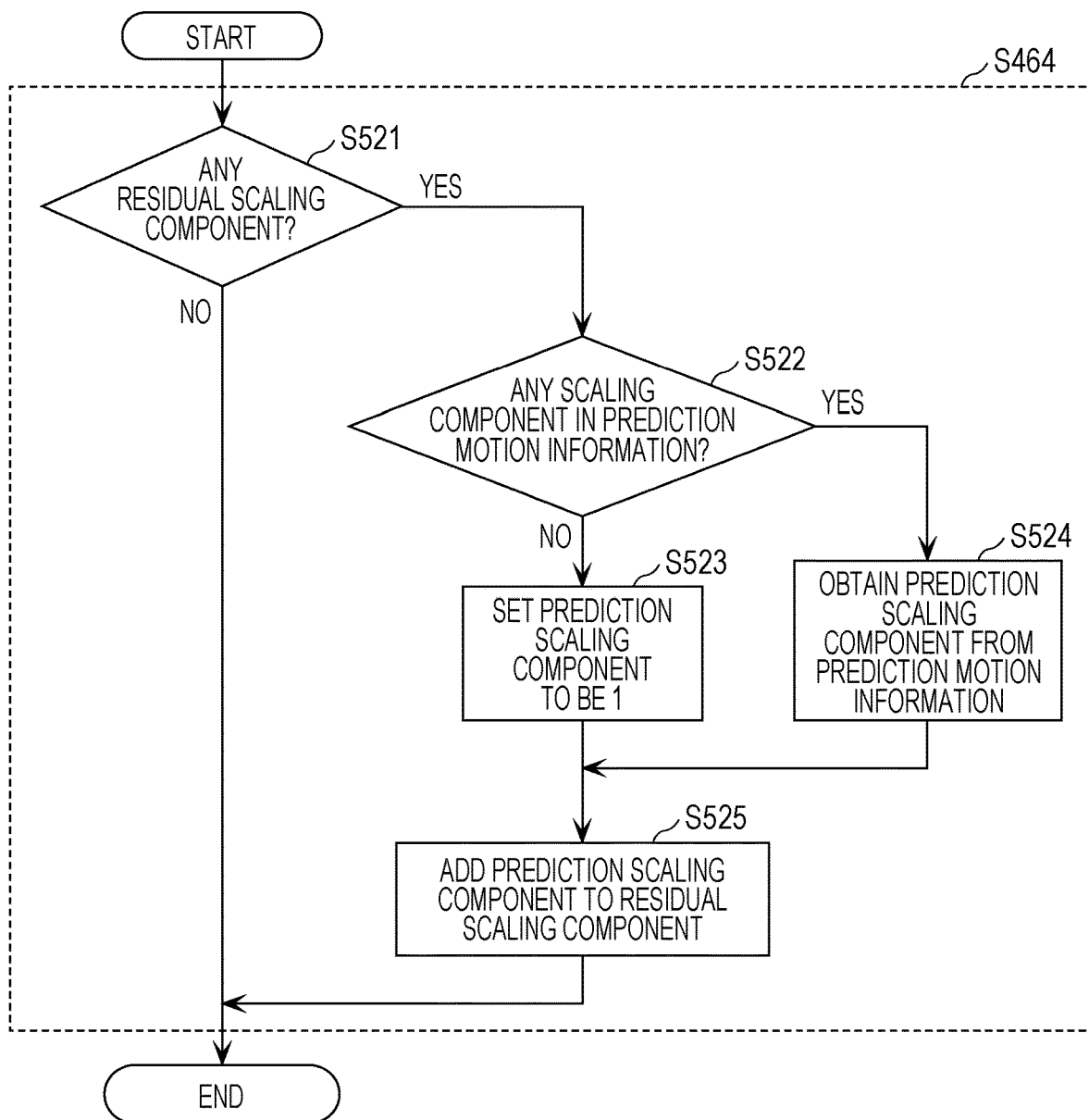
FIG. 27 is a flowchart illustrating an example of a scaling component generation process in accordance with the fourth embodiment.

Then, the inter prediction unit 208 generates a scaling component from the residual motion information and the prediction motion information (S464). FIG. 27 is a flowchart of this scaling component generation process (S464).

First, the inter prediction unit 208 determines whether or not the residual scaling component has been obtained in step S421 (S521).

If the residual scaling component has been obtained (YES in S521), the inter prediction unit 208 determines whether or not the prediction motion information obtained in step S461 includes a scaling component (S522).

If the prediction motion information does not include a scaling component (NO in S522), the inter prediction unit 208 sets the prediction scaling component to be equal to 1 (S523). If the prediction motion information includes a scaling component (YES in S522), the inter prediction unit 208 sets the prediction scaling component to be equal to the scaling component of the prediction motion information (S524).

The inter prediction unit 208 adds the prediction scaling component obtained in step S523 or S524 to the residual scaling component to generate the scaling component (S525).

If no residual scaling component has been obtained (NO in S521), the inter prediction unit 208 ends the process regarding the scaling component (S464).

Figure 28:
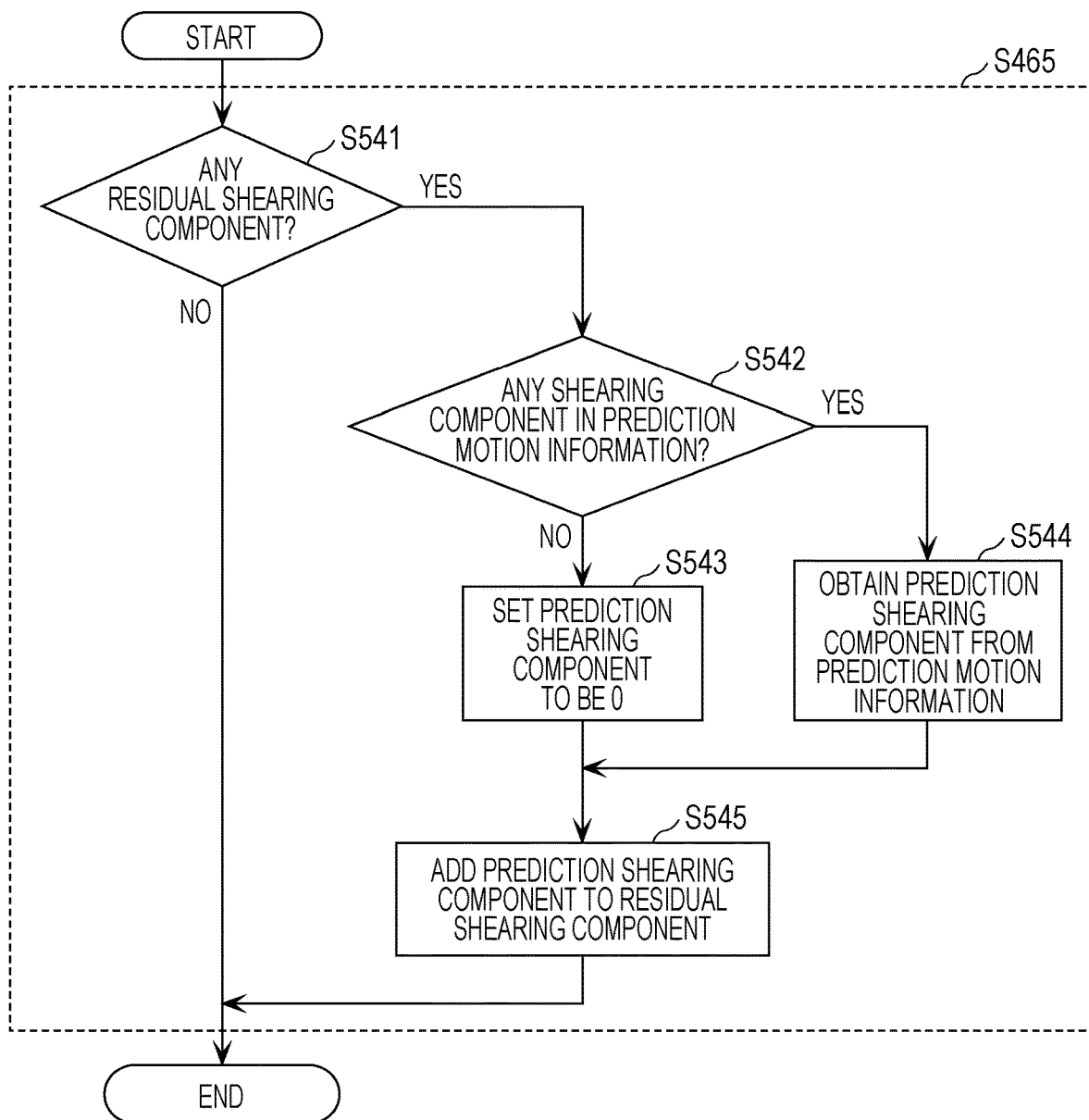
FIG. 28 is a flowchart illustrating an example of a shearing component generation process in accordance with the fourth embodiment.

Lastly, the inter prediction unit 208 generates a shearing component from the residual motion information and the prediction motion information (S465). FIG. 28 is a flowchart of this shearing component generation process (S465).

First, the inter prediction unit 208 determines whether or not the residual shearing component has been obtained in step S421 (S541).

If the residual shearing component has been obtained (YES in S541), the inter prediction unit 208 determines whether or not the prediction motion information obtained in step S461 includes a shearing component (S542).

If the prediction motion information includes no shearing component (NO in S542), the inter prediction unit 208 sets the prediction shearing component to be equal to 0 (S543). If the prediction motion information includes a shearing component (YES in S542), the inter prediction unit 208 sets the prediction shearing component to be equal to the shearing component of the prediction motion information (S544).

The inter prediction unit 208 adds the prediction shearing component obtained in step S543 or S544 to the residual shearing component to generate the shearing component (S545).

If no residual shearing component has been obtained (NO in S541), the inter prediction unit 208 ends the process regarding the shearing component (S465).

After performing this series of processes on every block, the inter prediction unit 208 ends the motion information generation process (S423).

As described in the first embodiment, the flags may be provided on a block-by-block basis, or may be provided on an image-by-image basis, a sequence-by-sequence basis, or an image-subarea-by-image-subarea basis. In the case where the flags are provided in units other than in units of blocks and transform components are specified using the flags, the image decoding apparatus performs a decoding process on all blocks included in the specified unit by using a transform component of the same type. As a result, the image decoding apparatus can omit the determination step or the like, and can execute a decoding process that gives a high prediction accuracy with a small amount of information and a small processing load.

Also, as in the first embodiment, the order of the transform component generation processes (S462 to S465) is not limited to the order illustrated in FIG. 24. Some or all of the processes of steps S462 to S465 may be performed in parallel, or priorities may be set for these processes and the processes may be performed in descending order of priority.

Also, in the case where the coding level information that represents the coding level is used in place of various flags as in the second embodiment, the image decoding apparatus 200 decodes, from the bitstream 221, the coding level information in place of the various flags described above. Also, the image decoding apparatus 200 determines whether or not there are transform components by using the coding level information instead of using the various flags.

Also, in the case where whether or not there are various transform components is specified by the block size as described in the first embodiment, the image decoding apparatus 200 decodes the block size from the bitstream 221, and determines whether or not there are various kinds of transform components by using the block size.

Advantages

As described above, the image decoding apparatus 200 according to the fourth embodiment can decode the bitstream 221 obtained by coding only transform components necessary for generation of prediction blocks. Also, the image decoding apparatus 200 can decode the bitstream 221 that has been generated to have a small amount of code, by using high-dimensional motion prediction, and thus can reproduce images having a higher image quality.

Although the example in which translation, rotation, scaling, and shearing are included in motion information as transform components has been described in the fourth embodiment, the usable transforms are not limited to these ones. For example, a trapezoidal transform may be used. With this configuration, a complicated transform can be expressed, and thus the image decoding apparatus 200 can generate a prediction image having a higher accuracy.

That is, it is sufficient that the image decoding apparatus 200 according to the fourth embodiment can divide motion information into a plurality of transform components and determine whether or not to perform decoding for each of the transform components. Accordingly, the image decoding apparatus 200 may use transform components other than the aforementioned ones.

Also, the method according to the fourth embodiment is applicable not only to the case of decoding residual motion information which represents a difference between motion information and prediction motion information but also in the merge mode, for example.

Fifth Embodiment

In the first to fourth embodiments, the example of using an affine transform in inter prediction has been described. In a fifth embodiment, an example of using an affine transform in intra prediction will be described.

Figure 29:
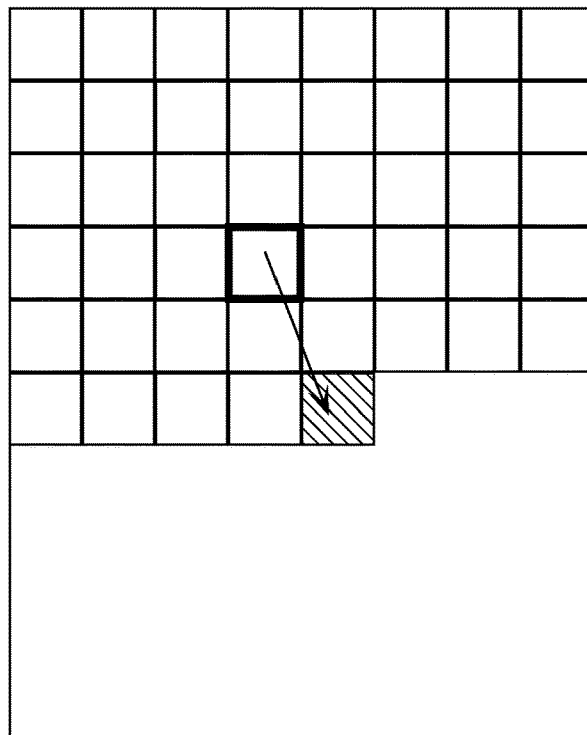
FIG. 29 is a diagram for describing an intra prediction process in accordance with a fifth embodiment.
Figure 30:
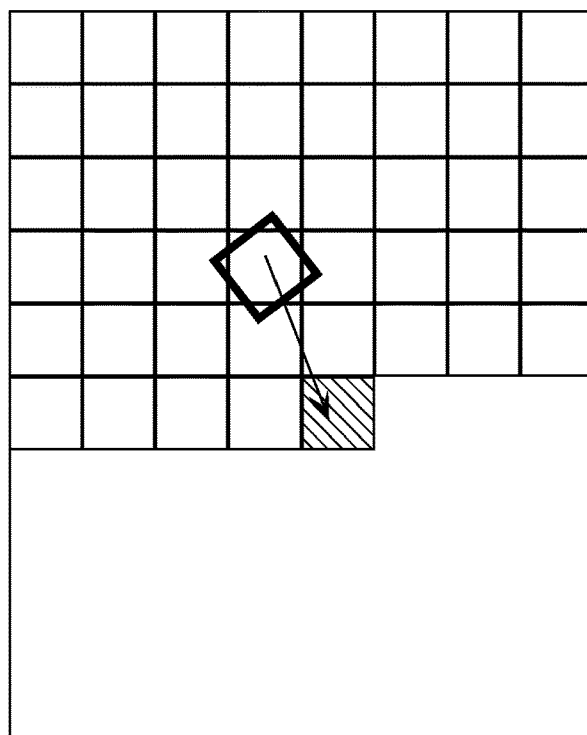
FIG. 30 is a diagram for describing an intra prediction process in accordance with the fifth embodiment.

An image coding apparatus (or an image decoding apparatus) according to the fifth embodiment uses, as a pixel value of the current block, a pixel value of a block that has been processed (coded or decoded) within the same picture as that of the current block, as illustrated in FIG. 29. That is, a pixel value of a processed block is copied in the current block. Further, in the fifth embodiment, not only translation but also various transforms such as rotation, scaling, and shearing are used at the time of copying as illustrated in FIG. 30.

Specifically, in the fifth embodiment, the intra prediction unit 109 (or 205) generates a prediction block using reference information that represents a processed block. This reference information includes various transform components, such as a translation component, a rotation component, a scaling component, and a shearing component.

In such a case, any given transform component can be selectively used by coding (or decoding) information (various flags or a coding level) that indicates whether or not each of the various transform components is used, as in the first to fourth embodiments described above.

Note that, rotation, scaling, and shearing contribute to an improvement of the prediction accuracy in intra prediction in the order of scaling, rotation, and shearing. Accordingly, priorities are preferably assigned in this order. As the method for assigning priorities to a plurality of transforms, any of the methods described in the third embodiment can be used.

Also, the priority may be changed in accordance with the type of the image or the like. For example, a higher priority may be assigned in the order of scaling, rotation, and shearing for natural images or the like, and in the order of rotation, scaling, and shearing for screen content such as map information.

Figure 31:
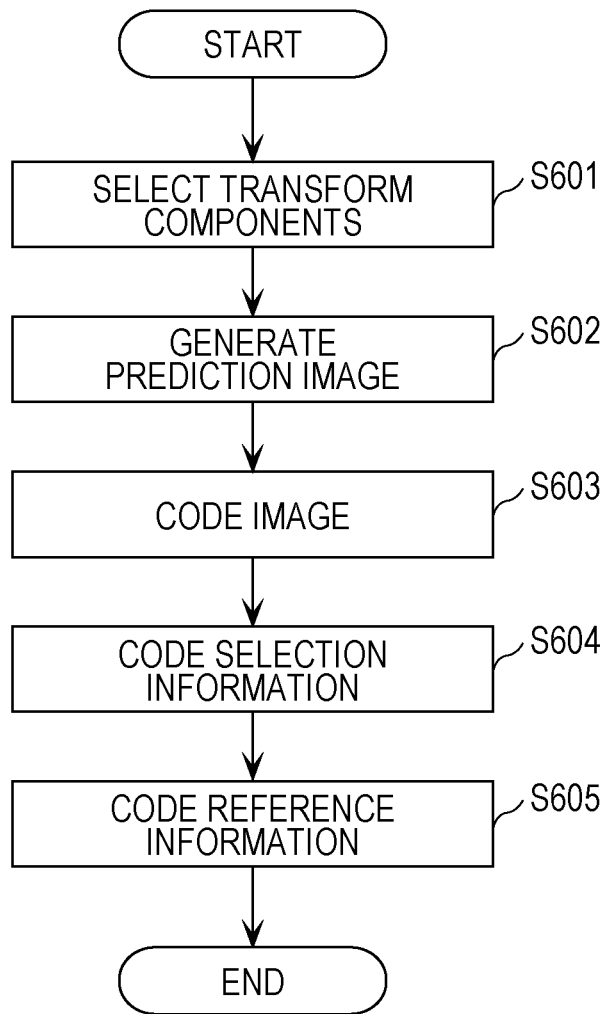
FIG. 31 is a flowchart of an image coding method in accordance with the fifth embodiment.

The image coding apparatus according to the fifth embodiment is an image coding apparatus that codes an image as described in the first to third and fifth embodiments above, and performs a process illustrated in FIG. 31.

First, the image coding apparatus selects, as reference information that represents a reference destination of the current block to be coded, two or more transform components from among a plurality of transform components that include a translation component and a plurality of non-translation components (S601). Here, the reference information corresponds to motion information used in inter prediction or information representing a processed block serving as a reference destination in intra prediction. Also, the plurality of non-translation components include, for example, a rotation component, a scaling component, and a shearing component.

Then, the image coding apparatus generates a prediction image by using the reference information (S602). Then, the image coding apparatus codes the current block by using the prediction image (S603).

Also, the image coding apparatus codes selection information that identifies the two or more transform components selected from among the plurality of transform components (S604). For example, the selection information includes flags (a translation flag, a rotation flag, a scaling flag, and a shearing flag), each of which corresponds to one of the plurality of transform components and indicates whether the corresponding transform component has been selected. Alternatively, the selection information represents one coding level of a plurality of coding levels that represent different combinations of some or all of the plurality of transform components. In this case, two or more transform components that are included in a combination represented by the coding level represented by the selection information are selected in step S601.

Also, the image coding apparatus may code the selection information on a block-by-block basis, on a picture-by-picture basis, on a sequence-by-sequence basis, or on a picture-subarea-by-picture-subarea basis. That is, the image coding apparatus may code one piece of selection information that is used in common for an image including the current block, may code one piece of selection information that is used in common for a sequence including the current block, or may code one piece of selection information that is used in common for a subarea including the current block.

Then, the image coding apparatus codes the reference information of the current block by using reference information of a coded block different from the current block (S605). For example, the image coding apparatus codes residual reference information which represents a difference between the reference information of the coded block and the reference information of the current block.

Note that the image coding apparatus may select two or more transform components in accordance with the size of the current block in step S601. In this case, the selection information represents the size of the current block. For example, the selection information includes information representing the size of the largest coding unit (CU) and information indicating whether or not each coding unit is further divided.

Also, for example, in the case where the size of the current block is smaller than a threshold, the image coding apparatus does not select the shearing component.

Alternatively, the image coding apparatus may select two or more transform components preferentially in the order of the translation component, the rotation component, the scaling component, and the shearing component in step S601. For example, the priority can be set using any of the methods described in the third embodiment.

Figure 32:
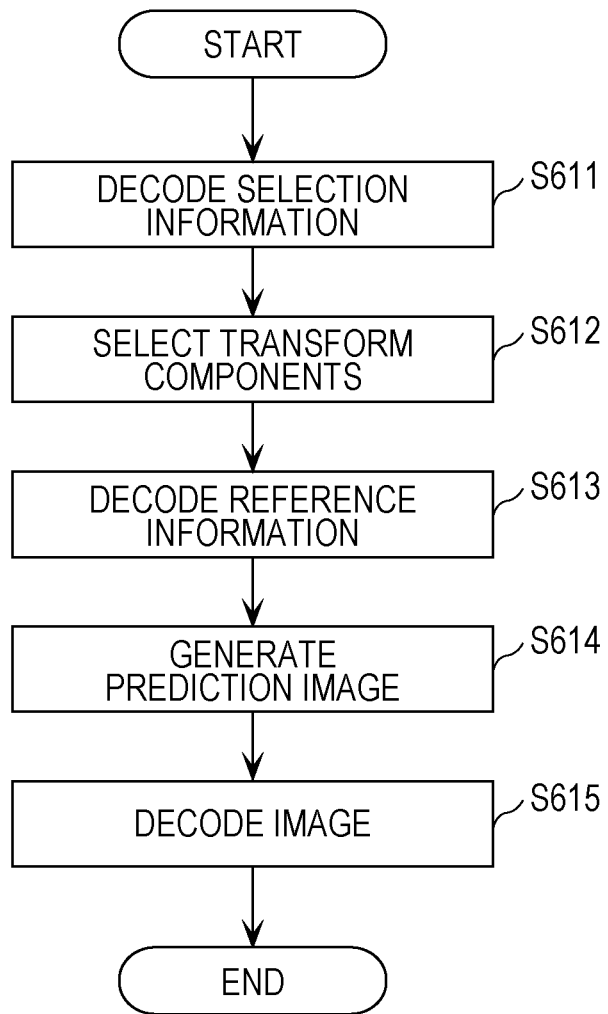
FIG. 32 is a flowchart of an image decoding method in accordance with the fifth embodiment.

Also, an image decoding apparatus according to the fifth embodiment is an image decoding apparatus that decodes a bitstream obtained by coding an image as described in the fourth and fifth embodiments, and performs a process illustrated in FIG. 32.

First, the image decoding apparatus decodes, from a bitstream, selection information that identifies two or more transform components from among a plurality of transform components that include a translation component and a plurality of non-translation components (S611). Here, the plurality of non-translation components include, for example, a rotation component, a scaling component, and a shearing component. Also, the selection information includes flags (a translation flag, a rotation flag, a scaling flag, and a shearing flag), each of which corresponds to one of the plurality of transform components and indicates whether the corresponding transform component has been selected. Alternatively, the selection information represents one coding level of a plurality of coding levels that represent different combinations of some or all of the plurality of transform components.

Also, the image decoding apparatus may decode the selection information on a block-by-block basis, on a picture-by-picture basis, on a sequence-by-sequence basis, or on a picture-subarea-by-picture-subarea basis. That is, the image decoding apparatus may decode one piece of selection information that is used in common for an image including the current block, may decode one piece of selection information that is used in common for a sequence including the current block, or may decode one piece of selection information that is used in common for a subarea including the current block.

The image decoding apparatus also selects two or more transform components specified by the decoded selection information, as reference information that represents a reference destination of the current block to be decoded (S612). Here, the reference information corresponds to motion information used in inter prediction or information representing a processed block serving as a reference destination used in intra prediction. In the case where the selection information represents the coding level, the image decoding apparatus selects two or more transform components included in a combination represented by the coding level represented by the selection information.

Then, the image decoding apparatus decodes, from the bitstream, reference information of the current block by using reference information of a decoded block different from the current block (S613). Specifically, the image decoding apparatus decodes residual reference information of each of the selected transform components from the bitstream. Then, the image decoding unit adds, for each of the selected transform components, the obtained residual reference information and the reference information of the decoded block together to generate the reference information.

Then, the image decoding apparatus generates a prediction image by using the reference information (S614). Then, the image decoding apparatus decodes, from the bitstream, the current block by using the prediction image (S615).

Note that the selection information may represent the size of the current block and the image decoding apparatus may select two or more transform components in accordance with the size of the current block in step S612. For example, the selection information includes information representing the size of the largest coding unit (CU) and information indicating whether or not each coding unit is further divided. The image decoding apparatus determines the size of the current block by using these pieces of information.

Also, for example, in the case where the size of the current block is smaller than or equal to a threshold, the image decoding apparatus does not select the shearing component.

Alternatively, the image decoding apparatus may select two or more transform components preferentially in the order of the translation component, the rotation component, the scaling component, and the shearing component in step S612. For example, the priority can be set using any of the methods described in the third embodiment.

Although the image coding method and the image decoding method according to the fifth embodiment have been described above, the present disclosure is not limited to this embodiment.

Also, individual processing units included in the image coding apparatus and the image decoding apparatus according to the fifth embodiment are typically implemented using LSI (Large-Scale Integration) circuits which are integrated circuits. These processing units may be formed as separate chips, or some or all of the processing units may be included in a chip.

Also, the circuit integration is not limited to LSI, and may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used.

In each of the first to fifth embodiments described above, individual components may be implemented with dedicated hardware or by executing a software program suitable for the components. The individual components may be implemented as a result of a program execution unit such as a CPU (Central Processing Unit) or processor loading and executing a software program recorded on a recording medium, such as a hard disk or a semiconductor memory.

In other words, the image coding apparatus and the image decoding apparatus include processing circuitry and storage electrically connected to the processing circuitry (accessible from the processing circuitry). The processing circuitry includes at least one of dedicated hardware and the program execution unit. Also, the storage stores a software program to be executed by the program execution unit in the case where the processing circuitry includes the program execution unit. The processing circuitry executes the image coding method or image decoding method according to each of the above embodiments using the storage.

Further, the embodiments of the present disclosure may be implemented by a software program or a non-transitory computer-readable recording medium storing the program thereon. Obviously, the program can be distributed via a transmission medium such as the Internet.

Also, numerical values used above are merely illustrative ones used to describe the embodiments of the present disclosure specifically, and thus the present disclosure is not limited to the illustrative numerical values.

Also, how functional blocks are divided in block diagrams is merely an example, and thus a plurality of functional blocks may be implemented as one functional block, one functional block may be divided into a plurality of functional blocks, or part of the function may be transferred to another functional block. Also, functions of a plurality of functional blocks having similar functions may be processed in parallel or in a time-divided manner by using hardware or software.

Also, the order in which steps included in the above-described image coding method or image decoding method are executed is merely an illustrative one used to describe the embodiments of the present disclosure specifically, and thus steps may be executed in an order other than the above one. Also, some of the steps may be executed simultaneously (in parallel) with another step.

While the image coding apparatus and the image decoding apparatus according to one or a plurality of embodiments of the present disclosure have been described above on the basis of the embodiments, the present disclosure is not limited to these embodiments. Embodiments in which various modifications conceivable by a person skilled in the art are made and embodiments that are made by combining elements of different embodiments may also be within the scope of the one or the plurality of embodiments of the present disclosure as long as such embodiments do not depart from the gist of the present disclosure.

Sixth Embodiment

The processes described in each of the first to fifth embodiments above can be implemented easily in a standalone computer system by recording a program for implementing the configuration of a video coding method (image coding method) or video decoding method (image decoding method) described in the embodiment on a storage medium. The storage medium may be any given type of medium capable of storing the program, such as a magnetic disk, an optical disc, a magneto-optical disk, an IC (Integrated Circuit) card, or a semiconductor memory.

Now, exemplary applications of the video coding method (image coding method) or the video decoding method (image decoding method) described in each of the first to fifth embodiments and systems using them will be further described. The systems include an image coding/decoding apparatus which includes an image coding apparatus that employs the image coding method and an image decoding apparatus that employs the image decoding method. Other configurations of the systems can be changed as appropriate in accordance with the circumstances.

Figure 33:
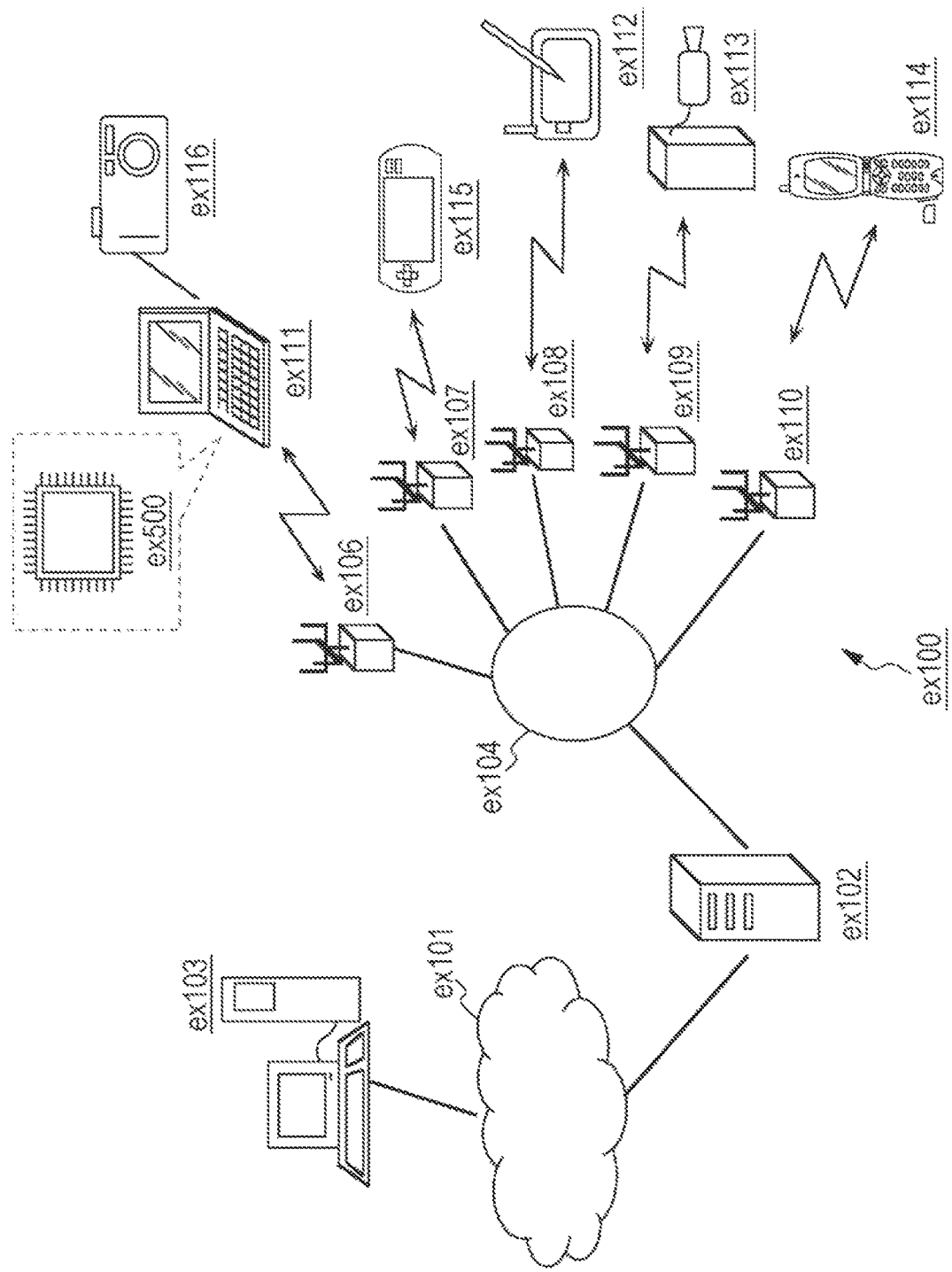
FIG. 33 is a diagram illustrating the overall configuration of a content providing system that implements content distribution services.

FIG. 33 is a diagram illustrating an overall configuration of a content providing system ex100 that implements content distribution services. An area in which communication services are provided is divided into cells of a desired size. Base stations ex106, ex107, ex108, ex109, and ex110, which are fixed wireless stations, are installed in the respective cells.

In this content providing system ex100, various devices, such as a computer ex111, a PDA (Personal Digital Assistant) ex112, a camera ex113, a mobile phone ex114, a game machine ex115 are connected to Internet ex101 via an Internet service provider ex102, a telephone network ex104, and the base stations ex106 to ex110.

Note that the configuration of the content providing system ex100 is not limited to the configuration illustrated in FIG. 33, and any given combination of the elements may be connected. Also, the individual devices may be directly connected to the telephone network ex104 instead of via the base stations ex106 to ex110 which are fixed wireless stations. Alternatively, the individual devices may be directly interconnected via near field communication or the like.

The camera ex113 is a device capable of capturing moving images, such as a digital camcorder. A camera ex116 is a device capable of capturing still images and moving images, such as a digital camera. Also, the mobile phone ex114 may be any of a mobile phone based on the GSM (registered trademark) (Global System for Mobile Communications) scheme, CDMA (Code Division Multiple Access) scheme, W-CDMA (Wideband-Code Division Multiple Access) scheme, LTE (Long Term Evolution) scheme, or HSPA (High Speed Packet Access) scheme; a PHS (Personal Handyphone System); and so forth.

In the content providing system ex100, the camera ex113 or the like is connected to a streaming server ex103 via the base station ex109 and the telephone network ex104. In this way, live streaming is implemented. During live streaming, the coding process is performed on content (for example, video of a music event) obtained by the user using the camera ex113 in a manner as described in each of the above-described embodiments (that is, the camera ex113 functions as an image coding apparatus according to one aspect of the present disclosure) and the resulting content is transmitted to the streaming server ex103. The streaming server ex103 in turn distributes the received content as a stream to a client that has made a request. Examples of the client include the computer ex111, the PDA ex112, the camera ex113, the mobile phone ex114, and the game machine ex115 capable of decoding the data that has undergone the coding process. Each device that has received the distributed data performs the decoding process on the received data to reproduce the data (that is, the device functions as an image decoding apparatus according to one aspect of the present disclosure).

Note that the coding process may be performed on the obtained data by the camera ex113, by the streaming server ex103 that performs a data transmission process, or by both of them on a processing-sharing basis. Similarly, the decoding process may be performed on the distributed data by the client, by the streaming server ex103, or by both of them on a processing-sharing basis. Also, in addition to still and/or moving image data obtained by the camera ex113, still and/or moving image data obtained by the camera ex116 may be transmitted to the streaming server ex103 via the computer ex111. In this case, the coding process may be performed by any of the camera ex116, the computer ex111, and the streaming server ex103, or by all of them on a processing-sharing basis.

These coding and decoding processes are performed in general by an LSI ex500 included in the computer ex111 or each device. The LSI ex500 may be formed as a single chip or a plurality of chips. Alternatively, software for video coding/decoding may be recorded on a recording medium (such as a CD-ROM, a flexible disk, or a hard disk) that is readable by the computer ex111 or the like, and the coding and decoding processes may be performed using the software. Further, in the case where the mobile phone ex114 is equipped with a camera, moving image data obtained with the camera may be transmitted. This moving image data is data that has been coded by the LSI ex500 included in the mobile phone ex114.

Also, the streaming server ex103 may be constituted by a plurality of servers or a plurality of computers that process, record, and distribute data in a distributed manner.

In the above-described manner, the content providing system ex100 allows the client to receive and reproduce coded data. Accordingly, the content providing system ex100 allows the client to receive, decode, and reproduce information transmitted by a user in real time, and thus allows a user not having a special right or equipment to implement personal broadcasting.

Figure 34:
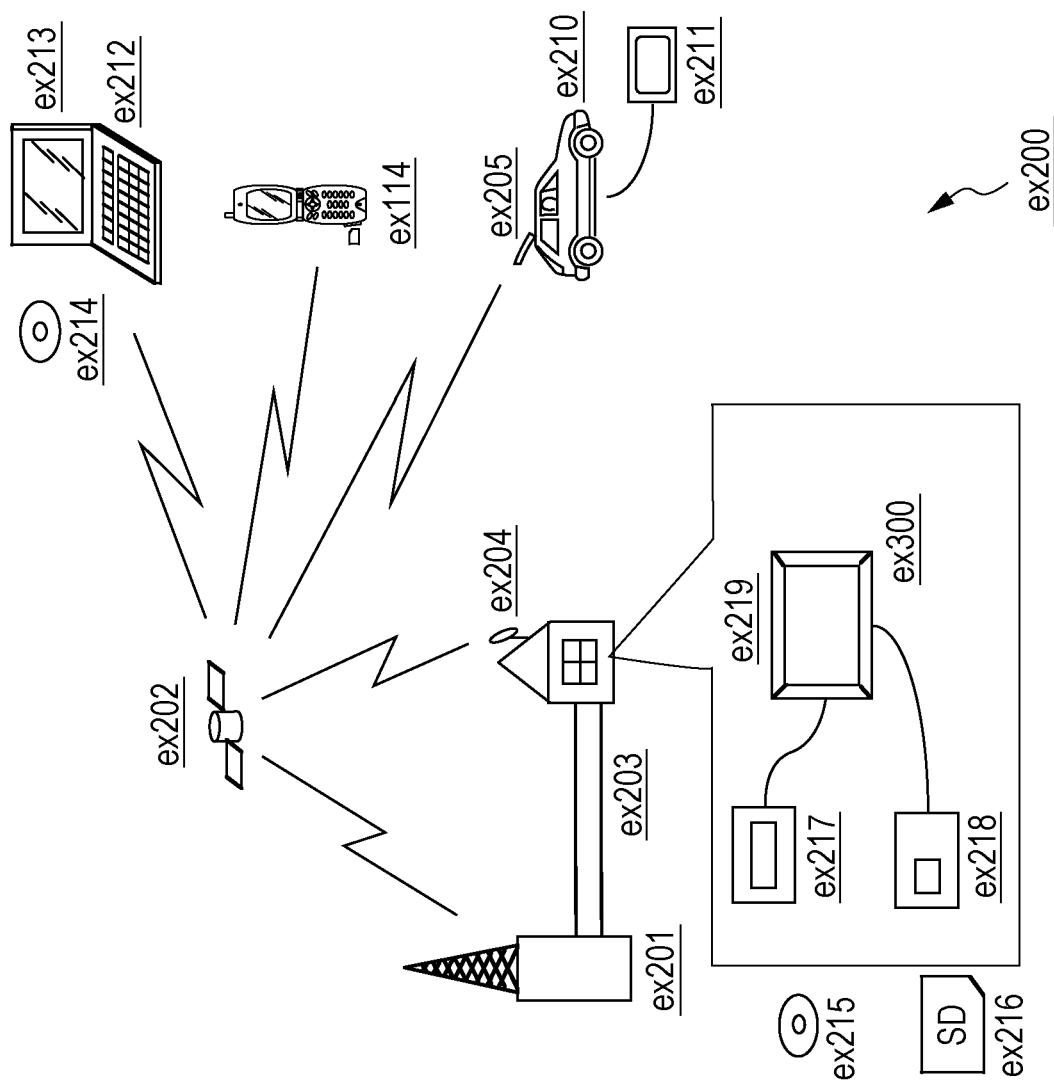
FIG. 34 is a diagram illustrating the overall configuration of a digital broadcasting system.

In addition to the example of the content providing system ex100, at least one of the video coding apparatus (image coding apparatus) and the video decoding apparatus (image decoding apparatus) according to each of the above-described embodiments can be incorporated in a digital broadcasting system ex200 as illustrated in FIG. 34. Specifically, a broadcasting station ex201 transmits a radio wave of multiplexed data obtained by multiplexing video data, music data, and the like, via communication to a broadcasting satellite ex202. This video data is data coded using the video coding method described in each of the above-described embodiments (that is, data coded by the image coding apparatus according to one aspect of the present disclosure). Upon receipt of this data, the broadcasting satellite ex202 transmits a broadcasting radio wave, and a home antenna ex204 capable of receiving satellite broadcasting receives this radio wave. An apparatus such as a television (receiver) ex300 or a set top box (STB) ex217 decodes and reproduces the received multiplexed data (that is, the apparatus functions as the image decoding apparatus according to one aspect of the present disclosure).

Also, the video decoding apparatus or the video coding apparatus described in each of the above-described embodiments can be implemented in a reader/recorder ex218 that reads and decodes the multiplexed data recorded on a recording medium ex215 such as a DVD (Digital Versatile Disc) or a BD (Blu-ray Disc); or that codes a video signal and further multiplexes a music signal with the video signal depending on circumstances, and writes the resulting signal on the recording medium ex215. In this case, the reproduced video signal is displayed on a monitor ex219, and the video signal can be reproduced by another apparatus or system using the recording medium ex215 having the multiplexed data recorded thereon. Alternatively, the video decoding apparatus may be implemented in the set top box ex217 connected to a cable ex203 for cable television or the home antenna ex204 for satellite/terrestrial broadcasting, and the video signal may be displayed on the monitor ex219 of the television ex300. At this time, the video decoding apparatus may be incorporated into the television ex300 instead of the set top box ex217.

Figure 35:
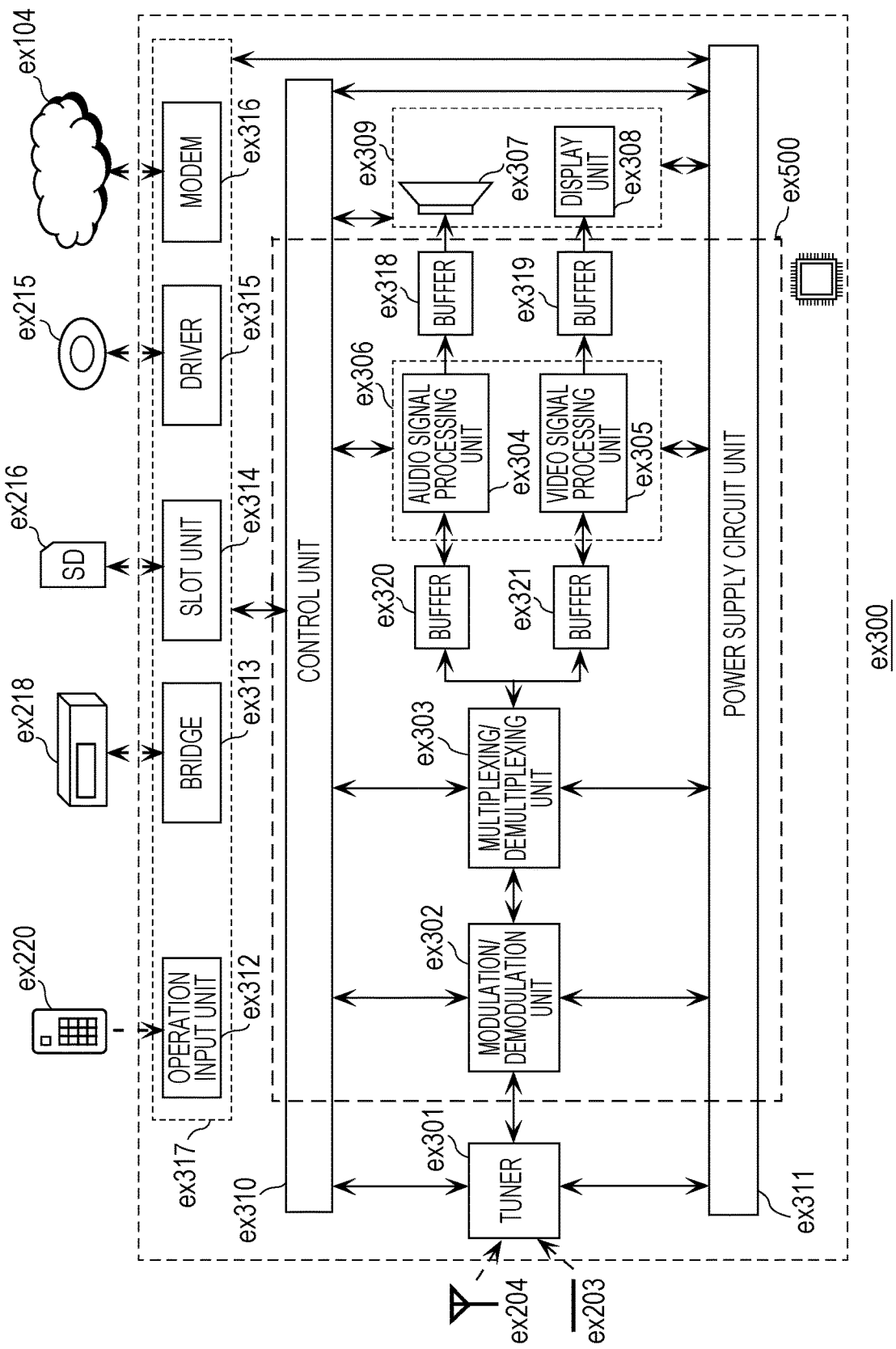
FIG. 35 is a block diagram illustrating an example of a configuration of a television.

FIG. 35 is a diagram illustrating the television (receiver) ex300 that employs the video decoding method and the video coding method described in each of the embodiments above. The television ex300 includes a tuner ex301 that obtains or outputs, via the antenna ex204 or the cable ex203 that receives broadcasting, multiplexed data in which video data and audio data are multiplexed together; a modulation/demodulation unit ex302 that performs demodulation on the received multiplexed data or modulation on multiplexed data to be transmitted to outside; and a multiplexing/demultiplexing unit ex303 that demultiplexes the demodulated multiplexed data into video data and audio data, or multiplexes video data and audio data that have been coded by a signal processing unit ex306.

The television ex300 also includes the signal processing unit ex306 and an output unit ex309. The signal processing unit ex306 includes an audio signal processing unit ex304 that decodes or codes audio data, and a video signal processing unit ex305 that decodes or codes video data (the video signal processing unit ex305 functions as the image coding apparatus or the image decoding apparatus according to one aspect of the present disclosure). The output unit ex309 includes a speaker ex307 that outputs the decoded audio signal, and a display unit ex308, such as a display, that displays the decoded video signal. The television ex300 further includes an interface unit ex317 which includes an operation input unit ex312 that accepts input of a user operation. The television ex300 further includes a control unit ex310 that controls the individual units in an integrated manner, and a power supply circuit unit ex311 that supplies electric power to the individual units. The interface unit ex317 may include a bridge ex313 to be connected to an external device, such as the reader/recorder ex218; a slot unit ex314 that enables connection of a recording medium ex216 such as an SD card; a driver ex315 for connection to the external recording medium ex215, such as a hard disk; and a modem ex316 for connection to the telephone network ex104 as well as the operation input unit ex312. Note that the recording medium ex216 is capable of electrically storing information by using a nonvolatile/volatile semiconductor memory included therein. The individual units of the television ex300 are connected to one another via a synchronization bus.

First, a configuration that allows the television ex300 to decode and reproduce multiplexed data obtained from outside with the antenna ex204 or the like will be described. The television ex300 receives a user operation from a remote control ex220 or the like. Based on control performed by the control unit ex310 including a CPU or the like, the multiplexing/demultiplexing unit ex303 demultiplexes multiplexed data that has been demodulated by the modulation/demodulation unit ex302. Further, in the television ex300, the audio signal processing unit ex304 decodes the separated audio data and the video signal processing unit ex305 decodes the separated video data by using the image decoding method described in each of the above embodiments. Further, the decoded audio signal and video signal are output to outside from the output unit ex309. When the audio signal and the video signal are output, these signals may be temporarily stored in buffers ex318 and ex319 or the like so that they are reproduced in synchronization with each other. Also, the television ex300 may read multiplexed data from the recording media ex215 and ex216 such as a magnetic/optical disc and an SD card as well as from broadcasting. Next, a configuration that allows the television ex300 to code an audio signal and a video signal and to transmit the resulting signals to outside or write the resulting signals on a recording medium or the like will be described. The television ex300 receives a user operation from the remote control ex220 or the like. Based on control performed by the control unit ex310, the audio signal processing unit ex304 codes the audio signal, and the video signal processing unit ex305 codes the video signal by using the image coding method described in each of the above embodiments. The coded audio signal and video signal are multiplexed by the multiplexing/demultiplexing unit ex303 and the resulting multiplexed signal is output to outside. When the audio signal and the video signal are multiplexed, these signals may be temporarily stored in buffers ex320 and ex321 or the like so that they are synchronized with each other. Note that a plurality of buffers may be provided as illustrated as the buffers ex318, ex319, ex320, and ex321; or one or more buffers may be shared. Further, in addition to the illustrated buffers, for example, data may be stored in a buffer that serves as a buffering member for avoiding an overflow or underflow in the system between the modulation/demodulation unit ex302 and the multiplexing/demultiplexing unit ex303 or the like.

The television ex300 may also include a configuration for receiving audio/video input of a microphone or a camera in addition to the configuration for obtaining audio data and video data from broadcasting, a recording medium, or the like; and may perform the coding process on the data obtained therefrom. Although the television ex300 has been described as the configuration capable of performing the above-described coding process, multiplexing, and outputting to outside, the television ex300 may be a configuration incapable of performing these processes and only capable of the reception, decoding process, and outputting to outside.

In the case where multiplexed data is read from and written to a recording medium by the reader/recorder ex218, the decoding process or the coding process may be performed by the television ex300, by the reader/recorder ex218, or by both the television ex300 and the reader/recorder ex218 on a processing-sharing basis.

Figure 36:
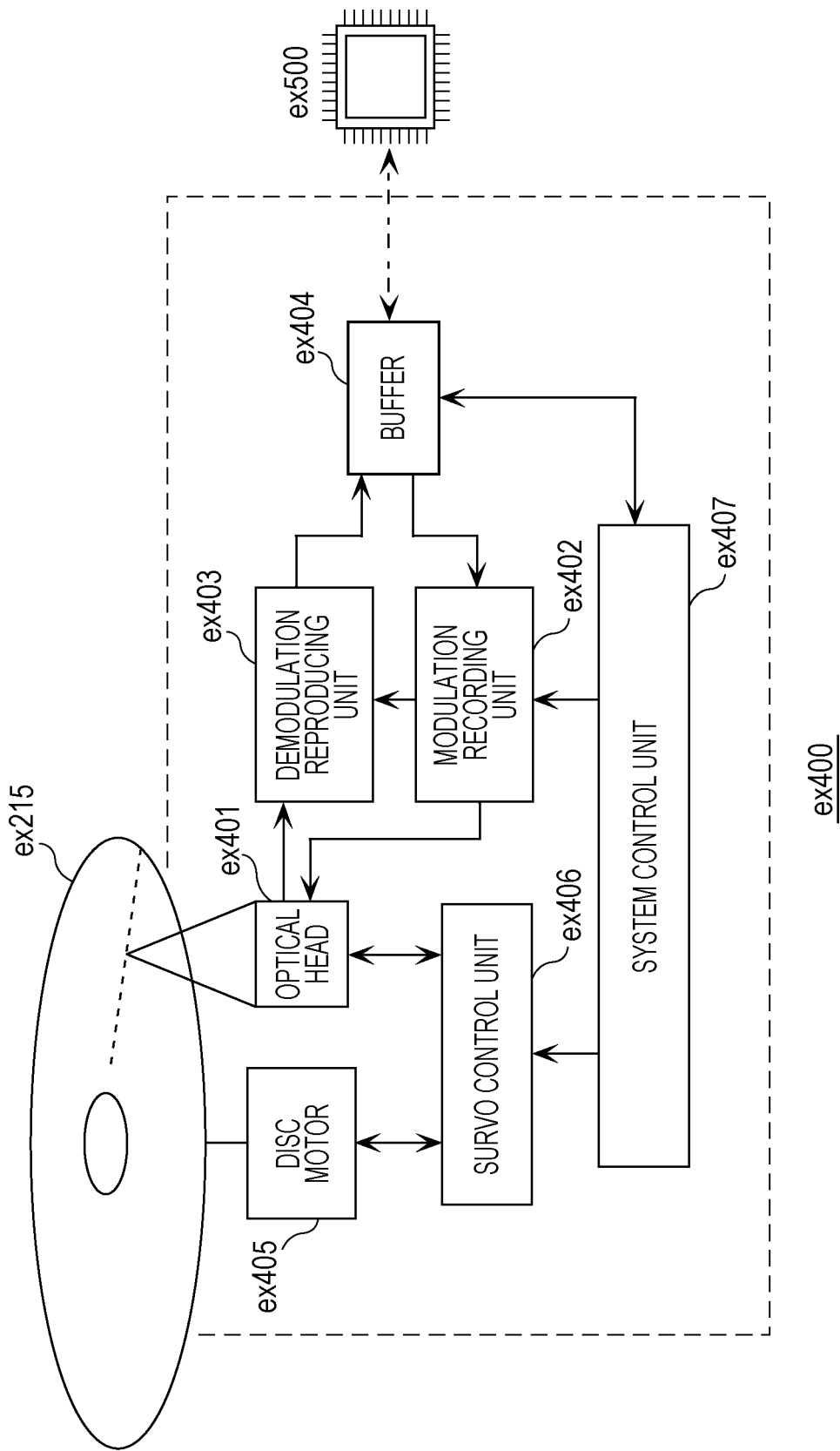
FIG. 36 is a block diagram illustrating an example of a configuration of an information reproducing/recording unit that reads information from and writes information to a recording medium which is an optical disc.

FIG. 36 illustrates an example of a configuration of an information reproducing/recording unit ex400 in the case of reading data from and writing data to an optical disc. The information reproducing/recording unit ex400 includes an optical head ex401, a modulation recording unit ex402, a demodulation reproducing unit ex403, a buffer ex404, a disc motor ex405, a survo control unit ex406, and a system control unit ex407. The optical head ex401 irradiates a recording surface of the recording medium ex215, which is an optical disc, with a laser spot to write information thereon; and detects reflected light from the recording surface of the recording medium ex215 to read information. The modulation recording unit ex402 electrically drives a semiconductor laser included in the optical head ex401 to modulate a laser beam in accordance with to-be-recorded data. The demodulation reproducing unit ex403 amplifies a reproduced signal which is obtained by electrically detecting reflected light from the recording surface by a photodetector included in the optical head ex401, separates and demodulates signal components recorded on the recording medium ex215, and reproduces necessary information. The buffer ex404 temporarily stores information to be recorded on the recording medium ex215 and information reproduced from the recording medium ex215. The disc motor ex405 rotates the recording medium ex215. The survo control unit ex406 moves the optical head ex401 to a certain information track while controlling rotational driving of the disc motor ex405 to perform a laser spot tracking process. The system control unit ex407 controls the information reproducing/recording unit ex400. The above-described reading and writing processes are implemented as a result of the system control unit ex407 performing recording/reproduction of information via the optical head ex401 while causing the modulation recording unit ex402, the demodulation reproducing unit ex403, and the survo control unit ex406 to operate in cooperation with one another and using various pieces of information held in the buffer ex404 and generating/adding new information as needed. The system control unit ex407 includes, for example, a microprocessor and performs these processes by executing a read/write program.

Although the optical head ex401 that irradiates the recording surface with a laser spot has been described above, the optical head ex401 may include a configuration for performing high-density recording using near field light.

Figure 37:
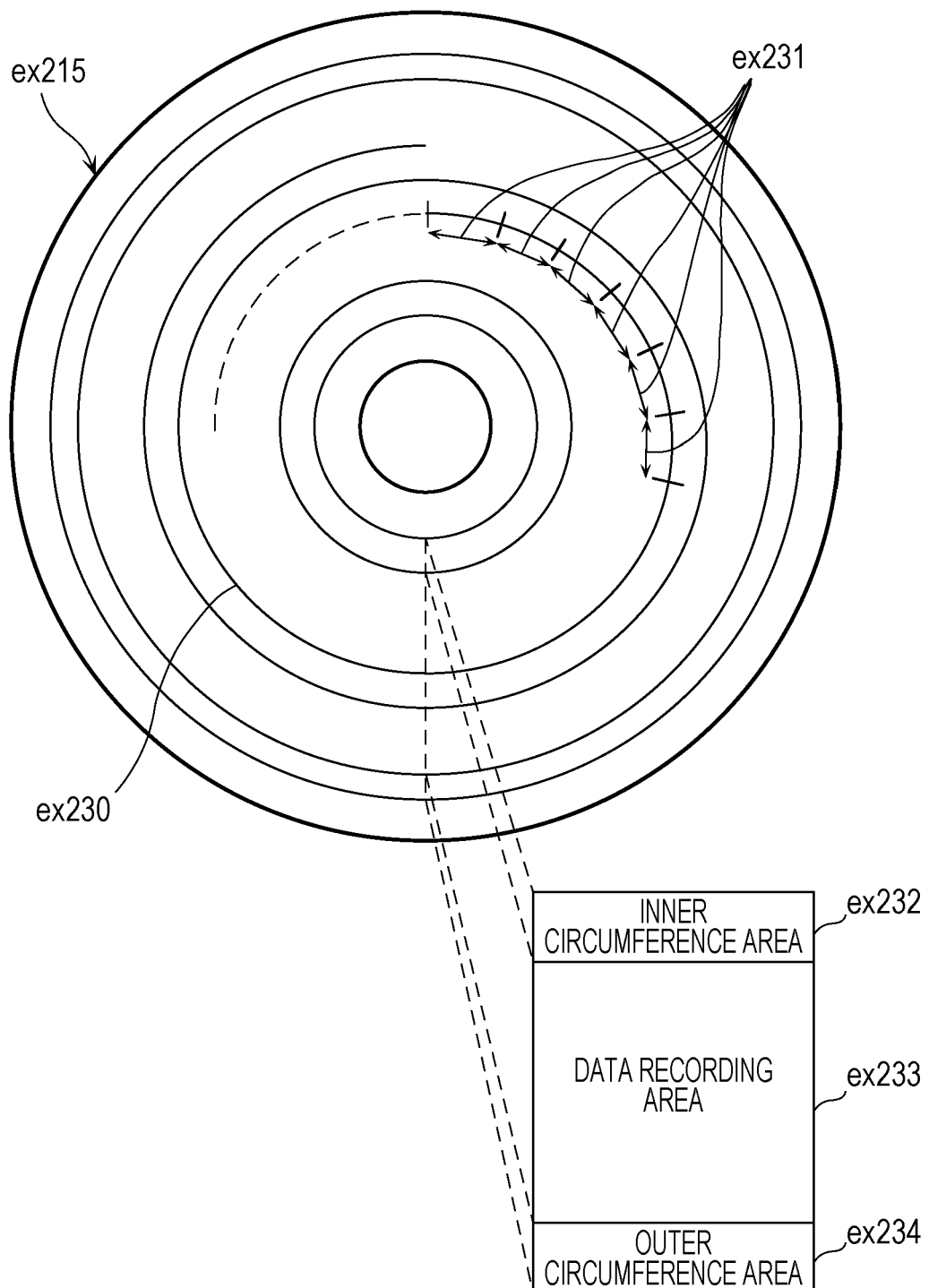
FIG. 37 is a diagram illustrating an example of a structure of an optical disc recording medium.

FIG. 37 is a schematic diagram of the recording medium ex215 which is an optical disc. On the recording surface of the recording medium ex215, a guide groove (groove) is spirally formed. In an information track ex230, address information that represents an absolute position on the disc is pre-recorded by a change in the shape of the groove. This address information includes information identifying positions of recording blocks ex231 which are units in which data is recorded. A recording/reproducing apparatus can identify a recording block by reproducing the information track ex230 and reading the address information. Also, the recording medium ex215 includes a data recording area ex233, an inner circumference area ex232, and an outer circumference area ex234. The data recording area ex233 is an area used for recording user data. The inner circumference area ex232 and the outer circumference area ex234 that are located on the inner side and the outer side of the data recording area ex233, respectively, are used for purposes other than recording of user data. The information reproducing/recording unit ex400 performs reading/writing of coded audio data, coded video data, or multiplexed data of these pieces of data on the data recording area ex233 of the recording medium ex215 thus configured.

The description has been given using a single-layer optical disc such as a DVD or BD by way of example above, the optical disc used is not limited to such a disc and may be a multi-layered optical disc for which recording can be performed on part other than the surface. Alternatively, the optical disc used may be an optical disc on which multi-dimensional recording/reproduction can be performed by recording information at the same position of the disc using light of various waveforms different from one another, by recording information on different layers at various angles, or the like.

In addition, in the digital broadcasting system ex200, data may be received by a vehicle ex210 equipped with an antenna ex205 from the broadcasting satellite ex202 or the like and a moving image may be reproduced on a display device of a car navigation system ex211 mounted on the vehicle ex210. Note that the configuration illustrated in FIG. 35 additionally including a GPS reception unit is conceivable as the configuration of the car navigation system ex211, and the same applies to the computer ex111, the mobile phone ex114, or the like.

Figure 38A:
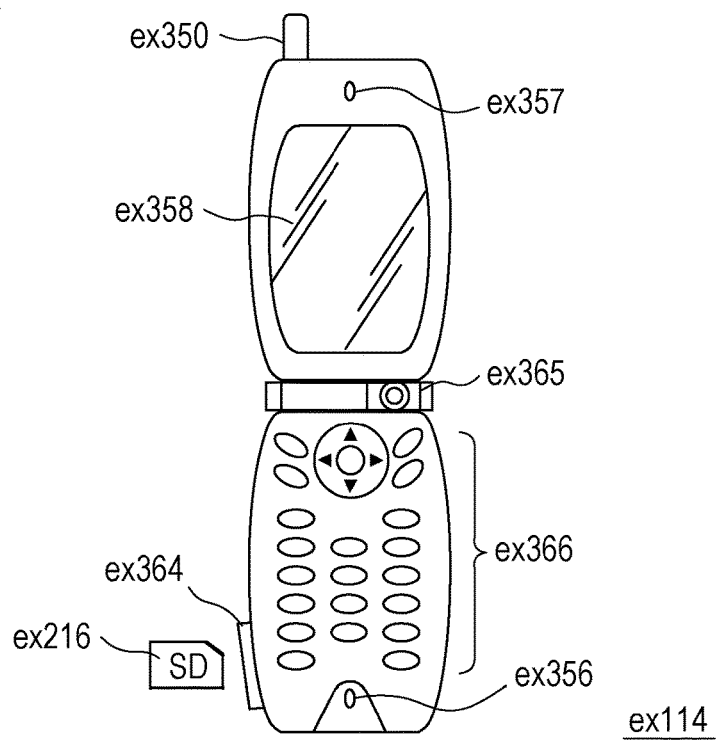
FIG. 38A is a diagram illustrating an example of a mobile phone.

FIG. 38A is a diagram illustrating the mobile phone ex114 that employs the video decoding method and the video coding method described in the above embodiments. The mobile phone ex114 includes an antenna ex350 that transmits and receives a radio wave to and from the base station ex110; a camera unit ex365 capable of capturing video and still images; and a display unit ex358, such as a liquid crystal display, that displays the video captured by the camera unit ex365 and data obtained by decoding video or the like received with the antenna ex350. The mobile phone ex114 further includes a body including an operation key unit ex366; an audio output unit ex357 such as a speaker for outputting audio; an audio input unit ex356 such as a microphone for inputting audio; a memory unit ex367 that stores coded data or decoded data of captured video, captured still images, recorded audio, received video, received still images, or received emails; and a slot unit ex364 which is an interface to a recording medium which similarly stores data thereon.

Figure 38B:
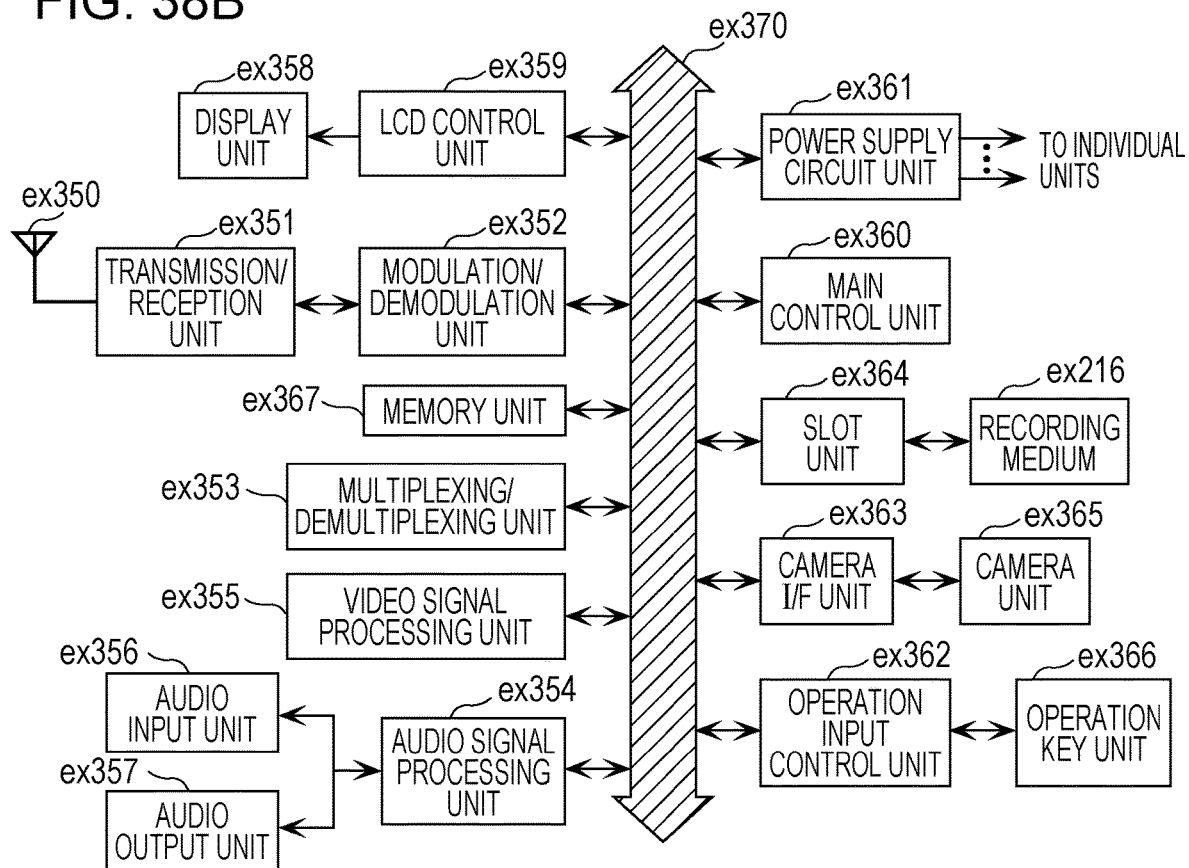
FIG. 38B is a block diagram illustrating an example of a configuration of the mobile phone.

Further, an example of a configuration of the mobile phone ex114 will be described with reference to FIG. 38B. The mobile phone ex114 includes a main control unit ex360 that controls individual units of the body which includes the display unit ex358 and the operation key unit ex366 in an integrated manner. The mobile phone ex114 also includes a power supply circuit unit ex361, an operation input control unit ex362, a video signal processing unit ex355, a camera interface unit ex363, an LCD (Liquid Crystal Display) control unit ex359, a modulation/demodulation unit ex352, a multiplexing/demultiplexing unit ex353, an audio signal processing unit ex354, the slot unit ex364, and the memory unit ex367 which are connected to the main control unit ex360 via a bus ex370.

When an on-hook/power key is turned on through a user operation, the power supply circuit unit ex361 supplies electric power to individual units from a battery pack to activate the mobile phone ex114 into an operable state.

In the mobile phone ex114, in a voice call mode, the audio signal processing unit ex354 converts an audio signal obtained by the audio input unit ex356 into a digital audio signal, the modulation/demodulation unit ex352 performs spread spectrum processing on this digital audio signal, and a transmission/reception unit ex351 performs digital-to-analog conversion processing and frequency conversion processing on this signal and then transmits the resulting signal via the antenna ex350 in accordance with control performed by the main control unit ex360 which includes a CPU, a ROM, and a RAM. Also, in the mobile phone ex114, in the voice call mode, the transmission/reception unit ex351 amplifies reception data received via the antenna ex350 and performs frequency conversion processing and analog-to-digital conversion processing, the modulation/demodulation unit ex352 performs spread spectrum processing on the resulting signal, the audio signal processing unit ex354 converts the resulting signal into an analog audio signal. The analog audio signal is then output from the audio output unit ex357.

In the case where an email is transmitted in a data communication mode, text data of the email input through operation of the operation key unit ex366 of the body or the like is sent to the main control unit ex360 via the operation input control unit ex362. The main control unit ex360 performs control such that the modulation/demodulation unit ex352 performs spread spectrum processing on the text data and the transmission/reception unit ex351 performs digital-to-analog conversion processing and frequency conversion processing on the text data and then transmits the resulting text data to the base station ex110 via the antenna ex350. In the case of receiving an email, substantially the opposite processing is performed on the received data, and the resulting text data is output to the display unit ex358.

In the case where video, a still image, or a combination of video and audio are transmitted in the data communication mode, the video signal processing unit ex355 compresses and codes a video signal supplied from the camera unit ex365 by using the video coding method described in each of the above embodiments (that is, the video signal processing unit ex355 functions as the image coding apparatus according to one aspect of the present disclosure), and sends the coded video data to the multiplexing/demultiplexing unit ex353. Also, the audio signal processing unit ex354 codes an audio signal obtained by the audio input unit ex356 while the video, still image, or the like is being captured by the camera unit ex365, and sends the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354 in accordance with a certain scheme. The modulation/demodulation unit (modulation/demodulation circuit unit) ex352 performs spread spectrum processing on the resulting multiplexed data. The transmission/reception unit ex351 performs digital-to-analog conversion processing and frequency conversion processing on the multiplexed data, and then transmits the resulting data via the antenna ex350.

In the case of receiving data of a moving image file linked to a website or the like or an email attached with video or audio in the data communication mode, the multiplexing/demultiplexing unit ex353 demultiplexes multiplexed data into a bitstream of video data and a bitstream of audio data in order to decode the multiplexed data received via the antenna ex350. The multiplexing/demultiplexing unit ex353 supplies the coded video data to the video signal processing unit ex355 and the coded audio data to the audio signal processing unit ex354 via the synchronization bus ex370. The video signal processing unit ex355 performs decoding using a video decoding method corresponding to the video coding method described in each of the above embodiments to decode the video signal (that is, the video signal processing unit ex355 functions as the image decoding apparatus according to one aspect of the present disclosure). Then, for example, video or still image included in the moving image file linked to the website is displayed on the display unit ex358 via the LCD control unit ex359. Also, the audio signal processing unit ex354 decodes the audio signal, and the resulting audio is output by the audio output unit ex357.

Like the television ex300, three implementation forms, that is, a transmission/reception terminal including both an encoder and a decoder, a transmission terminal only including an encoder, and a reception terminal only including a decoder, are conceivable for a terminal such as the mobile phone ex114. Further, the case has been described in which multiplexed data in which video data, audio data, and so forth are multiplexed is received and transmitted in the digital broadcasting system ex200; however, the multiplexed data may be data in which text data related to the video is multiplexed other than audio data or video data alone may be used instead of the multiplexed data.

As described above, the video coding method or the video decoding method described in each of the above embodiments is applicable to any of the aforementioned devices and systems. In such a way, advantages described in each of the above embodiments can be obtained.

Also, the present disclosure is not limited to the embodiments above, and various modifications and corrections can be made without departing from the scope of the present disclosure.

Seventh Embodiment

Video data can also be generated by switching between the video coding method or apparatus described in each of the above embodiments and a video coding method or apparatus based on a different standard, such as MPEG-2, MPEG-4 AVC, or VC-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video coding method or apparatus described in each of the above embodiments will be described below. Multiplexed data is a digital stream in the MPEG-2 transport stream formant.

FIG. 39 is a diagram illustrating a structure of multiplexed data. As illustrated in FIG. 39, multiplexed data is obtained by multiplexing one or more of a video stream, an audio stream, a presentation graphics stream (PG), and an interactive graphics stream. The video stream represents a main video and a sub video of a movie. The audio stream (IG) represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing GUI components on the window. The video stream is coded using the video coding method or apparatus described in each of the above embodiments and using the video coding method or apparatus compliant with an existing standard, such as MPEG-2, MPEG-4 AVC, or VC-1. The audio stream is coded using a standard, such as Dolby AC-3 (Audio Code number 3), Dolby Digital Plus, MLP (Meridian Lossless Packing), DTS (Digital Theater Systems), DTS-HD, or linear PCM (Pulse Code Modulation).

Each stream included in multiplexed data is identified by a PID (Packet Identifier). For example, a video stream to be used as video of a movie is assigned 0x1011. An audio stream is assigned any one of 0x1100 to 0x111F. A presentation graphics stream is assigned any one of 0x1200 to 0z121F. An interactive graphics stream is assigned any one of 0x1400 to 0x141F. A video stream to be used as sub video of the movie is assigned any one of 0x1B00 to 0x1B1F. An audio stream to be used as sub audio to be mixed with main audio is assigned any one of 0x1A00 to 0x1A1F.

Figure 40:
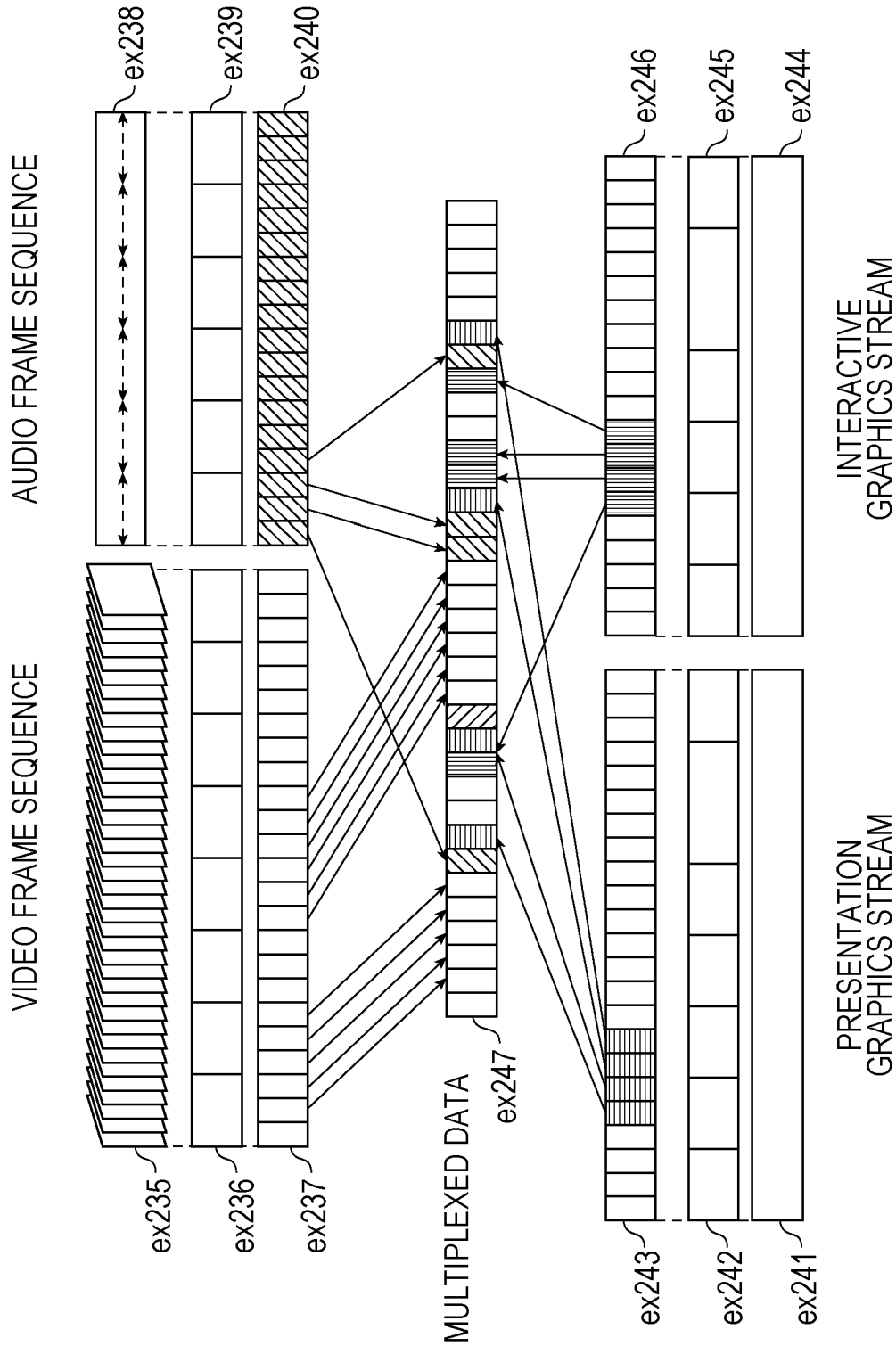
FIG. 40 is a diagram schematically illustrating how individual streams are multiplexed into multiplexed data.

FIG. 40 is a diagram schematically illustrating how individual streams are multiplexed into multiplexed data. A video stream ex235 made up of a plurality of video frames and an audio stream ex238 made up of a plurality of audio frames are converted into PES (Packetized Elementary Stream) packet sequences ex236 and ex239, and then into TS (Transport Stream) packets ex237 and ex240, respectively. Likewise, data of a presentation graphics stream ex241 and data of an interactive graphics stream ex244 are converted into PES packet sequences ex242 and ex245, and further into TS packets ex243 and ex246, respectively. Multiplexed data ex247 is formed by multiplexing these TS packets into one stream.

Figure 41:
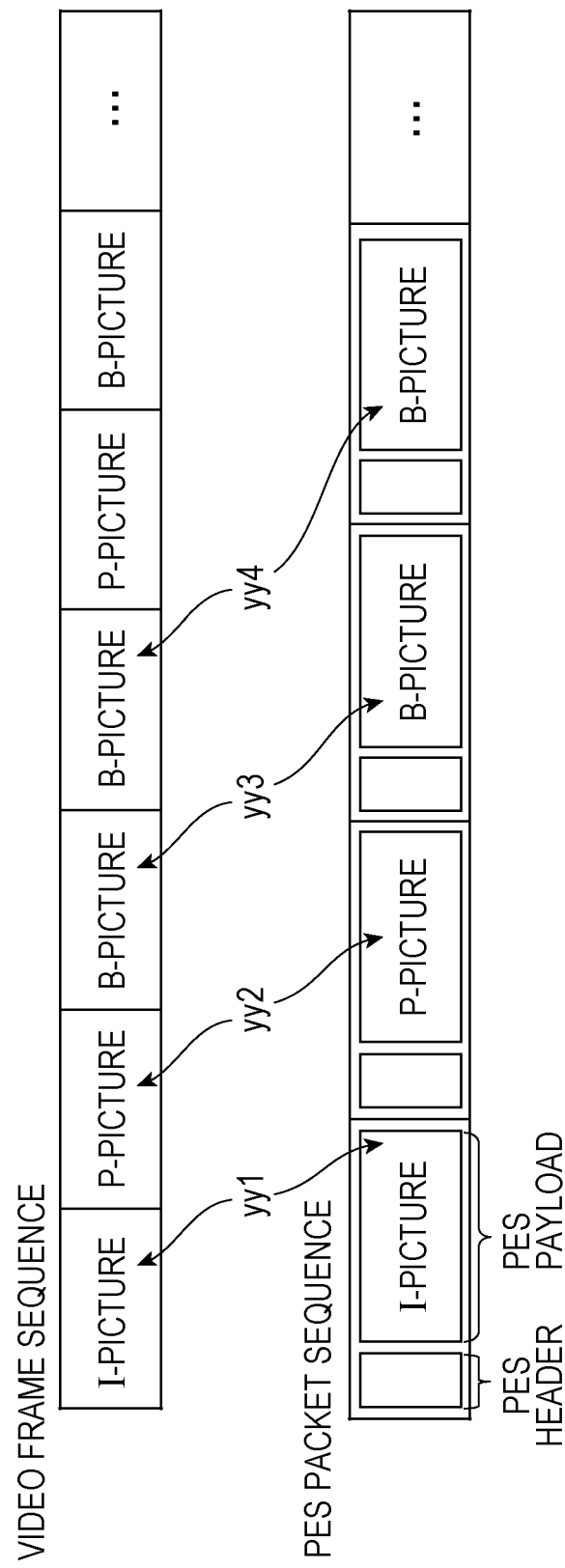
FIG. 41 is a diagram illustrating how a video stream is stored in a PES (Packetized Elementary Stream) packet sequence in a more detailed manner.

FIG. 41 illustrates how a video stream is stored in a PES packet sequence in detail. The upper row in FIG. 41 illustrates a video frame sequence of the video stream. The lower row illustrates a PES packet sequence. As denoted by arrows yy1, yy2, yy3, and yy4 in FIG. 41, I (intra)-pictures, B (bidirectional)-pictures, and P (predicted)-pictures which are a plurality of video presentation units in a video stream are separated on a picture-by-picture basis, and are stored in the payload of respective PES packets. Each PES packet includes a PES header in which PTS (Presentation Time-Stamp) that represents display time of the picture and DTS (Decoding Time-Stamp) that represents decoding time of the picture are stored.

Figure 42:
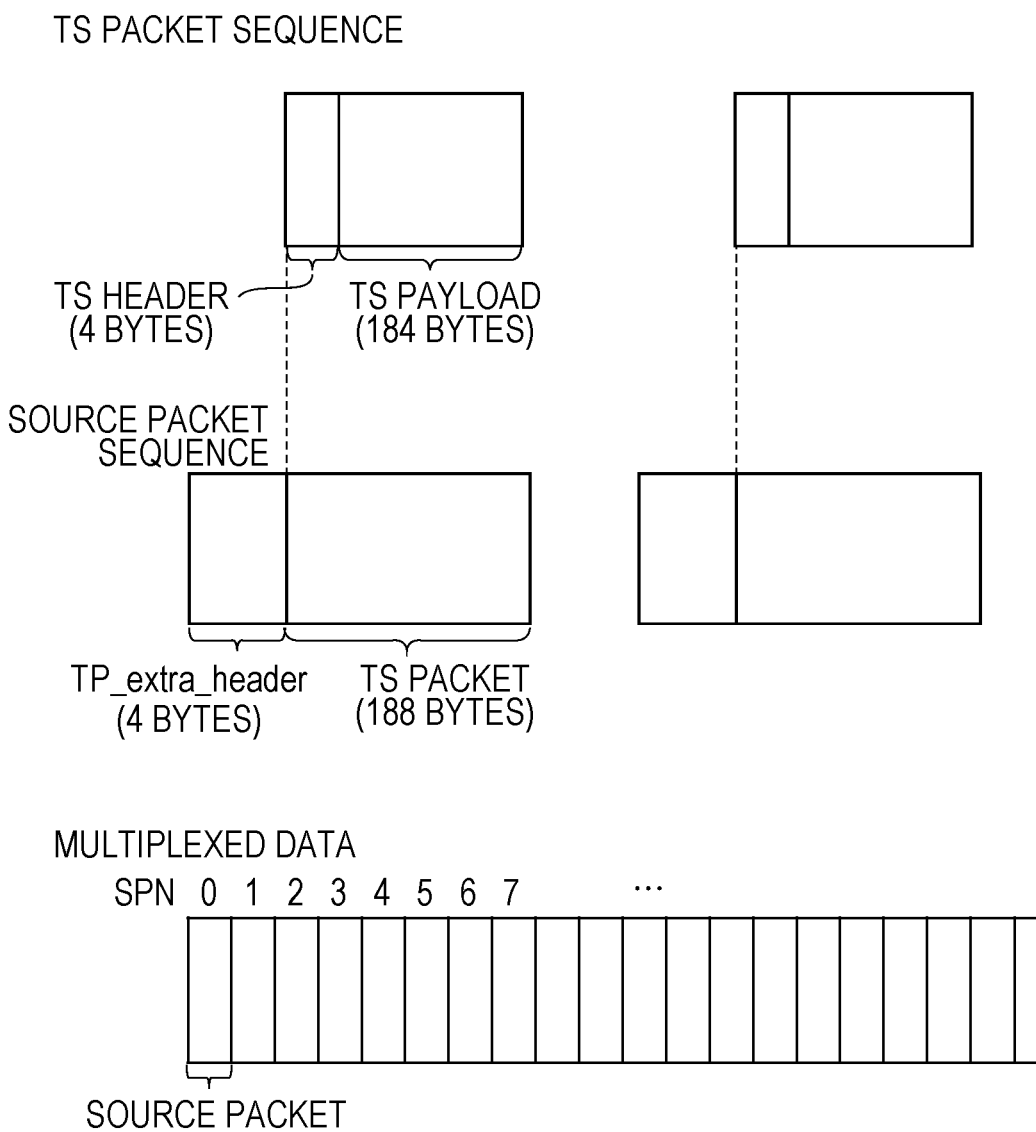
FIG. 42 is a diagram illustrating structures of a TS (Transport Stream) packet and a source packet in multiplexed data.

FIG. 42 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP_Extra_Header to form a 192-byte source packet, and the source packet is written in the multiplexed data. The TP_Extra_Header includes information such as ATS (Arrival_Time_Stamp). The ATS represents the transfer start time at which transfer of the TS packet to a PID filter of a decoder is to be started. As illustrated by the lowest row in FIG. 42, source packets are arranged in the multiplexed data. The number that is incremented from the start of the multiplexed data is called SPN (Source Packet Number).

TS packets included in the multiplexed data include a PAT (Program Association Table), a PMT (Program Map Table), and a PCR (Program Clock Reference) in addition to individual streams of video, audio, subtitle, and so forth. The PAT represents the PID of the PMT used in the multiplexed data, and 0 is registered as the PID of the PAT. The PMT includes PIDs of individual streams of video, audio, subtitle, and so forth included in the multiplexed data; pieces of attribute information of the streams corresponding to the individual PIDs; and various descriptors regarding the multiplexed data. Examples of the descriptors include copy control information that indicates whether or not copying of the multiplexed data is permitted. The PCR includes information regarding STC (System Time Clock) time corresponding to the ATS at which the PCR packet is transferred to a decoder in order to achieve synchronization between ATC (Arrival Time Clock) which is the time axis for ATS and STC (System Time Clock) which is the time axis for PTS and DTS.

Figure 43:
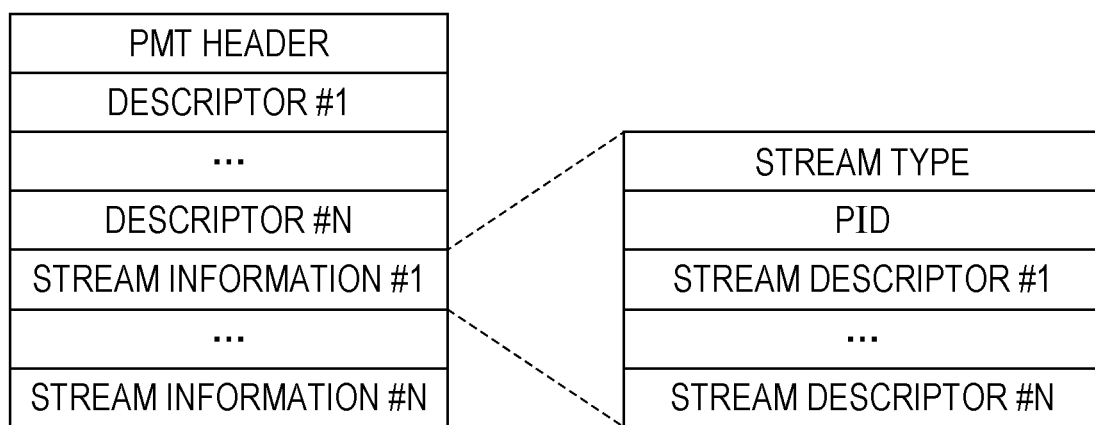
FIG. 43 is a diagram illustrating a data structure of a PMT (Program Map Table).

FIG. 43 is a diagram that describes the data structure of the PMT in detail. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 44:
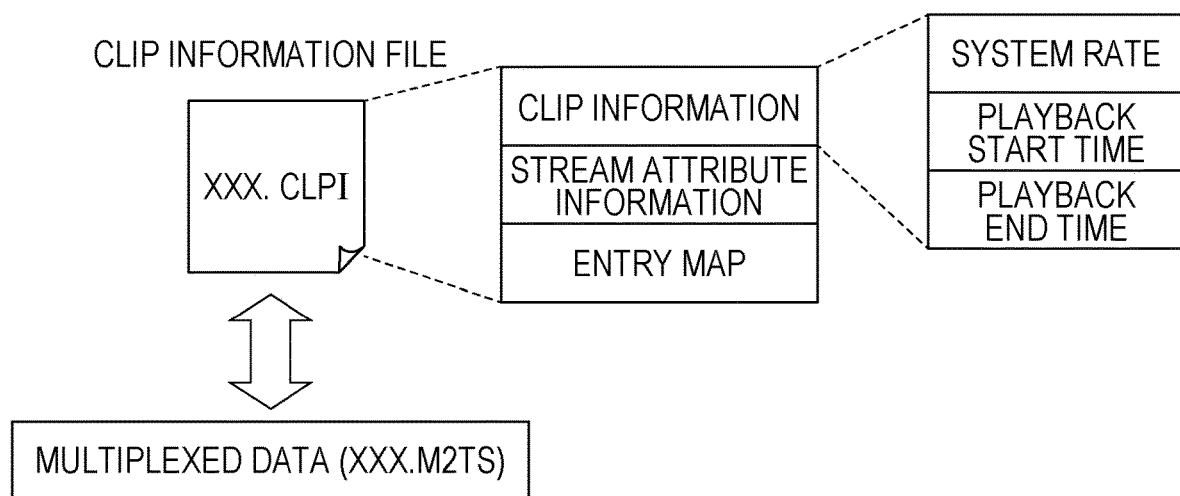
FIG. 44 is a diagram illustrating an internal structure of multiplexed data information.

As illustrated in FIG. 44, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 44. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

Figure 45:
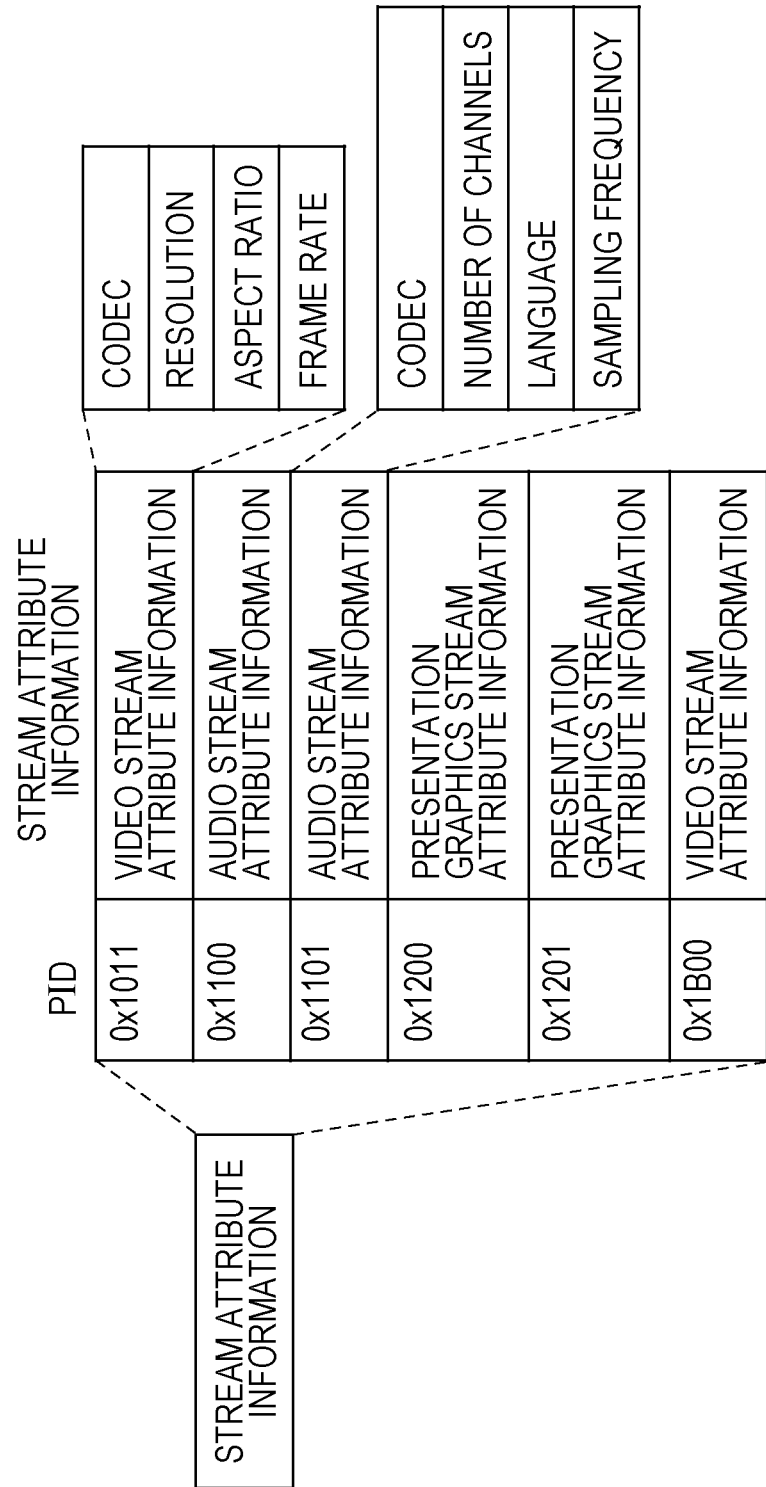
FIG. 45 is a diagram illustrating an internal structure of stream attribute information.

For each PID, attribute information of a corresponding stream included in the multiplexed data is registered in the stream attribute information as illustrated in FIG. 45. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information are used in initialization of the decoder before a player performs reproduction, for example.

In the seventh embodiment, the stream type contained in the PMT is used among the multiplexed data. Also, in the case where the multiplexed data is recorded on a recording medium, the video stream attribute information contained in the multiplexed data information is used. Specifically, the video coding method or apparatus described in each of the above embodiments includes a step or unit for setting unique information which indicates whether or not this video data has been generated by the video coding method or apparatus described in each of the above embodiments, in the stream type contained in the PMT or the video stream attribute information. With this configuration, video data generated using the video coding method or apparatus described in each of the above embodiments and video data based on another standard can be distinguished from each other.

Figure 46:
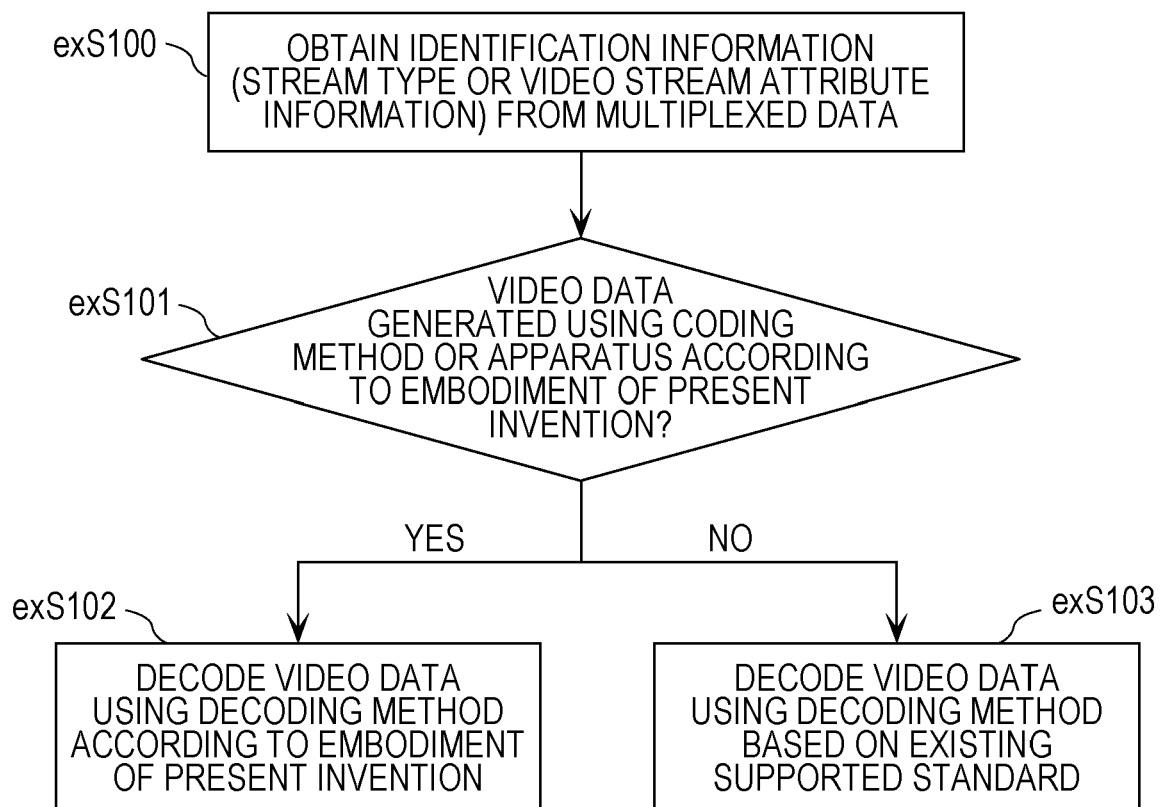
FIG. 46 is a diagram illustrating steps for identifying video data.

FIG. 46 illustrates steps included in a video decoding method in accordance with the seventh embodiment. In step exS100, the stream type contained in the PMT or the video stream attribute information contained in the multiplexed data information is obtained from the multiplexed data. Then, in step exS101, it is determined whether or not the stream type or the video stream attribute information indicates that this multiplexed data is data that has been generated using the video coding method or apparatus described in each of the above embodiments. If it is determined from the stream type or the video stream attribute information that this multiplexed data has been generated using the video coding method or apparatus described in each of the above embodiments, decoding is performed using the video decoding method described in each of the above embodiments in step exS102. If the stream type or the video stream attribute information indicates that the multiplexed data is based on an existing standard, such as MPEG-2, MPEG-4 AVC, or VC-1, decoding is performed using a video decoding method based on the existing standard in step exS103.

By setting a new unique value in the steam type or the video stream attribute information in this way, it can be determined whether or not decoding can be performed using the video decoding method or apparatus described in each of the above embodiments at the time of decoding. Accordingly, even in the case where multiplexed data based on a different standard is input, an appropriate decoding method or apparatus can be selected, and thus decoding can be performed without causing an error. Also, the video coding method or apparatus or the video decoding method or apparatus described in the seventh embodiment is applicable to any of the aforementioned devices and systems.

Eighth Embodiment

Figure 47:
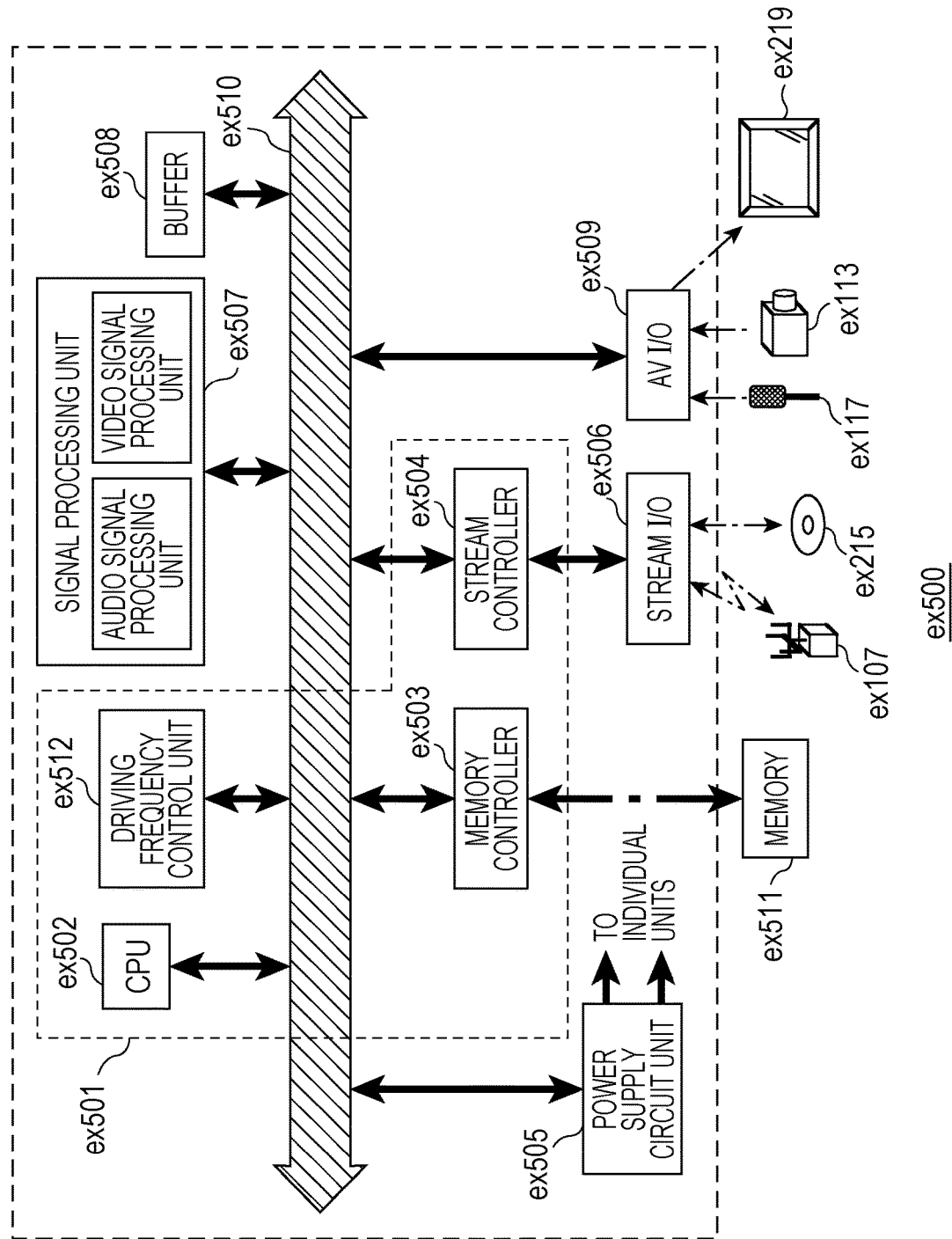
FIG. 47 is a block diagram illustrating an example of a configuration of an integrated circuit that implements a video coding method and a video decoding method according to each of the embodiments.

The video coding method and apparatus and the video decoding method and apparatus described in each of the above embodiments are typically implemented using an LSI which is an integrated circuit. FIG. 47 illustrates an example of a configuration of the LSI ex500 which is formed as one chip. The LSI ex500 includes a control unit ex501, a CPU ex502, a memory controller ex503, a stream controller ex504, a power supply circuit unit ex505, a stream input/output (I/O) ex506, a signal processing unit ex507, a buffer ex508, and an audio/video (AV) I/O ex509, which are connected to one another via a bus ex510. Upon power-on, the power supply circuit unit ex505 supplies electric power to the individual units to activate the individual units into an operable state.

For example, in the case of performing a coding process, the LSI ex500 receives an AV signal from a microphone ex117, the camera ex113, or the like via the AV I/O ex509 in accordance with control performed by the control unit ex501 which includes the CPU ex502, the memory controller ex503, the stream controller ex504, and a driving frequency control unit ex512. The input AV signal is temporarily stored in an external memory ex511, such as an SDRAM (Synchronous Dynamic Random Access Memory). In accordance with control performed by the control unit ex501, the stored data is divided into a plurality of portions in accordance with an amount of processing or a processing speed, and the plurality of portions are sent to the signal processing unit ex507. Then, the signal processing unit ex507 codes the audio signal and/or the video signal. The coding process performed on the video signal here is the coding process described in each of the above embodiments. The signal processing unit ex507 performs processing such as multiplexing of the coded audio data and the coded video data depending on circumstances, and outputs the multiplexed data to outside via the stream I/O ex506. This output multiplexed data is transmitted to the base station ex107 or written to the recording medium ex215. Note that the audio data and the video data may be temporarily stored in the buffer ex508 at the time of multiplexing so that these pieces of data are synchronized with each other.

Note that although the memory ex511 has been described as a device provided outside the LSI ex500 above, the memory ex511 may be included in the LSI ex500. The number of buffers ex508 is not limited to one and the LSI ex500 may include a plurality of buffers. Also, the LSI ex500 may be formed as a single chip or a plurality of chips.

Although the control unit ex501 includes the CPU ex502, the memory controller ex503, the stream controller ex504, and the driving frequency control unit ex512 above, the configuration of the control unit ex501 is not limited to this one. For example, the signal processing unit ex507 may further include a CPU. By providing a CPU within the signal processing unit ex507, the processing speed can be further improved. Alternatively, the CPU ex502 may include the signal processing unit ex507 or, for example, an audio signal processing unit which is part of the signal processing unit ex507. In such a case, the control unit ex501 includes the CPU ex502 which includes the signal processing unit ex507 or part of the signal processing unit ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used. Such a programmable logic device can execute the video coding method or the video decoding method described in each of the above embodiments typically by loading or reading from a memory or the like a program constituting software or firmware.

Furthermore, if an advance in the semiconductor technology or another related technology yields a circuit integration technology that may substitute for LSI, the functional blocks may be integrated using such a technology obviously. Adaptation of the biotechnology may be possible.

Ninth Embodiment

It is considered that an amount of processing increases in the case of decoding video data generated using the video coding method or apparatus described in each of the above embodiments, compared with the case of decoding video data based on an existing standard, such as MPEG-2, MPEG-4 AVC, or VC-1. Accordingly, in the LSI ex500, a higher driving frequency needs to be set in the CPU ex502 than that used when video data based on an existing standard is decoded. However, making the driving frequency higher undesirably increases power consumption.

Figure 48:
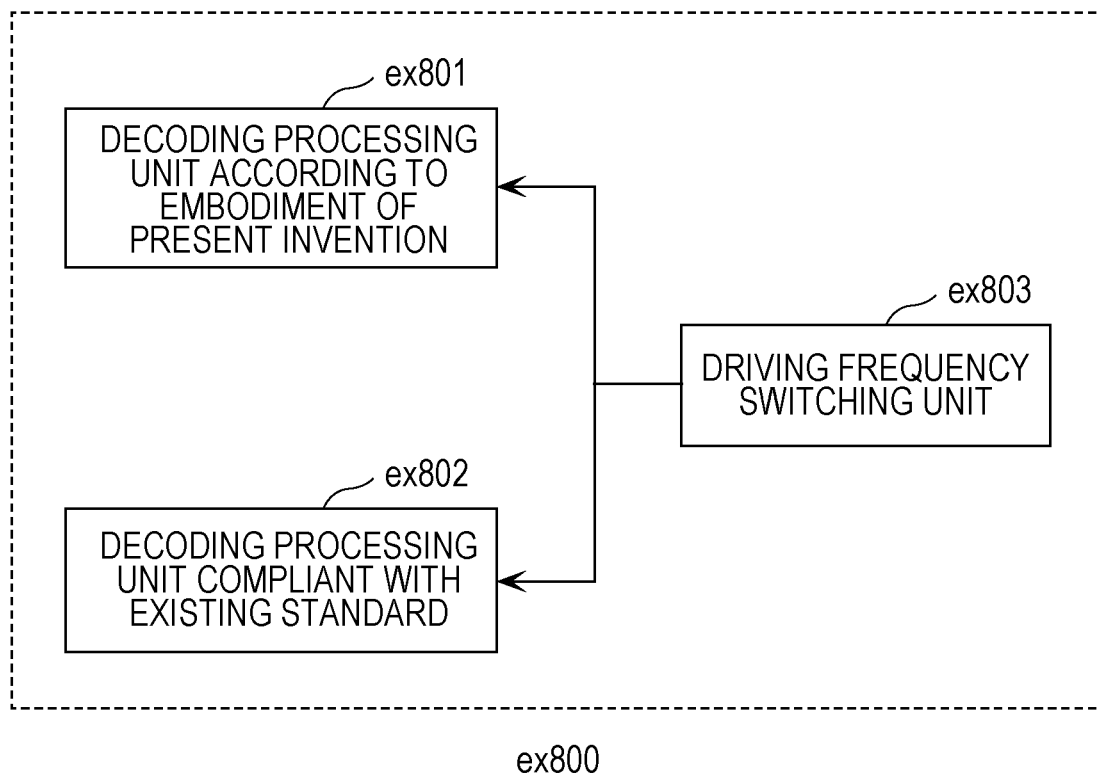
FIG. 48 is a diagram illustrating a configuration for switching between driving frequencies.

To address this issue, the video decoding apparatus, such as the television ex300 or the LSI ex500, is configured to identify a standard which video data is based on, and to switch between the driving frequencies in accordance with the standard. FIG. 48 illustrates a configuration ex800 in accordance with the ninth embodiment. A driving frequency switching unit ex803 sets the driving frequency high in the case where video data is data that has been generated using the video coding method or apparatus described in each of the above embodiments. The driving frequency switching unit ex803 also instructs a decoding processing unit ex801 which executes the video decoding method described in each of the above embodiments to decode the video data. On the other hand, in the case where the video data is data based on an existing standard, the driving frequency switching unit ex803 sets the driving frequency lower than that of the case where the video data is data that has been generated using the video coding method or apparatus described in each of the above embodiments. Then, the driving frequency switching unit ex803 instructs a decoding processing unit ex802 compliant with the existing standard to decode the video data.

More specifically, the driving frequency switching unit ex803 includes the CPU ex502 and the driving frequency control unit ex512 illustrated in FIG. 47. The decoding processing unit ex801 that executes the video decoding method described in each of the above embodiments and the decoding processing unit ex802 compliant with an existing standard correspond to the signal processing unit ex507 illustrated in FIG. 47. The CPU ex502 identifies a standard which video data is based on. Then, based on a signal from the CPU ex502, the driving frequency control unit ex512 sets the driving frequency. Also, based on a signal from the CPU ex502, the signal processing unit ex507 decodes the video data. Here, the use of the identification information described in the seventh embodiment, for example, in identification of the video data is conceivable. The identification information is not limited to the one described in the seventh embodiment and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. It is also conceivable to select the driving frequency of the CPU ex502 in accordance with a lookup table in which the standard for the video data and the driving frequency are associated with each other as illustrated in FIG. 50, for example. The lookup table is stored in the buffer ex508 or an internal memory of the LSI ex500, and the CPU ex502 refers to this lookup table. In this way, the driving frequency can be selected.

Figure 49:
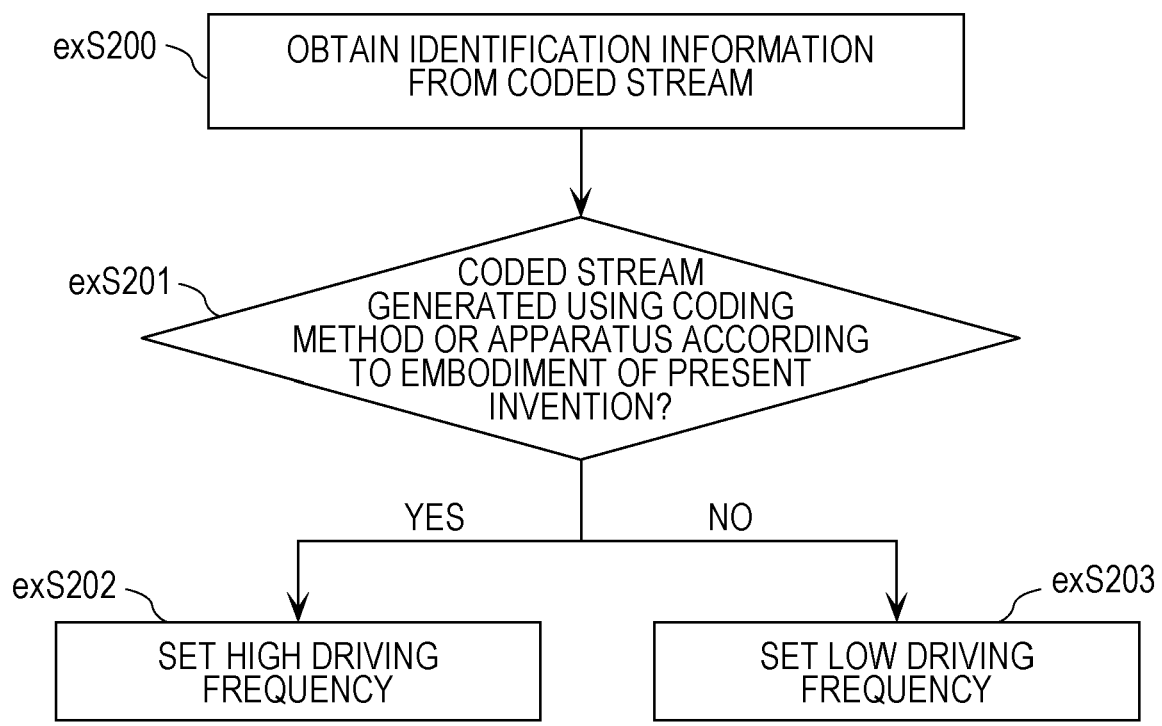
FIG. 49 is a diagram illustrating steps for identifying video data and switching between driving frequencies.

FIG. 49 illustrates steps for performing the method according to the ninth embodiment. First, in step exS200, the signal processing unit ex507 obtains identification information from multiplexed data. Then, in step exS201, based on the identification information, the CPU ex502 identifies whether or not video data is video data that has been generated using the video coding method or apparatus described in each of the above embodiments. If the video data is video data that has been generated using the video coding method or apparatus described in each of the above embodiments, the CPU ex502 sends a signal for setting a high driving frequency to the driving frequency control unit ex512 in step exS202. Then, the driving frequency control unit ex512 sets a high driving frequency. On the other hand, if the identification information indicates that the video data is video data based on an existing standard, such as MPEG-2, MPEG-4 AVC, or VC-1, the CPU ex502 sends a signal for setting a low driving frequency to the driving frequency control unit ex512 in step exS203. Then, the driving frequency control unit ex512 sets a lower driving frequency than that used when the video data is video data that has been generated using the video coding method or apparatus described in each of the above embodiments.

Further, by changing a voltage supplied to the LSI ex500 or an apparatus including the LSI ex500 in conjunction with switching of the driving frequency, the power-saving effect can be further increased. For example, it is conceivable that in the case where a low driving frequency is set, a voltage supplied to the LSI ex500 or an apparatus including the LSI ex500 is set to be lower in response to this setting than that of the case where a high driving frequency is set.

It is sufficient that the driving frequency is set to be higher in the case where an amount of decoding processing is large and set to be lower in the case where an amount of decoding processing is small. Accordingly, the driving frequency setting method is not limited to the above-described setting method. For example, in the case where an amount of processing for decoding video data based on the MPEG-4 AVC standard is larger than an amount of processing for decoding video data generated using the video coding method or apparatus described in each of the above embodiments, settings of the driving frequency can be made opposite to the settings of the above-described case.

Further, the driving frequency setting method is not limited to a configuration for setting the driving frequency low. For example, in the case where the identification information indicates that the video data is video data that has been generated using the video coding method or apparatus described in each of the above embodiments, a voltage supplied to the LSI ex500 or an apparatus including the LSI ex500 may be set to be high. In the case where the identification information indicates that the video data is video data based on an existing standard, such as MPEG-2, MPEG-4 AVC, or VC-1, a voltage supplied to the LSI ex500 or an apparatus including the LSIex500 may be set to be low. Alternatively, in another example, in the case where the identification information indicates that the video data is video data that has been generated using the video coding method or apparatus described in each of the above embodiments, driving of the CPU ex502 is not stopped. In the case where the identification information indicates that the video data is video data based on an existing standard, such as MPEG-2, MPEG-4 AVC, or VC-1, driving of the CPU ex502 may be temporarily stopped because there is a surplus of capacity relative to the processing load. When there is a surplus of capacity relative to the processing load in the case where the identification information indicates that the video data is video data that has been generated using the video coding method or apparatus described in each of the above embodiments, driving of the CPU ex502 may be temporarily stopped. In this case, a period over which the CPU ex502 is stopped may be set to be shorter than that of the case where the identification information indicates that the video data is video data based on an existing standard, such as MPEG-2, MPEG-4 AVC, or VC-1.

By switching between the driving frequencies in accordance with the standard which the video data is based on in this manner, electric power can be saved. Also, in the case where the LSI ex500 or an apparatus including the LSI ex500 is driven with a battery, the battery can be made last longer as a result of power-saving.

Tenth Embodiment

A plurality of pieces of video data based on different standards are sometimes input to the aforementioned devices and systems, such as the television ex300 and the mobile phone ex114. In order to enable decoding even in the case where a plurality of pieces of video data based on different standards are input, the signal processing unit ex507 of the LSI ex500 needs to support the plurality of standards. However, the use of the signal processing units ex507 for the respective standards undesirably makes the circuit scale of the LSI ex500 larger and increases the cost.

Figure 51A:
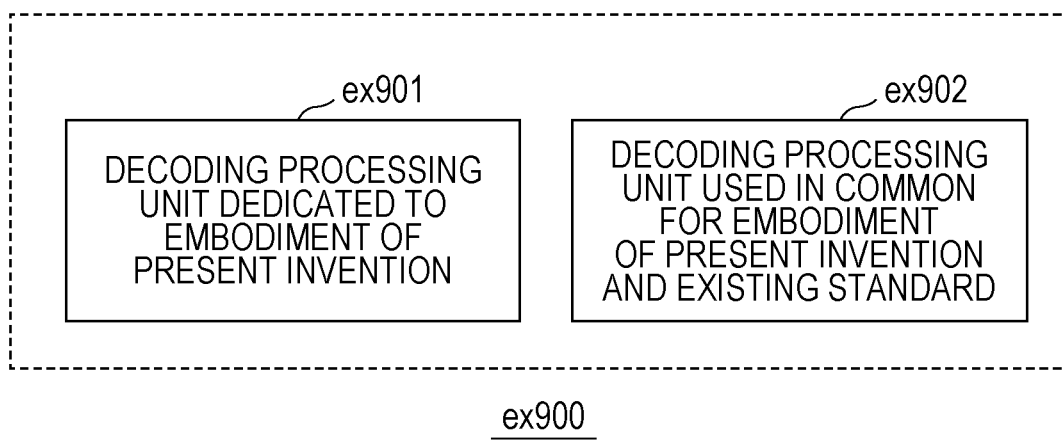
FIG. 51A is a diagram illustrating an example of a configuration that enables sharing of modules among signal processing units.

To address this issue, a decoding processing unit that executes the video decoding method described in each of the above embodiments and a decoding processing unit compliant with an existing standard, such as MPEG-2, MPEG-4 AVC, or VC-1, share some of their components. FIG. 51A illustrates an example of this configuration ex900. For example, the video decoding method described in each of the above embodiments and the video decoding method compliant with the MPEG-4 AVC standard share some of contents of processing, such as entropy decoding, inverse quantization, deblocking filtering, and motion compensation. Accordingly, the following configuration is conceivable. For the shared processing contents, a decoding processing unit ex902 compliant with the MPEG-4 AVC standard in used in common. For other processing contents that are not compliant with the MPEG-4 AVC standard and are unique to an aspect of the present disclosure, a dedicated decoding processing unit ex901 may be used. In particular, an aspect of the present disclosure includes a feature in motion compensation. Thus, for example, the dedicated decoding processing unit ex901 may be used for motion compensation and the decoding processing unit ex902 may be used in common for any of or all of inverse quantization, entropy decoding, and deblocking filtering. Alternatively, as for sharing of the decoding processing unit, a configuration may be used in which a decoding processing unit that executes the video decoding method described in each of the above embodiments is used for the common processing contents and a dedicated decoding processing unit is used for processing contents unique to the MPEG-4 AVC standard.

Figure 51B:
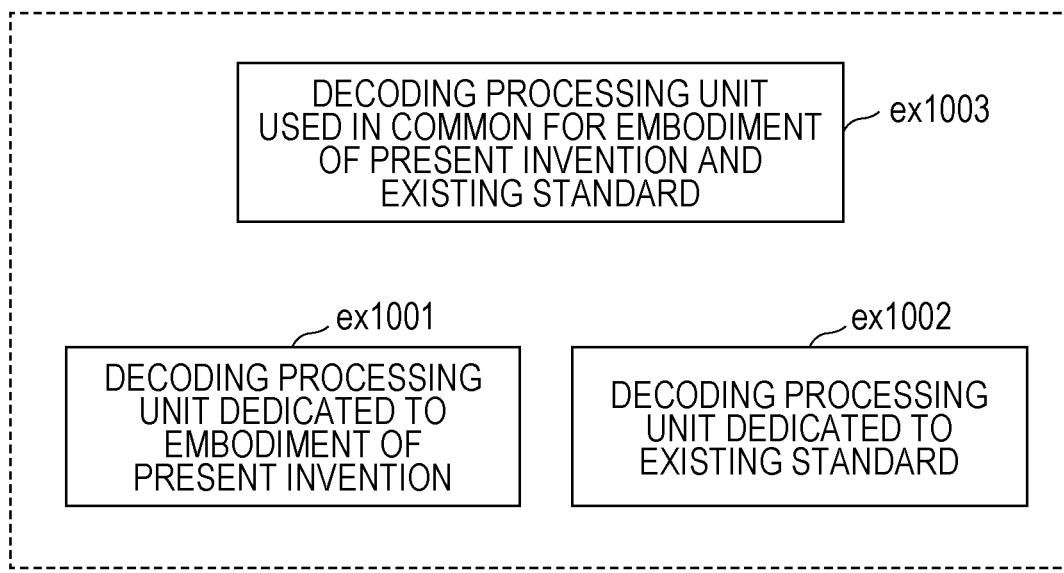
FIG. 51B is a diagram illustrating another example of a configuration that enables sharing of modules among signal processing units.

FIG. 51B illustrates another example ex1000 that implements sharing of part of processing. In this example, a dedicated decoding processing unit ex1001 that handles processing contents unique to an aspect of the present disclosure, a dedicated decoding processing unit ex1002 that handles processing contents unique to an existing standard, and a shared decoding processing unit ex1003 that handles processing contents that are common to the video decoding method according to the aspect of the present disclosure and the video decoding method according to the existing standard are used. Here, the dedicated decoding processing units ex1001 and ex1002 are not necessarily specialized for the processing contents unique to the aspect of the present disclosure and the existing standard, respectively, and may be also capable of executing other general processing. Also, the configuration according to the tenth embodiment can be implemented using the LSI ex500.

By sharing a decoding processing unit for processing contents that are common to the video decoding method according to an aspect of the present disclosure and the video decoding method according to an existing standard, the circuit scale and cost of the LSI ex500 can be reduced.

The embodiments of the present disclosure are applicable to an image processing apparatus, an image capturing apparatus, and an image reproduction apparatus. Specifically, the embodiments of the present disclosure are applicable to a digital still camera, a camcorder, a camera-equipped mobile phone, a smartphone, for example.

What is claimed is:

1. An image decoding apparatus for decoding a bitstream to generate a picture, the image decoding apparatus comprising:
    a processor; and
    a memory coupled to the processor;
    wherein the processer, in operation, performs the following:
        reading selection information that identifies one coding level from among a plurality of coding levels, wherein among the plurality of coding levels, (i) the lowest coding level indicates no transform component and (ii) each of the remaining coding levels encompasses a different combination of one or more transform components; and
        generating a prediction image based on the one coding level.

2. The image decoding apparatus according to claim 1, wherein the plurality of coding levels includes:
    a first coding level that indicates only translation; and
    a second motion type that indicates translation, rotation, and zoom.

3. The image decoding apparatus according to claim 2, wherein for the zoom, a zoom rate for the x direction and a zoom rate for the y direction are different.

4. The image decoding apparatus according to claim 2, wherein for the zoom, a zoom rate for the x direction and a zoom rate for the y direction are same.

5. The image decoding apparatus according to claim 2, wherein the plurality of coding levels includes a third coding level that indicates a general affine transform.

6. The image decoding apparatus according to claim 5, wherein the third coding level indicates translation, rotation, zoom, and shearing.

7. The image decoding apparatus according to claim 1, wherein starting from a second lowest coding level from among the remaining coding levels, each of the remaining coding levels encompasses (i) transform components encompassed in an immediate lower coding level and (ii) at least one transform component not encompassed in the immediate lower coding level.

8. An image decoding method for decoding a bitstream to generate an image, the image decoding method comprising:
    reading selection information that identifies one coding level from among a plurality of coding levels, wherein among the plurality of coding levels, (i) the lowest coding level indicates no transform component and (ii) each of the remaining coding levels encompasses a different combination of one or more transform components; and
    generating a prediction image based on the one coding level.

9. The image decoding method according to claim 8, wherein the plurality of coding levels includes:
    a first coding level that indicates only translation; and
    a second coding level that indicates translation, rotation, and zoom.

10. The image decoding method according to claim 9, wherein for the zoom, a zoom rate for the x direction and a zoom rate for the y direction are different.

11. The image decoding method according to claim 9, wherein for the zoom, a zoom rate for the x direction and a zoom rate for the y direction are same.

12. The image decoding method according to claim 9, wherein the plurality of coding levels includes a third coding level that indicates a general affine transform.

13. The image decoding method according to claim 12, wherein the third coding level indicates translation, rotation, zoom, and shearing.

14. The image decoding method according to claim 8, wherein starting from a second lowest coding level from among the remaining coding levels, each of the remaining coding levels encompasses (i) transform components encompassed in an immediate lower coding level and (ii) at least one transform component not encompassed in the immediate lower coding level.

* * * * *